(12) United States Patent
Kottur et al.

(10) Patent No.: US 12,142,298 B1
(45) Date of Patent: Nov. 12, 2024

(54) CREATING DIGITAL STORIES BASED ON MEMORY GRAPHS AND MULTI-TURN DIALOGS FOR ASSISTANT SYSTEMS

(71) Applicant: Meta Platforms, Inc., Menlo Park, CA (US)

(72) Inventors: Satwik Kottur, Sunnyvale, CA (US); Seungwhan Moon, Seattle, WA (US); Aram Markosyan, San Jose, CA (US); Hardik Shah, Newark, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 8 days.

(21) Appl. No.: 18/152,064

(22) Filed: Jan. 9, 2023

Related U.S. Application Data

(60) Provisional application No. 63/310,029, filed on Feb. 14, 2022.

(51) Int. Cl.
| | |
|---|---|
| *G11B 27/031* | (2006.01) |
| *G06F 40/284* | (2020.01) |
| *G06F 40/35* | (2020.01) |
| *G10L 15/22* | (2006.01) |
| *G10L 15/30* | (2013.01) |
| *G10L 15/18* | (2013.01) |

(52) U.S. Cl.
CPC .......... *G11B 27/031* (2013.01); *G06F 40/284* (2020.01); *G06F 40/35* (2020.01); *G10L 15/1815* (2013.01); *G10L 15/22* (2013.01); *G10L 15/30* (2013.01)

(58) Field of Classification Search
CPC ..... G11B 27/031; G06F 40/35; G06F 40/284; G10L 15/1815; G10L 15/22; G10L 15/30
See application file for complete search history.

(56) References Cited

U.S. PATENT DOCUMENTS

| | | |
|---|---|---|
| 5,926,537 A | 7/1999 | Birze |
| 6,014,439 A | 1/2000 | Walker et al. |
| (Continued) | | |

FOREIGN PATENT DOCUMENTS

| | | |
|---|---|---|
| WO | 2012116241 A2 | 8/2012 |

OTHER PUBLICATIONS

US 11,388,247 B1, 07/2022, Khemka et al. (withdrawn)

(Continued)

*Primary Examiner* — Thai Q Tran
*Assistant Examiner* — Jose M Mesa
(74) *Attorney, Agent, or Firm* — Jordan IP Law, LLC

(57) ABSTRACT

In one embodiment, a method includes receiving a first user request from a first user for generating a media montage from a client system during a dialog session with the first user, generating an initial media montage during the dialog session based on media collections associated with the first user, sending instructions for presenting the initial media montage to the client system during the dialog session, receiving a second user request from the first user from the client system during the dialog session for editing the initial media montage, generating an edited media montage from the initial media montage during the dialog session based on the second user request and a memory graph associated with the first user, and sending instructions for presenting the edited media montage to the client system during the dialog session.

20 Claims, 20 Drawing Sheets

(56) References Cited

U.S. PATENT DOCUMENTS

| | | |
|---|---|---|
| 7,124,123 B1 | 10/2006 | Roskind et al. |
| 7,158,678 B2 | 1/2007 | Nagel et al. |
| 7,397,912 B2 | 7/2008 | Aasman et al. |
| 7,613,287 B1 | 11/2009 | Stifelman et al. |
| 7,889,853 B2 | 2/2011 | Sutcliffe |
| 8,027,451 B2 | 9/2011 | Arendsen et al. |
| 8,204,200 B2 | 6/2012 | Wang et al. |
| 8,560,564 B1 | 10/2013 | Hoelzle et al. |
| 8,660,247 B1 | 2/2014 | Brown |
| 8,677,377 B2 | 3/2014 | Cheyer et al. |
| 8,935,192 B1 | 1/2015 | Ventilla et al. |
| 8,983,383 B1 | 3/2015 | Haskin |
| 9,154,739 B1 | 10/2015 | Nicolaou et al. |
| 9,251,471 B2 | 2/2016 | Pinckney et al. |
| 9,299,059 B1 | 3/2016 | Marra et al. |
| 9,304,736 B1 | 4/2016 | Whiteley et al. |
| 9,338,242 B1 | 5/2016 | Suchland et al. |
| 9,338,493 B2 | 5/2016 | Van Os et al. |
| 9,390,724 B2 | 7/2016 | List |
| 9,418,658 B1 | 8/2016 | David et al. |
| 9,472,206 B2 | 10/2016 | Ady |
| 9,479,931 B2 | 10/2016 | Ortiz, Jr. et al. |
| 9,576,574 B2 | 2/2017 | Van Os |
| 9,639,608 B2 | 5/2017 | Freeman |
| 9,659,577 B1 | 5/2017 | Langhammer |
| 9,720,955 B1 | 8/2017 | Cao et al. |
| 9,747,895 B1 | 8/2017 | Jansche et al. |
| 9,792,281 B2 | 10/2017 | Sarikaya |
| 9,858,925 B2 | 1/2018 | Gruber et al. |
| 9,865,260 B1 | 1/2018 | Vuskovic et al. |
| 9,875,233 B1 | 1/2018 | Tomkins et al. |
| 9,875,741 B2 | 1/2018 | Gelfenbeyn et al. |
| 9,881,077 B1 | 1/2018 | Alfonseca et al. |
| 9,886,953 B2 | 2/2018 | Lemay et al. |
| 9,990,591 B2 | 6/2018 | Gelfenbeyn et al. |
| 10,042,032 B2 | 8/2018 | Scott et al. |
| 10,127,220 B2 | 11/2018 | Bellegarda et al. |
| 10,134,395 B2 | 11/2018 | Typrin |
| 10,199,051 B2 | 2/2019 | Binder et al. |
| 10,241,752 B2 | 3/2019 | Lemay et al. |
| 10,276,170 B2 | 4/2019 | Gruber et al. |
| 10,462,422 B1 | 10/2019 | Harrison et al. |
| 10,511,808 B2 | 12/2019 | Harrison et al. |
| 10,719,786 B1 | 7/2020 | Treseler et al. |
| 10,782,986 B2 | 9/2020 | Martin |
| 10,803,050 B1 | 10/2020 | Salkola |
| 10,827,024 B1 | 11/2020 | Schissel et al. |
| 10,841,249 B2 | 11/2020 | Lim et al. |
| 10,854,206 B1 | 12/2020 | Liu et al. |
| 10,855,485 B1 | 12/2020 | Zhou et al. |
| 10,896,295 B1 | 1/2021 | Shenoy |
| 10,949,616 B1 | 3/2021 | Shenoy et al. |
| 10,957,329 B1 | 3/2021 | Liu et al. |
| 10,958,599 B1 | 3/2021 | Penov et al. |
| 10,977,258 B1 | 4/2021 | Liu et al. |
| 10,978,056 B1 | 4/2021 | Challa et al. |
| 11,003,669 B1 | 5/2021 | Nelson et al. |
| 11,010,436 B1 | 5/2021 | Peng et al. |
| 11,038,974 B1 | 6/2021 | Koukoumidis et al. |
| 11,042,554 B1 | 6/2021 | Balakrishnan et al. |
| 11,086,858 B1 | 8/2021 | Koukoumidis et al. |
| 11,087,756 B1 | 8/2021 | William et al. |
| 11,093,551 B1 | 8/2021 | Vivek et al. |
| 11,100,179 B1 | 8/2021 | Zheng et al. |
| 11,115,410 B1 | 9/2021 | Michael et al. |
| 11,159,767 B1 | 10/2021 | Kamisetty et al. |
| 11,245,646 B1 | 2/2022 | Koukoumidis |
| 11,301,521 B1 | 4/2022 | Schissel et al. |
| 11,308,169 B1 | 4/2022 | Koukoumidis et al. |
| 11,308,284 B2 | 4/2022 | Huang et al. |
| 11,341,335 B1 | 5/2022 | Crook et al. |
| 11,368,420 B1 | 6/2022 | Crook et al. |
| 11,442,992 B1 | 9/2022 | Moon et al. |
| 11,443,120 B2 | 9/2022 | Poddar et al. |
| 11,563,706 B2 | 1/2023 | Greenberg et al. |
| 2008/0240379 A1 | 10/2008 | Maislos et al. |
| 2008/0300884 A1 | 12/2008 | Smith |
| 2009/0282033 A1 | 11/2009 | Alshawi |
| 2011/0246383 A1 | 10/2011 | Gibson et al. |
| 2012/0159326 A1* | 6/2012 | Mital ............... G06F 16/44 715/716 |
| 2012/0245944 A1 | 9/2012 | Gruber et al. |
| 2012/0246191 A1 | 9/2012 | Xiong |
| 2012/0265528 A1 | 10/2012 | Gruber et al. |
| 2012/0311126 A1 | 12/2012 | Jadallah et al. |
| 2013/0035930 A1 | 2/2013 | Ferrucci et al. |
| 2013/0268839 A1 | 10/2013 | Lefebvre et al. |
| 2013/0275138 A1 | 10/2013 | Gruber et al. |
| 2013/0275164 A1 | 10/2013 | Gruber et al. |
| 2014/0012926 A1 | 1/2014 | Narayanan et al. |
| 2014/0032659 A1 | 1/2014 | Marini et al. |
| 2014/0074483 A1 | 3/2014 | Van Os |
| 2014/0129266 A1 | 5/2014 | Perl et al. |
| 2014/0164506 A1 | 6/2014 | Tesch et al. |
| 2014/0244712 A1 | 8/2014 | Walters et al. |
| 2014/0280017 A1 | 9/2014 | Indarapu et al. |
| 2014/0297284 A1 | 10/2014 | Gruber et al. |
| 2015/0081674 A1 | 3/2015 | Ali et al. |
| 2015/0142420 A1 | 5/2015 | Sarikaya et al. |
| 2015/0142704 A1 | 5/2015 | London |
| 2015/0169284 A1 | 6/2015 | Quast et al. |
| 2015/0169744 A1 | 6/2015 | Walkingshaw et al. |
| 2015/0179168 A1 | 6/2015 | Hakkani-Tur et al. |
| 2015/0186156 A1 | 7/2015 | Brown et al. |
| 2015/0207765 A1 | 7/2015 | Brantingham et al. |
| 2015/0220888 A1 | 8/2015 | Iyer |
| 2015/0347375 A1 | 12/2015 | Tremblay et al. |
| 2016/0019290 A1 | 1/2016 | Ratnaparkhi et al. |
| 2016/0037311 A1 | 2/2016 | Cho |
| 2016/0063118 A1 | 3/2016 | Campbell et al. |
| 2016/0196491 A1 | 7/2016 | Chandrasekaran et al. |
| 2016/0225370 A1 | 8/2016 | Kannan et al. |
| 2016/0255082 A1 | 9/2016 | Rathod |
| 2016/0306505 A1 | 10/2016 | Vigneras et al. |
| 2016/0308799 A1 | 10/2016 | Schubert et al. |
| 2016/0328096 A1 | 11/2016 | Tran et al. |
| 2016/0378849 A1 | 12/2016 | Myslinski |
| 2016/0378861 A1 | 12/2016 | Eledath et al. |
| 2017/0026318 A1 | 1/2017 | Daniel et al. |
| 2017/0091168 A1 | 3/2017 | Bellegarda et al. |
| 2017/0092264 A1 | 3/2017 | Hakkani-Tur et al. |
| 2017/0132019 A1 | 5/2017 | Karashchuk et al. |
| 2017/0193390 A1 | 7/2017 | Weston et al. |
| 2017/0286401 A1 | 10/2017 | He et al. |
| 2017/0353469 A1 | 12/2017 | Selekman et al. |
| 2017/0358304 A1 | 12/2017 | Castillo Sanchez et al. |
| 2017/0359707 A1 | 12/2017 | Diaconu et al. |
| 2018/0013699 A1 | 1/2018 | Sapoznik et al. |
| 2018/0018562 A1 | 1/2018 | Jung |
| 2018/0018987 A1 | 1/2018 | Zass |
| 2018/0040020 A1 | 2/2018 | Kurian et al. |
| 2018/0052824 A1 | 2/2018 | Ferrydiansyah et al. |
| 2018/0054523 A1 | 2/2018 | Zhang et al. |
| 2018/0096071 A1 | 4/2018 | Green |
| 2018/0096072 A1 | 4/2018 | He et al. |
| 2018/0107917 A1 | 4/2018 | Hewavitharana et al. |
| 2018/0121508 A1 | 5/2018 | Halstvedt |
| 2018/0189629 A1 | 7/2018 | Yatziv et al. |
| 2018/0205797 A1* | 7/2018 | Faulkner ............ H04L 65/1083 |
| 2018/0210874 A1 | 7/2018 | Fuxman et al. |
| 2018/0293484 A1 | 10/2018 | Wang et al. |
| 2018/0329998 A1 | 11/2018 | Thomson et al. |
| 2019/0035390 A1 | 1/2019 | Howard et al. |
| 2019/0080698 A1 | 3/2019 | Miller |
| 2019/0082221 A1 | 3/2019 | Jain et al. |
| 2019/0087491 A1 | 3/2019 | Bax |
| 2019/0132265 A1 | 5/2019 | Nowak-Przygodzki et al. |
| 2019/0139150 A1 | 5/2019 | Brownhill et al. |
| 2019/0213490 A1 | 7/2019 | White et al. |
| 2019/0311036 A1 | 10/2019 | Shanmugam et al. |
| 2019/0324527 A1 | 10/2019 | Presant et al. |
| 2019/0324553 A1 | 10/2019 | Liu et al. |
| 2019/0324780 A1 | 10/2019 | Zhu et al. |
| 2019/0325042 A1 | 10/2019 | Yu et al. |

(56) References Cited

U.S. PATENT DOCUMENTS

| | | |
|---|---|---|
| 2019/0325080 A1 | 10/2019 | Natarajan et al. |
| 2019/0325081 A1 | 10/2019 | Liu et al. |
| 2019/0325084 A1 | 10/2019 | Peng et al. |
| 2019/0325864 A1 | 10/2019 | Anders et al. |
| 2019/0327330 A1 | 10/2019 | Natarajan et al. |
| 2019/0327331 A1 | 10/2019 | Natarajan et al. |
| 2019/0348033 A1 | 11/2019 | Chen et al. |
| 2019/0361408 A1 | 11/2019 | Tokuchi |
| 2020/0410012 A1 | 12/2020 | Moon et al. |
| 2021/0117214 A1 | 4/2021 | Presant et al. |
| 2021/0117479 A1 | 4/2021 | Liu et al. |
| 2021/0117623 A1 | 4/2021 | Aly et al. |
| 2021/0117624 A1 | 4/2021 | Aghajanyan et al. |
| 2021/0117681 A1 | 4/2021 | Poddar et al. |
| 2021/0117780 A1 | 4/2021 | Malik et al. |
| 2021/0118440 A1 | 4/2021 | Peng et al. |
| 2021/0118442 A1 | 4/2021 | Poddar et al. |
| 2021/0119955 A1 | 4/2021 | Penov et al. |
| 2021/0120206 A1 | 4/2021 | Liu et al. |
| 2021/0409234 A1 | 12/2021 | Behar |
| 2022/0050696 A1 | 2/2022 | Presant et al. |
| 2022/0129556 A1 | 4/2022 | Chen et al. |
| 2022/0188361 A1 | 6/2022 | Botros et al. |
| 2022/0199079 A1 | 6/2022 | Hanson et al. |
| 2022/0269870 A1 | 8/2022 | Goel et al. |
| 2022/0284904 A1 | 9/2022 | Pu et al. |
| 2022/0358917 A1 | 11/2022 | Chaland et al. |
| 2022/0366170 A1 | 11/2022 | Wang et al. |
| 2022/0366904 A1 | 11/2022 | Martinson et al. |
| 2022/0374130 A1 | 11/2022 | Pu et al. |
| 2022/0374605 A1 | 11/2022 | Sethi et al. |
| 2022/0374645 A1 | 11/2022 | Santoro et al. |

OTHER PUBLICATIONS

Budzianowski P., et al., "MultiWOZ—A Large-Scale Multi-Domain Wizard-of-Oz Dataset for Task-Oriented Dialogue Modelling," arXiv:1810.00278, Apr. 20, 2020, 14 pages.

Bursztyn V.S., et al., "Gaudi: Conversational Interactions with Deep Representations to Generate Image Collections," arXiv:2112.04404, Dec. 5, 2021, 3 pages.

Co-pending U.S. Appl. No. 15/953,957, inventors Moujahid; Kemal El et al., filed Apr. 16, 2018.

Co-pending U.S. Appl. No. 15/967,193, inventors Testuggine; Davide et al., filed Apr. 30, 2018.

Co-pending U.S. Appl. No. 16/025,317, inventors Gupta; Sonal et al., filed Jul. 2, 2018.

Co-pending U.S. Appl. No. 16/048,072, inventor Salkola; Markku, filed Jul. 27, 2018.

Co-pending U.S. Appl. No. 16/048,101, inventor Salkola; Markku, filed Jul. 27, 2018.

Co-pending U.S. Appl. No. 16/057,414, inventors Kahn; Jeremy Gillmor et al., filed Aug. 7, 2018.

Co-pending U.S. Appl. No. 16/121,393, inventors Zhou; Zheng et al., filed Sep. 4, 2018.

Co-pending U.S. Appl. No. 16/135,752, inventors Liu; Xiaohu et al., filed Sep. 19, 2018.

Co-pending U.S. Appl. No. 16/168,536, inventors Dumoulin; Benoit F. et al., filed Oct. 23, 2018.

Co-pending U.S. Appl. No. 16/376,832, inventors Liu; Honglei et al., filed Apr. 5, 2019.

Co-pending U.S. Appl. No. 16/389,738, inventors Peng; Fuchun et al., filed Apr. 19, 2019.

Co-pending U.S. Appl. No. 16/389,769, inventors Liu; Honglei et al., filed Apr. 19, 2019.

Co-pending U.S. Appl. No. 16/434,010, inventors Dogaru; Sergiu et al., filed Jun. 6, 2019.

Co-pending U.S. Appl. No. 16/659,070, inventors Huang; Lisa Xiaoyi et al., filed Oct. 21, 2019.

Co-pending U.S. Appl. No. 16/659,203, inventors Huang; Lisa Xiaoyi et al., filed Oct. 21, 2019.

Co-pending U.S. Appl. No. 16/659,419, inventors Huang; Lisa Xiaoyi et al., filed Oct. 21, 2019.

Co-pending U.S. Appl. No. 16/742,769, inventors Liu; Xiaohu et al., filed Jan. 14, 2020.

Co-pending U.S. Appl. No. 16/790,497, inventors Gao; Yang et al., filed Feb. 13, 2020.

Co-pending U.S. Appl. No. 16/815,960, inventors Malik; Kshitiz et al., filed Mar. 11, 2020.

Co-pending U.S. Appl. No. 16/917,664, inventors Liu; Xiaohu et al., filed Jun. 30, 2020.

Co-pending U.S. Appl. No. 16/921,665, inventors Liu; Honglei et al., filed Jul. 6, 2020.

Co-pending U.S. Appl. No. 17/009,542, inventor Kottur; Satwik, filed Sep. 1, 2020.

Co-pending U.S. Appl. No. 17/139,363, inventors Cheng; Daniel Manhon et al., filed Dec. 31, 2020.

Co-pending U.S. Appl. No. 17/186,459, inventors Liu; Bing et al., filed Feb. 26, 2021.

Co-pending U.S. Appl. No. 17/504,276, inventors Kottur; Satwik et al., filed Oct. 18, 2021.

Co-pending U.S. Appl. No. 17/512,508, inventors Vincent; Joshuah et al., filed Oct. 27, 2021.

Co-pending U.S. Appl. No. 17/525,510, inventors Shrivastava; Akshat et al., filed Nov. 12, 2021.

Co-pending U.S. Appl. No. 17/543,178, inventors Desai; Shrey et al., filed Dec. 6, 2021.

Co-pending U.S. Appl. No. 17/725,540, inventors Surkov; Alexey Gennadyevich et al., filed Apr. 20, 2022.

Co-pending U.S. Appl. No. 17/732,104, inventors Bi; Sheng et al., filed Apr. 28, 2022.

Co-pending U.S. Appl. No. 17/747,345, inventors Desai; Shrey et al., filed May 18, 2022.

Co-pending U.S. Appl. No. 17/877,568, inventor Khorshid; Mokhtar Mohamed, filed Jul. 29, 2022.

Co-pending U.S. Appl. No. 17/877,595, inventors Khorshid; Mokhtar Mohamed et al., filed Jul. 29, 2022.

Co-pending U.S. Appl. No. 17/934,898, inventor Nguyen; Katherina, filed Sep. 23, 2022.

Co-pending U.S. Appl. No. 17/935,029, inventors Shi; Yangyang et al., filed Sep. 23, 2022.

Co-pending U.S. Appl. No. 18/050,037, inventors Li; Mengxi et al., filed Oct. 26, 2022.

Co-pending U.S. Appl. No. 18/050,038, inventors Jackson; Aaron et al., filed Oct. 26, 2022.

Co-pending U.S. Appl. No. 18/050,039, inventors Yang; Fang-Yu et al., filed Oct. 26, 2022.

Co-pending U.S. Appl. No. 18/050,041, inventors Greenberg; Michael et al., filed Oct. 26, 2022.

Co-pending U.S. Appl. No. 18/055,591, inventors Bi; Sheng et al., filed Nov. 15, 2022.

Co-pending U.S. Appl. No. 18/059,641, inventors Liu; Shusen et al., filed Nov. 29, 2022.

Co-pending U.S. Appl. No. 18/061,838, inventors Ghasemlou; Shervin et al., filed Dec. 5, 2022.

Co-pending U.S. Appl. No. 18/149,289, inventor Xu; Jiayang, filed Jan. 3, 2023.

Eric M., et al., "MultiWOZ 2.1: A Consolidated Multi-Domain Dialogue Dataset with State Corrections and State Tracking Baselines," arXiv:1907.01669, Dec. 3, 2019, 7 pages.

Gao S., et al., "Dialog State Tracking: A Neural Reading Comprehension Approach," arXiv:1908.01946, Aug. 15, 2019, 10 pages.

Guo X., et al., "Dialog-based Interactive Image Retrieval," arXiv:1805.00145, Dec. 20, 2018, 17 pages.

Guo X., et al., "Dialog-based Interactive Image Retrieval," International Conference on Neural Information Processing Systems, Dec. 3, 2018, 11 pages.

Hosseini-Asl E., et al., "A Simple Language Model for Task-Oriented Dialogue," arXiv:2005.00796, Apr. 12, 2022, 22 pages.

Karras T., et al., "A Style-Based Generator Architecture for Generative Adversarial Networks," arXiv: 1812.04948, Mar. 29, 2019, 12 pages.

(56) References Cited

OTHER PUBLICATIONS

Kottur S., et al., "SIMMC 2.0: A Task-Oriented Dialog Dataset for Immersive Multimodal Conversations," arXiv:2104.08667, Oct. 20, 2021, 11 pages.

Lin T-H., et al., "A Multimodal Dialogue System for Conversational Image Editing," arXiv:2002.06484, Feb. 16, 2020, 10 pages.

Lin T-Y., et al., "Microsoft COCO: Common Objects in Context," In European Conference on Computer Vision, Springer, Sep. 2014, pp .740-755.

Peng B., et al., "SOLOIST: Building Task Bots at Scale with Transfer Learning and Machine Teaching," arXiv:2005.05298, Apr. 9, 2021, 18 pages.

Radford A., et al., "Language Models are Unsupervised Multitask Learners," 2019, [Retrieved on Jan. 11, 2023], 24 pages.

Radford A., et al., "Learning Transferable Visual Models from Natural Language Supervision," arXiv:2103.00020, Feb. 26, 2021, 48 pages.

Rastogi A., et al., "Towards Scalable Multi-Domain Conversational Agents: The Schema-Guided Dialogue Dataset," arXiv:1909.05855, Jan. 29, 2020, 11 pages.

Ren S., et al., "Faster R-CNN: Towards Real-Time Object Detection With Region Proposal Networks," Advances in Neural Information Processing Systems, arXiv:1506.01497, Jan. 6, 2016, 14 pages.

Shah P., et al., "Building a Conversational Agent Overnight with Dialogue Self-Play," arXiv preprint arXiv: 1801.04871v1, Jan. 15, 2018, 11 pages.

Tan F., et al., "Drill-Down: Interactive Retrieval of Complex Scenes Using Natural Language Queries," arXiv preprint arXiv: 1911.03826v1, Nov. 10, 2019, 14 pages.

Tellex S., et al., "Towards Surveillance Video Search by Natural Language Query," Proceedings of the ACM International Conference on Image and Video Retrieval, Jul. 2009, No. 38, 8 pages.

Vo N., et al., "Composing Text and Image For Image Retrieval-an Empirical Odyssey," arXiv preprint arXiv: 1812.07119v1, Dec. 18, 2018, 9 pages.

Zhou Y., et al., "TiGAN: Text-Based Interactive Image Generation and Manipulation," Proceedings of the AAAI Conference on Artificial Intelligence, Jul. 28, 2022, vol. 36, No. 3, pp. 3580-3588.

\* cited by examiner

| Utterances | API Annotations / Dialog Acts | Story Representation |
|---|---|---|
| U | Are you able to build a story comprising Francis and Jacob? | CREATE_STORY [participant = Frances, Jacob] | |
| A | Of course! I have a story going that consists of Frances and Jacob. | Added <clip: 3, 35, 50, 17> | ID: 3 — With: Frances, Jacob / ID: 35 — With: Frances, Jacob / ID: 50 — With: Frances, Jacob / ID: 17 — With: Frances, Jacob VIEWING |
| U | What if you search for content catching us at Alki Beach sometime last year? | REFINE_SEARCH [location = Alki Beach, time = last year] | |
| A | I was able to grab 2020 content specifically from that same beach. | ADDED <clip: 34, 8, 32> | ID: 34 — With: Frances, Jacob; Time: 2020; Location: Alki Beach / ID: 8 — With: Frances, Jacob; Time: 2020 VIEWING / ID: 32 — With: Frances, Jacob; Time: 2020; Location: Alki Beach |
| U | Would you add a minute to the story's length? | MODIFY_STORY_DURATION [delta_time = 1 min, add = True] | |
| A | Yes, that's completed. | MODIFIED:STORY | |

*FIG. 9A*

| | | |
|---|---|---|
| U | And scan for media with us skiing and add them. | ADD_CLIPS [participant = Frances, Jacob & activity = skiing] |
| A | I threw in all the skiing clips I came across. | ADDED <clip: 25, 17, 31> … ID: 34 (With: Frances, Jacob; Time: 2020; Location: Alki Beach), ID: 25 (With: Frances, Jacob; Activity: Skiing), ID: 17 (With: Frances, Jacob; Activity: Skiing; VIEWING), ID: 31 (With: Frances, Jacob; Activity: Skiing) |
| U | Now can you make the first ski trip no longer than 15 seconds? | CHANGE_CLIP_DURATION <clip: 25> [max_time = 15 sec] |
| A | A: I've changed that length of that video for you. | MODIFIED <clip: 25> … ID: 34 (With: Frances, Jacob; Time: 2020; Location: Alki Beach), ID: 25 (With: Frances, Jacob; Activity: Skiing; Duration: Trimmed), ID: 17 (With: Frances, Jacob; Activity: Skiing; VIEWING), ID: 31 (With: Frances, Jacob; Activity: Skiing) |
| U | Finally, replace the one I'm currently viewing with one from the Boston Common. | REPLACE [location = Boston Common] <clip: 17> |
| A | This new one is from the Boston Common, while the one you were looking at is gone. | REMOVED <clip: 17> ADDED <clip: 8> … ID: 34 (With: Frances, Jacob; Time: 2020; Location: Alki Beach), ID: 25 (With: Frances, Jacob; Activity: Skiing; Duration: Trimmed), ID: 31 (With: Frances, Jacob; Activity: Skiing; VIEWING), ID: 8 (With: Frances, Jacob; Location: Boston Common) |

*FIG. 9B*

CREATING DIGITAL STORIES BASED ON MEMORY GRAPHS AND MULTI-TURN DIALOGS FOR ASSISTANT SYSTEMS

PRIORITY

This application claims the benefit, under 35 U.S.C. § 119(e), of U.S. Provisional Patent Application No. 63/310,029, filed 14 Feb. 2022, which is incorporated herein by reference.

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with the assistant system via user inputs of various modalities (e.g., audio, voice, text, image, video, gesture, motion, location, orientation) in stateful and multi-turn conversations to receive assistance from the assistant system. As an example and not by way of limitation, the assistant system may support mono-modal inputs (e.g., only voice inputs), multi-modal inputs (e.g., voice inputs and text inputs), hybrid/multi-modal inputs, or any combination thereof. User inputs provided by a user may be associated with particular assistant-related tasks, and may include, for example, user requests (e.g., verbal requests for information or performance of an action), user interactions with an assistant application associated with the assistant system (e.g., selection of UI elements via touch or gesture), or any other type of suitable user input that may be detected and understood by the assistant system (e.g., user movements detected by the client device of the user). The assistant system may create and store a user profile comprising both personal and contextual information associated with the user. In particular embodiments, the assistant system may analyze the user input using natural-language understanding (NLU). The analysis may be based on the user profile of the user for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation (NLG). Through the interaction with the user, the assistant system may use dialog-management techniques to manage and advance the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute, without a user input, tasks that are relevant to user interests and preferences based on the user profile, at a time relevant for the user. In particular embodiments, the assistant system may check privacy settings to ensure that accessing a user's profile or other user information and executing different tasks are permitted subject to the user's privacy settings.

In particular embodiments, the assistant system may assist the user via a hybrid architecture built upon both client-side processes and server-side processes. The client-side processes and the server-side processes may be two parallel workflows for processing a user input and providing assistance to the user. In particular embodiments, the client-side processes may be performed locally on a client system associated with a user. By contrast, the server-side processes may be performed remotely on one or more computing systems. In particular embodiments, an arbitrator on the client system may coordinate receiving user input (e.g., an audio signal), determine whether to use a client-side process, a server-side process, or both, to respond to the user input, and analyze the processing results from each process. The arbitrator may instruct agents on the client-side or server-side to execute tasks associated with the user input based on the aforementioned analyses. The execution results may be further rendered as output to the client system. By leveraging both client-side and server-side processes, the assistant system can effectively assist a user with optimal usage of computing resources while at the same time protecting user privacy and enhancing security.

In particular embodiments, the assistant system may create a digital story (i.e., a media montage comprising personalized derivative/augmented multimedia content) for a user by leveraging the user's memory graph, including taking the memory graph as an input, traversing through the memory graph, and adaptively adjusting the story based on a multi-turn dialog between the user and the assistant system. A digital story may be a way for the user to relive their memories, which could be connected by time or semantic meanings. A digital story may be in a video format with clips, transitions, and background, which is created from among the photos, videos, and other content stored on the user's assistant-enabled device. As a user may have a very large amount of memories (content) captured by their assistant-enabled devices, the assistant system may need to make it easier to create interesting/creative digital stories comprising personalized derivative/augmented content (e.g., to "relive" the moment or to share). The assistant system may rely on the memory graph to generate the personalized derivative/augmented content. The multi-turn dialog may allow the user to generate a digital story in a way that the user sees more interesting. In particular embodiments, the assistant system may understand the visual features of the memories, contextual information around them (e.g., meta information such as people in the scene, time, location, etc.), allowing for easy and intuitive navigation through connected memories. In addition, the users may manipulate the created story to their liking, e.g., making it longer/shorter, reordering clips, adding background music/text, and visual effects. These digital stories may then be shared with friends and family to enable effective storytelling. The assistant system may use an agent to create the digital story on the fly, which may be a story-event handler having a frontend component running on the assistant-enabled device and a backend component handling dialog understanding and story creation. The agent may take as input those memory graphs, and traverse through the memory graph based on the conversation along with editing the digital story on the fly with the dialog. The agent may also generate recommendations and chit-chat responses to encourage creation of the digital story and add to the delight of the process. Compared to existing systems for generating digital stories, the assistant system may eliminate the tedious work of manual selection of specific content by traversing the memory graph to select content relevant to the current dialog state, add content to a digital story by understanding and processing open-ended queries based on natural-language understanding and memory graph, provide proactive recommendations to make the digital story more interesting, and allow the user to directly modify the personalized derivative/augmented content via multi-turn dialogs. Although this disclosure describes generating particular stories by particular systems in a particular manner, this disclosure contemplates generating any suitable story in any suitable manner.

In particular embodiments, the assistant system may receive, from a client system during a dialog session with a first user, a first user request from the first user for generating a media montage. The assistant system may then generate, during the dialog session, an initial media montage based on one or more media collections associated with the first user. In particular embodiments, the assistant system may send, to the client system during the dialog session, instructions for presenting the initial media montage. The assistant system may then receive, from the client system during the dialog session, a second user request from the first user for editing the initial media montage. In particular embodiments, the assistant system may generate, during the dialog session, an edited media montage from the initial media montage based on the second user request and a memory graph associated with the first user. The assistant system may further send, to the client system during the dialog session, instructions for presenting the edited media montage.

Certain technical challenges exist for generating and editing media montages during a multi-turn conversation. One technical challenge may include interactive content creation based on task-oriented dialogs (TOD). The solution presented by the embodiments disclosed herein to address this challenge may be collecting a TOD dialog dataset comprising dialogs conditioned on media montages simulated from a large media collection, as the TOD dialog dataset has full turn-level and dialog-level annotations of dialog flows associated with natural language distributions. Another technical challenge may include generating and editing personalized media montages. One solution presented by the embodiments disclosed herein to address this challenge may be traversing a user's memory graph to identify candidate episodic memories for generating and editing media montages as these candidate episodic memories help identify media content that is of user interest. Another solution presented by the embodiments disclosed herein to address this challenge may be using a language model based on the dialog history, multimodal context comprising visual embeddings and textual tokens of episodic memories, and current utterance to generate API call specifying editing requests, clip identifiers, and activities to be incorporated into the media montages.

Certain embodiments disclosed herein may provide one or more technical advantages. A technical advantage of the embodiments may include enabling users to seamlessly search, compile, and edit media montages as the assistant system may utilize multi-turn conversation and memory graphs of the users to generate and modify media montages during the interactions with the users. Another technical advantage of the embodiments may include efficiency and conveniency for generating and editing media montages as the assistant system may perform media selection based on traversing the memory graph to select content relevant to the current dialog state without requiring users' specific manual selections of content. Another technical advantage of the embodiments may include enabling free-from queries/requests when creating media montages as the assistant system may allow the understanding and processing of open-ended queries on the personalized memory graph based on the NLU module and memory graph. Another technical advantage of the embodiments may include enabling users to modify media montages via voice interactions as the memory graph may enable the assistant system to provide such functions even when the user's modifying request is complicated, e.g., "remove all pixie's clips keep the ones with my partner." Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 9A-9B illustrate an example dialog from the C3 dataset.

DESCRIPTION OF EXAMPLE EMBODIMENTS

System Overview

Figure 1:
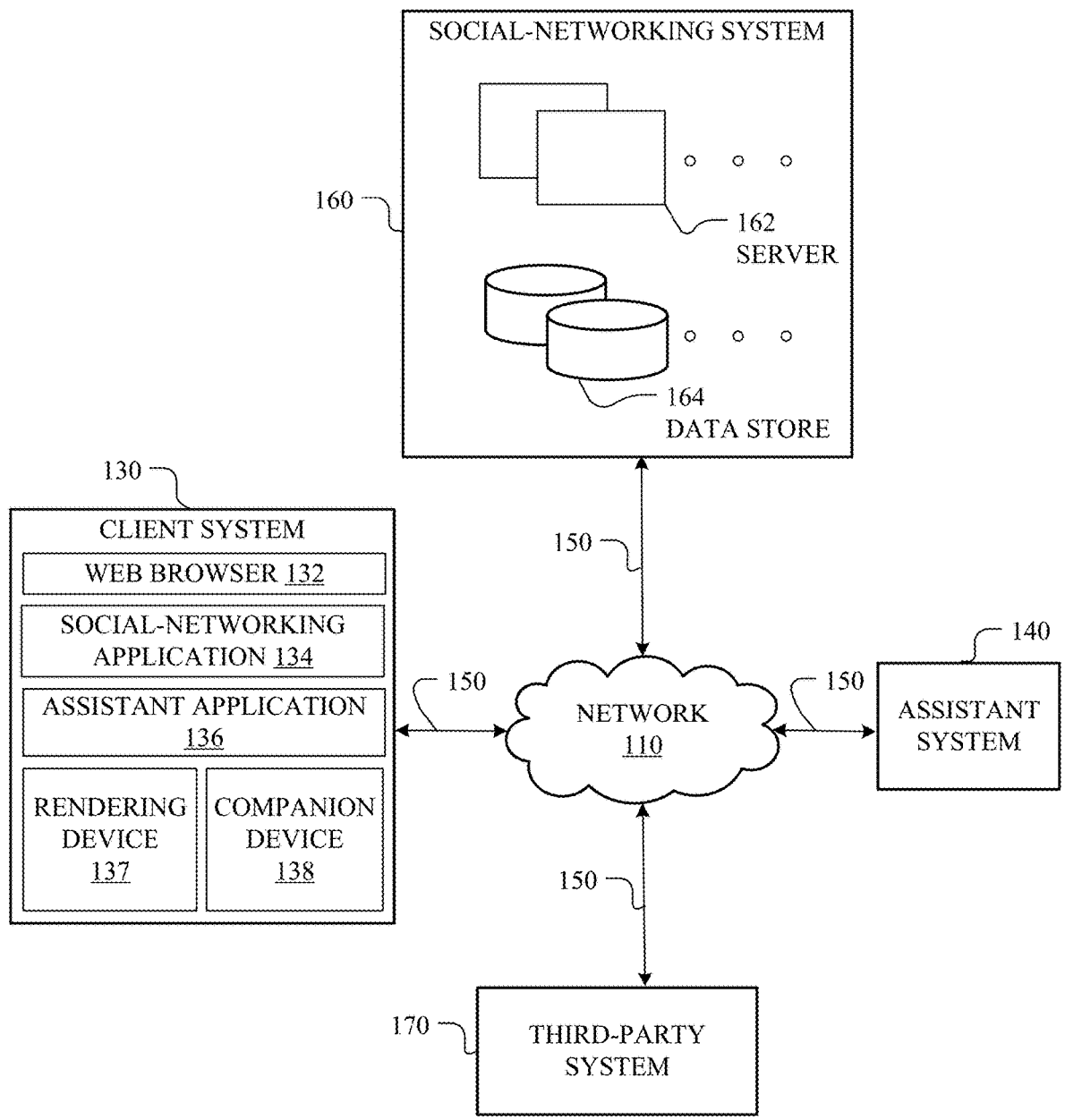
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular technology-based network, a satellite communications technology-based network, another network 110, or a combination of two or more such networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be any suitable electronic device including hardware, software, or embedded logic components, or a combination of two or more such components, and may be capable of carrying out the functionalities implemented or supported by a client system 130. As an example and not by way of limitation, the client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, smart watch, smart glasses, augmented-reality (AR) smart glasses, virtual reality (VR) headset, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. patent application Ser. No. 16/153,574, filed 5 Oct. 2018, U.S. Design patent application Ser. No. 29/631,910, filed 3 Jan. 2018, U.S. Design patent application Ser. No. 29/631,747, filed 2 Jan. 2018, U.S. Design patent application Ser. No. 29/631,913, filed 3 Jan. 2018, and U.S. Design patent application Ser. No. 29/631,914, filed 3 Jan. 2018, each of which is incorporated by reference. This disclosure contemplates any suitable client systems 130. In particular embodiments, a client system 130 may enable a network user at a client system 130 to access a network 110. The client system 130 may also enable the user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may include an assistant xbot functionality as a front-end interface for interacting with the user of the client system 130, including receiving user inputs and presenting outputs. In particular embodiments, the assistant application 136 may comprise a stand-alone application. In particular embodiments, the assistant application 136 may be integrated into the social-networking application 134 or another suitable application (e.g., a messaging application).

In particular embodiments, the assistant application 136 may be also integrated into the client system 130, an assistant hardware device, or any other suitable hardware devices. In particular embodiments, the assistant application 136 may be also part of the assistant system 140. In particular embodiments, the assistant application 136 may be accessed via the web browser 132. In particular embodiments, the user may interact with the assistant system 140 by providing user input to the assistant application 136 via various modalities (e.g., audio, voice, text, vision, image, video, gesture, motion, activity, location, orientation). The assistant application 136 may communicate the user input to the assistant system 140 (e.g., via the assistant xbot). Based on the user input, the assistant system 140 may generate responses. The assistant system 140 may send the generated responses to the assistant application 136. The assistant application 136 may then present the responses to the user at the client system 130 via various modalities (e.g., audio, text, image, and video). As an example and not by way of limitation, the user may interact with the assistant system 140 by providing a user input (e.g., a verbal request for information regarding a current status of nearby vehicle traffic) to the assistant xbot via a microphone of the client system 130. The assistant application 136 may then communicate the user input to the assistant system 140 over network 110. The assistant system 140 may accordingly analyze the user input, generate a response based on the analysis of the user input (e.g., vehicle traffic information obtained from a third-party source), and communicate the generated response back to the assistant application 136. The assistant application 136 may then present the generated response to the user in any suitable manner (e.g., displaying a text-based push notification and/or image(s) illustrating a local map of nearby vehicle traffic on a display of the client system 130).

In particular embodiments, a client system 130 may implement wake-word detection techniques to allow users to conveniently activate the assistant system 140 using one or more wake-words associated with assistant system 140. As an example and not by way of limitation, the system audio API on client system 130 may continuously monitor user input comprising audio data (e.g., frames of voice data) received at the client system 130. In this example, a wake-word associated with the assistant system 140 may be the voice phrase "hey assistant." In this example, when the system audio API on client system 130 detects the voice phrase "hey assistant" in the monitored audio data, the assistant system 140 may be activated for subsequent interaction with the user. In alternative embodiments, similar detection techniques may be implemented to activate the assistant system 140 using particular non-audio user inputs associated with the assistant system 140. For example, the non-audio user inputs may be specific visual signals detected by a low-power sensor (e.g., camera) of client system 130. As an example and not by way of limitation, the visual signals may be a static image (e.g., barcode, QR code, universal product code (UPC)), a position of the user (e.g., the user's gaze towards client system 130), a user motion (e.g., the user pointing at an object), or any other suitable visual signal.

In particular embodiments, a client system 130 may include a rendering device 137 and, optionally, a companion device 138. The rendering device 137 may be configured to render outputs generated by the assistant system 140 to the user. The companion device 138 may be configured to perform computations associated with particular tasks (e.g., communications with the assistant system 140) locally (i.e., on-device) on the companion device 138 in particular circumstances (e.g., when the rendering device 137 is unable to perform said computations). In particular embodiments, the client system 130, the rendering device 137, and/or the companion device 138 may each be a suitable electronic device including hardware, software, or embedded logic components, or a combination of two or more such components, and may be capable of carrying out, individually or cooperatively, the functionalities implemented or supported by the client system 130 described herein. As an example and not by way of limitation, the client system 130, the rendering device 137, and/or the companion device 138 may each include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augmented-reality (AR) smart glasses, other suitable electronic device, or any suitable combination thereof. In particular embodiments, one or more of the client system 130, the rendering device 137, and the companion device 138 may operate as a smart assistant device. As an example and not by way of limitation, the rendering device 137 may comprise smart glasses and the companion device 138 may comprise a smart phone. As another example and not by way of limitation, the rendering device 137 may comprise a smart watch and the companion device 138 may comprise a smart phone. As yet another example and not by way of limitation, the rendering device 137 may comprise smart glasses and the companion device 138 may comprise a smart remote for the smart glasses. As yet another example and not by way of limitation, the rendering device 137 may comprise a VR/AR headset and the companion device 138 may comprise a smart phone.

In particular embodiments, a user may interact with the assistant system 140 using the rendering device 137 or the companion device 138, individually or in combination. In particular embodiments, one or more of the client system 130, the rendering device 137, and the companion device 138 may implement a multi-stage wake-word detection model to enable users to conveniently activate the assistant system 140 by continuously monitoring for one or more wake-words associated with assistant system 140. At a first stage of the wake-word detection model, the rendering device 137 may receive audio user input (e.g., frames of voice data). If a wireless connection between the rendering device 137 and the companion device 138 is available, the application on the rendering device 137 may communicate the received audio user input to the companion application on the companion device 138 via the wireless connection. At a second stage of the wake-word detection model, the companion application on the companion device 138 may process the received audio user input to detect a wake-word associated with the assistant system 140. The companion application on the companion device 138 may then communicate the detected wake-word to a server associated with the assistant system 140 via wireless network 110. At a third stage of the wake-word detection model, the server associated with the assistant system 140 may perform a keyword verification on the detected wake-word to verify whether the user intended to activate and receive assistance from the assistant system 140. In alternative embodiments, any of the processing, detection, or keyword verification may be performed by the rendering device 137 and/or the companion device 138. In particular embodiments, when the assistant system 140 has been activated by the user, an application on the rendering device 137 may be configured to receive user input from the user, and a companion application on the companion device 138 may be configured to handle user inputs (e.g., user requests) received by the application on the rendering device 137. In particular embodiments, the rendering device 137 and the companion device 138 may be associated with each other (i.e., paired) via one or more wireless communication protocols (e.g., Bluetooth).

The following example workflow illustrates how a rendering device 137 and a companion device 138 may handle a user input provided by a user. In this example, an application on the rendering device 137 may receive a user input comprising a user request directed to the rendering device 137. The application on the rendering device 137 may then determine a status of a wireless connection (i.e., tethering status) between the rendering device 137 and the companion device 138. If a wireless connection between the rendering device 137 and the companion device 138 is not available, the application on the rendering device 137 may communicate the user request (optionally including additional data and/or contextual information available to the rendering device 137) to the assistant system 140 via the network 110. The assistant system 140 may then generate a response to the user request and communicate the generated response back to the rendering device 137. The rendering device 137 may then present the response to the user in any suitable manner. Alternatively, if a wireless connection between the rendering device 137 and the companion device 138 is available, the application on the rendering device 137 may communicate the user request (optionally including additional data and/or contextual information available to the rendering device 137) to the companion application on the companion device 138 via the wireless connection. The companion application on the companion device 138 may then communicate the user request (optionally including additional data and/or contextual information available to the companion device 138) to the assistant system 140 via the network 110. The assistant system 140 may then generate a response to the user request and communicate the generated response back to the companion device 138. The companion application on the companion device 138 may then communicate the generated response to the application on the rendering device 137. The rendering device 137 may then present the response to the user in any suitable manner. In the preceding example workflow, the rendering device 137 and the companion device 138 may each perform one or more computations and/or processes at each respective step of the workflow. In particular embodiments, performance of the computations and/or processes disclosed herein may be adaptively switched between the rendering device 137 and the companion device 138 based at least in part on a device state of the rendering device 137 and/or the companion device 138, a task associated with the user input, and/or one or more additional factors. As an example and not by way of limitation, one factor may be signal strength of the wireless connection between the rendering device 137 and the companion device 138. For example, if the signal strength of the wireless connection between the rendering device 137 and the companion device 138 is strong, the computations and processes may be adaptively switched to be substantially performed by the companion device 138 in order to, for example, benefit from the greater processing power of the CPU of the companion device 138. Alternatively, if the signal strength of the wireless connection between the rendering device 137 and the companion device 138 is weak, the computations and processes may be adaptively switched to be substantially performed by the rendering device 137 in a standalone manner. In particular embodiments, if the client system 130 does not comprise a companion device 138, the aforementioned computations and processes may be performed solely by the rendering device 137 in a standalone manner.

In particular embodiments, an assistant system 140 may assist users with various assistant-related tasks. The assistant system 140 may interact with the social-networking system 160 and/or the third-party system 170 when executing these assistant-related tasks.

In particular embodiments, the social-networking system 160 may be a network-addressable computing system that can host an online social network. The social-networking system 160 may generate, store, receive, and send social-networking data, such as, for example, user profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132 or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. As an example and not by way of limitation, each server 162 may be a web server, a news server, a mail server, a message server, an advertising server, a file server, an application server, an exchange server, a database server, a proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, an assistant system 140, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes-which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects. In particular embodiments, a third-party content provider may use one or more third-party agents to provide content objects and/or services. A third-party agent may be an implementation that is hosted and executing on the third-party system 170.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow, for example, an assistant system 140 or a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a user input comprising a user request received from a client system 130. Authorization servers may be used to enforce one or more privacy settings of the users of the social-networking system 160. A privacy setting of a user may determine how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
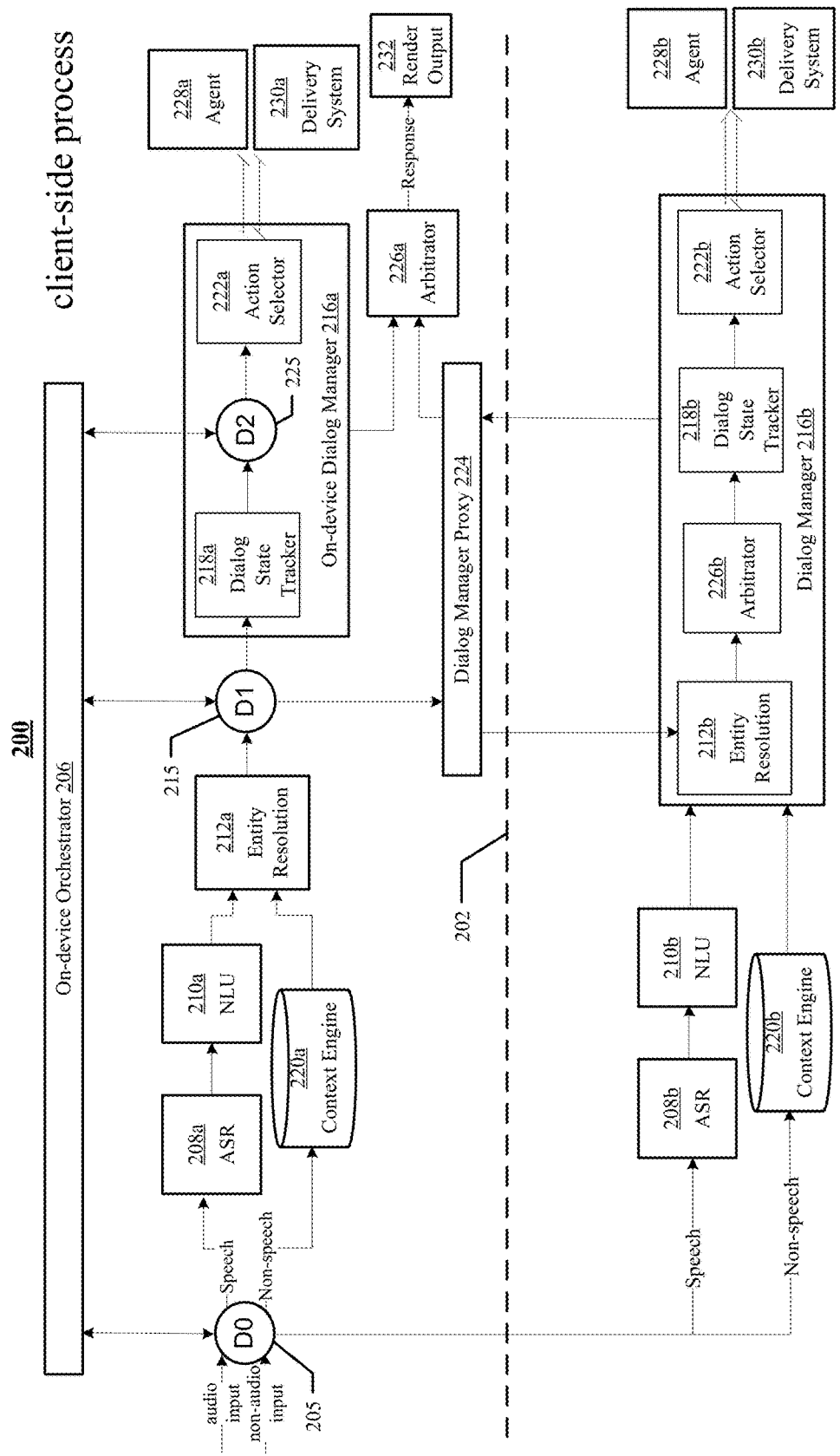
FIG. 2 illustrates an example architecture of the assistant system.

FIG. 2 illustrates an example architecture 200 of the assistant system 140. In particular embodiments, the assistant system 140 may assist a user to obtain information or services. The assistant system 140 may enable the user to interact with the assistant system 140 via user inputs of various modalities (e.g., audio, voice, text, vision, image, video, gesture, motion, activity, location, orientation) in stateful and multi-turn conversations to receive assistance from the assistant system 140. As an example and not by way of limitation, a user input may comprise an audio input based on the user's voice (e.g., a verbal command), which may be processed by a system audio API (application programming interface) on client system 130. The system audio API may perform techniques including echo cancellation, noise removal, beam forming, self-user voice activation, speaker identification, voice activity detection (VAD), and/or any other suitable acoustic technique in order to generate audio data that is readily processable by the assistant system 140. In particular embodiments, the assistant system 140 may support mono-modal inputs (e.g., only voice inputs), multi-modal inputs (e.g., voice inputs and text inputs), hybrid/multi-modal inputs, or any combination thereof. In particular embodiments, a user input may be a user-generated input that is sent to the assistant system 140 in a single turn. User inputs provided by a user may be associated with particular assistant-related tasks, and may include, for example, user requests (e.g., verbal requests for information or performance of an action), user interactions with the assistant application 136 associated with the assistant system 140 (e.g., selection of UI elements via touch or gesture), or any other type of suitable user input that may be detected and understood by the assistant system 140 (e.g., user movements detected by the client device 130 of the user).

In particular embodiments, the assistant system 140 may create and store a user profile comprising both personal and contextual information associated with the user. In particular embodiments, the assistant system 140 may analyze the user input using natural-language understanding (NLU) techniques. The analysis may be based at least in part on the user profile of the user for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation (NLG). Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute, without a user input, pre-authorized tasks that are relevant to user interests and preferences based on the user profile, at a time relevant for the user. In particular embodiments, the assistant system 140 may check privacy settings to ensure that accessing a user's profile or other user information and executing different tasks are permitted subject to the user's privacy settings. More information on assisting users subject to privacy settings may be found in U.S. patent application Ser. No. 16/182,542, filed 6 Nov. 2018, which is incorporated by reference.

In particular embodiments, the assistant system 140 may assist a user via an architecture built upon client-side processes and server-side processes which may operate in various operational modes. In FIG. 2, the client-side process is illustrated above the dashed line 202 whereas the server-side process is illustrated below the dashed line 202. A first operational mode (i.e., on-device mode) may be a workflow in which the assistant system 140 processes a user input and provides assistance to the user by primarily or exclusively performing client-side processes locally on the client system 130. For example, if the client system 130 is not connected to a network 110 (i.e., when client system 130 is offline), the assistant system 140 may handle a user input in the first operational mode utilizing only client-side processes. A second operational mode (i.e., cloud mode) may be a workflow in which the assistant system 140 processes a user input and provides assistance to the user by primarily or exclusively performing server-side processes on one or more remote servers (e.g., a server associated with assistant system 140). As illustrated in FIG. 2, a third operational mode (i.e., blended mode) may be a parallel workflow in which the assistant system 140 processes a user input and provides assistance to the user by performing client-side processes locally on the client system 130 in conjunction with server-side processes on one or more remote servers (e.g., a server associated with assistant system 140). For example, the client system 130 and the server associated with assistant system 140 may both perform automatic speech recognition (ASR) and natural-language understanding (NLU) processes, but the client system 130 may delegate dialog, agent, and natural-language generation (NLG) processes to be performed by the server associated with assistant system 140.

In particular embodiments, selection of an operational mode may be based at least in part on a device state, a task associated with a user input, and/or one or more additional factors. As an example and not by way of limitation, as described above, one factor may be a network connectivity status for client system 130. For example, if the client system 130 is not connected to a network 110 (i.e., when client system 130 is offline), the assistant system 140 may handle a user input in the first operational mode (i.e., on-device mode). As another example and not by way of limitation, another factor may be based on a measure of available battery power (i.e., battery status) for the client system 130. For example, if there is a need for client system 130 to conserve battery power (e.g., when client system 130 has minimal available battery power or the user has indicated a desire to conserve the battery power of the client system 130), the assistant system 140 may handle a user input in the second operational mode (i.e., cloud mode) or the third operational mode (i.e., blended mode) in order to perform fewer power-intensive operations on the client system 130. As yet another example and not by way of limitation, another factor may be one or more privacy constraints (e.g., specified privacy settings, applicable privacy policies). For example, if one or more privacy constraints limits or precludes particular data from being transmitted to a remote server (e.g., a server associated with the assistant system 140), the assistant system 140 may handle a user input in the first operational mode (i.e., on-device mode) in order to protect user privacy. As yet another example and not by way of limitation, another factor may be desynchronized context data between the client system 130 and a remote server (e.g., the server associated with assistant system 140). For example, the client system 130 and the server associated with assistant system 140 may be determined to have inconsistent, missing, and/or unreconciled context data, the assistant system 140 may handle a user input in the third operational mode (i.e., blended mode) to reduce the likelihood of an inadequate analysis associated with the user input. As yet another example and not by way of limitation, another factor may be a measure of latency for the connection between client system 130 and a remote server (e.g., the server associated with assistant system 140). For example, if a task associated with a user input may significantly benefit from and/or require prompt or immediate execution (e.g., photo capturing tasks), the assistant system 140 may handle the user input in the first operational mode (i.e., on-device mode) to ensure the task is performed in a timely manner. As yet another example and not by way of limitation, another factor may be, for a feature relevant to a task associated with a user input, whether the feature is only supported by a remote server (e.g., the server associated with assistant system 140). For example, if the relevant feature requires advanced technical functionality (e.g., high-powered processing capabilities, rapid update cycles) that is only supported by the server associated with assistant system 140 and is not supported by client system 130 at the time of the user input, the assistant system 140 may handle the user input in the second operational mode (i.e., cloud mode) or the third operational mode (i.e., blended mode) in order to benefit from the relevant feature.

In particular embodiments, an on-device orchestrator 206 on the client system 130 may coordinate receiving a user input and may determine, at one or more decision points in an example workflow, which of the operational modes described above should be used to process or continue processing the user input. As discussed above, selection of an operational mode may be based at least in part on a device state, a task associated with a user input, and/or one or more additional factors. As an example and not by way of limitation, with reference to the workflow architecture illustrated in FIG. 2, after a user input is received from a user, the on-device orchestrator 206 may determine, at decision point (DO) 205, whether to begin processing the user input in the first operational mode (i.e., on-device mode), the second operational mode (i.e., cloud mode), or the third operational mode (i.e., blended mode). For example, at decision point (DO) 205, the on-device orchestrator 206 may select the first operational mode (i.e., on-device mode) if the client system 130 is not connected to network 110 (i.e., when client system 130 is offline), if one or more privacy constraints expressly require on-device processing (e.g., adding or removing another person to a private call between users), or if the user input is associated with a task which does not require or benefit from server-side processing (e.g., setting an alarm or calling another user). As another example, at decision point (DO) 205, the on-device orchestrator 206 may select the second operational mode (i.e., cloud mode) or the third operational mode (i.e., blended mode) if the client system 130 has a need to conserve battery power (e.g., when client system 130 has minimal available battery power or the user has indicated a desire to conserve the battery power of the client system 130) or has a need to limit additional utilization of computing resources (e.g., when other processes operating on client device 130 require high CPU utilization (e.g., SMS messaging applications)).

In particular embodiments, if the on-device orchestrator 206 determines at decision point (DO) 205 that the user input should be processed using the first operational mode (i.e., on-device mode) or the third operational mode (i.e., blended mode), the client-side process may continue as illustrated in FIG. 2. As an example and not by way of limitation, if the user input comprises speech data, the speech data may be received at a local automatic speech recognition (ASR) module 208*a* on the client system 130. The ASR module 208*a* may allow a user to dictate and have speech transcribed as written text, have a document synthesized as an audio stream, or issue commands that are recognized as such by the system.

In particular embodiments, the output of the ASR module 208*a* may be sent to a local natural-language understanding (NLU) module 210*a*. The NLU module 210*a* may perform named entity resolution (NER), or named entity resolution may be performed by the entity resolution module 212*a*, as described below. In particular embodiments, one or more of an intent, a slot, or a domain may be an output of the NLU module 210*a*.

In particular embodiments, the user input may comprise non-speech data, which may be received at a local context engine 220*a*. As an example and not by way of limitation, the non-speech data may comprise locations, visuals, touch, gestures, world updates, social updates, contextual information, information related to people, activity data, and/or any other suitable type of non-speech data. The non-speech data may further comprise sensory data received by client system 130 sensors (e.g., microphone, camera), which may be accessed subject to privacy constraints and further analyzed by computer vision technologies. In particular embodiments, the computer vision technologies may comprise object detection, scene recognition, hand tracking, eye tracking, and/or any other suitable computer vision technologies. In particular embodiments, the non-speech data may be subject to geometric constructions, which may comprise constructing objects surrounding a user using any suitable type of data collected by a client system 130. As an example and not by way of limitation, a user may be wearing AR glasses, and geometric constructions may be utilized to determine spatial locations of surfaces and items (e.g., a floor, a wall, a user's hands). In particular embodiments, the non-speech data may be inertial data captured by AR glasses or a VR headset, and which may be data associated with linear and angular motions (e.g., measurements associated with a user's body movements). In particular embodiments, the context engine 220*a* may determine various types of events and context based on the non-speech data.

In particular embodiments, the outputs of the NLU module 210*a* and/or the context engine 220*a* may be sent to an entity resolution module 212*a*. The entity resolution module 212*a* may resolve entities associated with one or more slots output by NLU module 210*a*. In particular embodiments, each resolved entity may be associated with one or more entity identifiers. As an example and not by way of limitation, an identifier may comprise a unique user identifier (ID) corresponding to a particular user (e.g., a unique username or user ID number for the social-networking system 160). In particular embodiments, each resolved entity may also be associated with a confidence score. More information on resolving entities may be found in U.S. Pat. No. 10,803,050, filed 27 Jul. 2018, and U.S. patent application Ser. No. 16/048,072, filed 27 Jul. 2018, each of which is incorporated by reference.

In particular embodiments, at decision point (DO) 205, the on-device orchestrator 206 may determine that a user input should be handled in the second operational mode (i.e., cloud mode) or the third operational mode (i.e., blended mode). In these operational modes, the user input may be handled by certain server-side modules in a similar manner as the client-side process described above.

In particular embodiments, if the user input comprises speech data, the speech data of the user input may be received at a remote automatic speech recognition (ASR) module 208*b* on a remote server (e.g., the server associated with assistant system 140). The ASR module 208*b* may allow a user to dictate and have speech transcribed as written text, have a document synthesized as an audio stream, or issue commands that are recognized as such by the system.

In particular embodiments, the output of the ASR module 208*b* may be sent to a remote natural-language understanding (NLU) module 210*b*. In particular embodiments, the NLU module 210*b* may perform named entity resolution (NER) or named entity resolution may be performed by entity resolution module 212*b* of dialog manager module 216*b* as described below. In particular embodiments, one or more of an intent, a slot, or a domain may be an output of the NLU module 210*b*.

In particular embodiments, the user input may comprise non-speech data, which may be received at a remote context engine 220*b*. In particular embodiments, the remote context engine 220*b* may determine various types of events and context based on the non-speech data. In particular embodiments, the output of the NLU module 210*b* and/or the context engine 220*b* may be sent to a remote dialog manager 216*b*.

In particular embodiments, as discussed above, an on-device orchestrator 206 on the client system 130 may coordinate receiving a user input and may determine, at one or more decision points in an example workflow, which of the operational modes described above should be used to process or continue processing the user input. As further discussed above, selection of an operational mode may be based at least in part on a device state, a task associated with a user input, and/or one or more additional factors. As an example and not by way of limitation, with continued reference to the workflow architecture illustrated in FIG. 2, after the entity resolution module 212*a* generates an output or a null output, the on-device orchestrator 206 may determine, at decision point (D1) 215, whether to continue processing the user input in the first operational mode (i.e., on-device mode), the second operational mode (i.e., cloud mode), or the third operational mode (i.e., blended mode). For example, at decision point (D1) 215, the on-device orchestrator 206 may select the first operational mode (i.e., on-device mode) if an identified intent is associated with a latency sensitive processing task (e.g., taking a photo, pausing a stopwatch). As another example and not by way of limitation, if a messaging task is not supported by on-device processing on the client system 130, the on-device orchestrator 206 may select the third operational mode (i.e., blended mode) to process the user input associated with a messaging request. As yet another example, at decision point (D1) 215, the on-device orchestrator 206 may select the second operational mode (i.e., cloud mode) or the third operational mode (i.e., blended mode) if the task being processed requires access to a social graph, a knowledge graph, or a concept graph not stored on the client system 130. Alternatively, the on-device orchestrator 206 may instead select the first operational mode (i.e., on-device mode) if a sufficient version of an informational graph including requisite information for the task exists on the client system 130 (e.g., a smaller and/or bootstrapped version of a knowledge graph).

In particular embodiments, if the on-device orchestrator 206 determines at decision point (D1) 215 that processing should continue using the first operational mode (i.e., on-device mode) or the third operational mode (i.e., blended mode), the client-side process may continue as illustrated in FIG. 2. As an example and not by way of limitation, the output from the entity resolution module 212*a* may be sent to an on-device dialog manager 216*a*. In particular embodiments, the on-device dialog manager 216*a* may comprise a dialog state tracker 218*a* and an action selector 222*a*. The on-device dialog manager 216*a* may have complex dialog logic and product-related business logic to manage the dialog state and flow of the conversation between the user and the assistant system 140. The on-device dialog manager 216*a* may include full functionality for end-to-end integration and multi-turn support (e.g., confirmation, disambiguation). The on-device dialog manager 216*a* may also be lightweight with respect to computing limitations and resources including memory, computation (CPU), and binary size constraints. The on-device dialog manager 216*a* may also be scalable to improve developer experience. In particular embodiments, the on-device dialog manager 216*a* may benefit the assistant system 140, for example, by providing offline support to alleviate network connectivity issues (e.g., unstable or unavailable network connections), by using client-side processes to prevent privacy-sensitive information from being transmitted off of client system 130, and by providing a stable user experience in high-latency sensitive scenarios.

In particular embodiments, the on-device dialog manager 216*a* may further conduct false trigger mitigation. Implementation of false trigger mitigation may detect and prevent false triggers from user inputs which would otherwise invoke the assistant system 140 (e.g., an unintended wake-word) and may further prevent the assistant system 140 from generating data records based on the false trigger that may be inaccurate and/or subject to privacy constraints. As an example and not by way of limitation, if a user is in a voice call, the user's conversation during the voice call may be considered private, and the false trigger mitigation may limit detection of wake-words to audio user inputs received locally by the user's client system 130. In particular embodiments, the on-device dialog manager 216*a* may implement false trigger mitigation based on a nonsense detector. If the nonsense detector determines with a high confidence that a received wake-word is not logically and/or contextually sensible at the point in time at which it was received from the user, the on-device dialog manager 216*a* may determine that the user did not intend to invoke the assistant system 140.

In particular embodiments, due to a limited computing power of the client system 130, the on-device dialog manager 216*a* may conduct on-device learning based on learning algorithms particularly tailored for client system 130. As an example and not by way of limitation, federated learning techniques may be implemented by the on-device dialog manager 216*a*. Federated learning is a specific category of distributed machine learning techniques which may train machine-learning models using decentralized data stored on end devices (e.g., mobile phones). In particular embodiments, the on-device dialog manager 216*a* may use federated user representation learning model to extend existing neural-network personalization techniques to implementation of federated learning by the on-device dialog manager 216*a*. Federated user representation learning may personalize federated learning models by learning task-specific user representations (i.e., embeddings) and/or by personalizing model weights. Federated user representation learning is a simple, scalable, privacy-preserving, and resource-efficient. Federated user representation learning may divide model parameters into federated and private parameters. Private parameters, such as private user embeddings, may be trained locally on a client system 130 instead of being transferred to or averaged by a remote server (e.g., the server associated with assistant system 140). Federated parameters, by contrast, may be trained remotely on the server. In particular embodiments, the on-device dialog manager 216*a* may use an active federated learning model, which may transmit a global model trained on the remote server to client systems 130 and calculate gradients locally on the client systems 130. Active federated learning may enable the on-device dialog manager 216*a* to minimize the transmission costs associated with downloading models and uploading gradients. For active federated learning, in each round, client systems 130 may be selected in a semi-random manner based at least in part on a probability conditioned on the current model and the data on the client systems 130 in order to optimize efficiency for training the federated learning model.

In particular embodiments, the dialog state tracker 218*a* may track state changes over time as a user interacts with the world and the assistant system 140 interacts with the user. As an example and not by way of limitation, the dialog state tracker 218*a* may track, for example, what the user is talking about, whom the user is with, where the user is, what tasks are currently in progress, and where the user's gaze is at subject to applicable privacy policies.

In particular embodiments, at decision point (D1) 215, the on-device orchestrator 206 may determine to forward the user input to the server for either the second operational mode (i.e., cloud mode) or the third operational mode (i.e., blended mode). As an example and not by way of limitation, if particular functionalities or processes (e.g., messaging) are not supported by on the client system 130, the on-device orchestrator 206 may determine at decision point (D1) 215 to use the third operational mode (i.e., blended mode). In particular embodiments, the on-device orchestrator 206 may cause the outputs from the NLU module 210*a*, the context engine 220*a*, and the entity resolution module 212*a*, via a dialog manager proxy 224, to be forwarded to an entity resolution module 212*b* of the remote dialog manager 216*b* to continue the processing. The dialog manager proxy 224 may be a communication channel for information/events exchange between the client system 130 and the server. In particular embodiments, the dialog manager 216*b* may additionally comprise a remote arbitrator 226*b*, a remote dialog state tracker 218*b*, and a remote action selector 222*b*. In particular embodiments, the assistant system 140 may have started processing a user input with the second operational mode (i.e., cloud mode) at decision point (DO) 205 and the on-device orchestrator 206 may determine to continue processing the user input based on the second operational mode (i.e., cloud mode) at decision point (D1) 215. Accordingly, the output from the NLU module 210b and the context engine 220b may be received at the remote entity resolution module 212b. The remote entity resolution module 212b may have similar functionality as the local entity resolution module 212a, which may comprise resolving entities associated with the slots. In particular embodiments, the entity resolution module 212b may access one or more of the social graph, the knowledge graph, or the concept graph when resolving the entities. The output from the entity resolution module 212b may be received at the arbitrator 226b.

In particular embodiments, the remote arbitrator 226b may be responsible for choosing between client-side and server-side upstream results (e.g., results from the NLU module 210a/b, results from the entity resolution module 212a/b, and results from the context engine 220a/b). The arbitrator 226b may send the selected upstream results to the remote dialog state tracker 218b. In particular embodiments, similarly to the local dialog state tracker 218a, the remote dialog state tracker 218b may convert the upstream results into candidate tasks using task specifications and resolve arguments with entity resolution.

In particular embodiments, at decision point (D2) 225, the on-device orchestrator 206 may determine whether to continue processing the user input based on the first operational mode (i.e., on-device mode) or forward the user input to the server for the third operational mode (i.e., blended mode). The decision may depend on, for example, whether the client-side process is able to resolve the task and slots successfully, whether there is a valid task policy with a specific feature support, and/or the context differences between the client-side process and the server-side process. In particular embodiments, decisions made at decision point (D2) 225 may be for multi-turn scenarios. In particular embodiments, there may be at least two possible scenarios. In a first scenario, the assistant system 140 may have started processing a user input in the first operational mode (i.e., on-device mode) using client-side dialog state. If at some point the assistant system 140 decides to switch to having the remote server process the user input, the assistant system 140 may create a programmatic/predefined task with the current task state and forward it to the remote server. For subsequent turns, the assistant system 140 may continue processing in the third operational mode (i.e., blended mode) using the server-side dialog state. In another scenario, the assistant system 140 may have started processing the user input in either the second operational mode (i.e., cloud mode) or the third operational mode (i.e., blended mode) and may substantially rely on server-side dialog state for all subsequent turns. If the on-device orchestrator 206 determines to continue processing the user input based on the first operational mode (i.e., on-device mode), the output from the dialog state tracker 218a may be received at the action selector 222a.

In particular embodiments, at decision point (D2) 225, the on-device orchestrator 206 may determine to forward the user input to the remote server and continue processing the user input in either the second operational mode (i.e., cloud mode) or the third operational mode (i.e., blended mode). The assistant system 140 may create a programmatic/predefined task with the current task state and forward it to the server, which may be received at the action selector 222b. In particular embodiments, the assistant system 140 may have started processing the user input in the second operational mode (i.e., cloud mode), and the on-device orchestrator 206 may determine to continue processing the user input in the second operational mode (i.e., cloud mode) at decision point (D2) 225. Accordingly, the output from the dialog state tracker 218b may be received at the action selector 222b.

In particular embodiments, the action selector 222a/b may perform interaction management. The action selector 222a/b may determine and trigger a set of general executable actions. The actions may be executed either on the client system 130 or at the remote server. As an example and not by way of limitation, these actions may include providing information or suggestions to the user. In particular embodiments, the actions may interact with agents 228a/b, users, and/or the assistant system 140 itself. These actions may comprise actions including one or more of a slot request, a confirmation, a disambiguation, or an agent execution. The actions may be independent of the underlying implementation of the action selector 222a/b. For more complicated scenarios such as, for example, multi-turn tasks or tasks with complex business logic, the local action selector 222a may call one or more local agents 228a, and the remote action selector 222b may call one or more remote agents 228b to execute the actions. Agents 228a/b may be invoked via task ID, and any actions may be routed to the correct agent 228a/b using that task ID. In particular embodiments, an agent 228a/b may be configured to serve as a broker across a plurality of content providers for one domain. A content provider may be an entity responsible for carrying out an action associated with an intent or completing a task associated with the intent. In particular embodiments, agents 228a/b may provide several functionalities for the assistant system 140 including, for example, native template generation, task specific business logic, and querying external APIs. When executing actions for a task, agents 228a/b may use context from the dialog state tracker 218a/b, and may also update the dialog state tracker 218a/b. In particular embodiments, agents 228a/b may also generate partial payloads from a dialog act.

In particular embodiments, the local agents 228a may have different implementations to be compiled/registered for different platforms (e.g., smart glasses versus a VR headset). In particular embodiments, multiple device-specific implementations (e.g., real-time calls for a client system 130 or a messaging application on the client system 130) may be handled internally by a single agent 228a. Alternatively, device-specific implementations may be handled by multiple agents 228a associated with multiple domains. As an example and not by way of limitation, calling an agent 228a on smart glasses may be implemented in a different manner than calling an agent 228a on a smart phone. Different platforms may also utilize varying numbers of agents 228a. The agents 228a may also be cross-platform (i.e., different operating systems on the client system 130). In addition, the agents 228a may have minimized startup time or binary size impact. Local agents 228a may be suitable for particular use cases. As an example and not by way of limitation, one use case may be emergency calling on the client system 130. As another example and not by way of limitation, another use case may be responding to a user input without network connectivity. As yet another example and not by way of limitation, another use case may be that particular domains/tasks may be privacy sensitive and may prohibit user inputs being sent to the remote server.

In particular embodiments, the local action selector 222a may call a local delivery system 230a for executing the actions, and the remote action selector 222b may call a remote delivery system 230b for executing the actions. The delivery system 230a/b may deliver a predefined event upon receiving triggering signals from the dialog state tracker 218a/b by executing corresponding actions. The delivery system 230a/b may ensure that events get delivered to a host with a living connection. As an example and not by way of limitation, the delivery system 230a/b may broadcast to all online devices that belong to one user. As another example and not by way of limitation, the delivery system 230a/b may deliver events to target-specific devices. The delivery system 230a/b may further render a payload using up-to-date device context.

In particular embodiments, the on-device dialog manager 216a may additionally comprise a separate local action execution module, and the remote dialog manager 216b may additionally comprise a separate remote action execution module. The local execution module and the remote action execution module may have similar functionality. In particular embodiments, the action execution module may call the agents 228a/b to execute tasks. The action execution module may additionally perform a set of general executable actions determined by the action selector 222a/b. The set of executable actions may interact with agents 228a/b, users, and the assistant system 140 itself via the delivery system 230a/b.

In particular embodiments, if the user input is handled using the first operational mode (i.e., on-device mode), results from the agents 228a and/or the delivery system 230a may be returned to the on-device dialog manager 216a. The on-device dialog manager 216a may then instruct a local arbitrator 226a to generate a final response based on these results. The arbitrator 226a may aggregate the results and evaluate them. As an example and not by way of limitation, the arbitrator 226a may rank and select a best result for responding to the user input. If the user request is handled in the second operational mode (i.e., cloud mode), the results from the agents 228b and/or the delivery system 230b may be returned to the remote dialog manager 216b. The remote dialog manager 216b may instruct, via the dialog manager proxy 224, the arbitrator 226a to generate the final response based on these results. Similarly, the arbitrator 226a may analyze the results and select the best result to provide to the user. If the user input is handled based on the third operational mode (i.e., blended mode), the client-side results and server-side results (e.g., from agents 228a/b and/or delivery system 230a/b) may both be provided to the arbitrator 226a by the on-device dialog manager 216a and remote dialog manager 216b, respectively. The arbitrator 226 may then choose between the client-side and server-side side results to determine the final result to be presented to the user. In particular embodiments, the logic to decide between these results may depend on the specific use-case.

In particular embodiments, the local arbitrator 226a may generate a response based on the final result and send it to a render output module 232. The render output module 232 may determine how to render the output in a way that is suitable for the client system 130. As an example and not by way of limitation, for a VR headset or AR smart glasses, the render output module 232 may determine to render the output using a visual-based modality (e.g., an image or a video clip) that may be displayed via the VR headset or AR smart glasses. As another example, the response may be rendered as audio signals that may be played by the user via a VR headset or AR smart glasses. As yet another example, the response may be rendered as augmented-reality data for enhancing user experience.

In particular embodiments, in addition to determining an operational mode to process the user input, the on-device orchestrator 206 may also determine whether to process the user input on the rendering device 137, process the user input on the companion device 138, or process the user request on the remote server. The rendering device 137 and/or the companion device 138 may each use the assistant stack in a similar manner as disclosed above to process the user input. As an example and not by, the on-device orchestrator 206 may determine that part of the processing should be done on the rendering device 137, part of the processing should be done on the companion device 138, and the remaining processing should be done on the remote server.

In particular embodiments, the assistant system 140 may have a variety of capabilities including audio cognition, visual cognition, signals intelligence, reasoning, and memories. In particular embodiments, the capability of audio cognition may enable the assistant system 140 to, for example, understand a user's input associated with various domains in different languages, understand and summarize a conversation, perform on-device audio cognition for complex commands, identify a user by voice, extract topics from a conversation and auto-tag sections of the conversation, enable audio interaction without a wake-word, filter and amplify user voice from ambient noise and conversations, and/or understand which client system 130 a user is talking to if multiple client systems 130 are in vicinity.

In particular embodiments, the capability of visual cognition may enable the assistant system 140 to, for example, recognize interesting objects in the world through a combination of existing machine-learning models and one-shot learning, recognize an interesting moment and auto-capture it, achieve semantic understanding over multiple visual frames across different episodes of time, provide platform support for additional capabilities in places or objects recognition, recognize a full set of settings and micro-locations including personalized locations, recognize complex activities, recognize complex gestures to control a client system 130, handle images/videos from egocentric cameras (e.g., with motion, capture angles, resolution), accomplish similar levels of accuracy and speed regarding images with lower resolution, conduct one-shot registration and recognition of places and objects, and/or perform visual recognition on a client system 130.

In particular embodiments, the assistant system 140 may leverage computer vision techniques to achieve visual cognition. Besides computer vision techniques, the assistant system 140 may explore options that may supplement these techniques to scale up the recognition of objects. In particular embodiments, the assistant system 140 may use supplemental signals such as, for example, optical character recognition (OCR) of an object's labels, GPS signals for places recognition, and/or signals from a user's client system 130 to identify the user. In particular embodiments, the assistant system 140 may perform general scene recognition (e.g., home, work, public spaces) to set a context for the user and reduce the computer-vision search space to identify likely objects or people. In particular embodiments, the assistant system 140 may guide users to train the assistant system 140. For example, crowdsourcing may be used to get users to tag objects and help the assistant system 140 recognize more objects over time. As another example, users may register their personal objects as part of an initial setup when using the assistant system 140. The assistant system 140 may further allow users to provide positive/negative signals for objects they interact with to train and improve personalized models for them.

In particular embodiments, the capability of signals intelligence may enable the assistant system 140 to, for example, determine user location, understand date/time, determine family locations, understand users' calendars and future desired locations, integrate richer sound understanding to identify setting/context through sound alone, and/or build signals intelligence models at runtime which may be personalized to a user's individual routines.

In particular embodiments, the capability of reasoning may enable the assistant system 140 to, for example, pick up previous conversation threads at any point in the future, synthesize all signals to understand micro and personalized context, learn interaction patterns and preferences from users' historical behavior and accurately suggest interactions that they may value, generate highly predictive proactive suggestions based on micro-context understanding, understand what content a user may want to see at what time of a day, and/or understand the changes in a scene and how that may impact the user's desired content.

In particular embodiments, the capabilities of memories may enable the assistant system 140 to, for example, remember which social connections a user previously called or interacted with, write into memory and query memory at will (i.e., open dictation and auto tags), extract richer preferences based on prior interactions and long-term learning, remember a user's life history, extract rich information from egocentric streams of data and auto catalog, and/or write to memory in structured form to form rich short, episodic and long-term memories.

Figure 3:
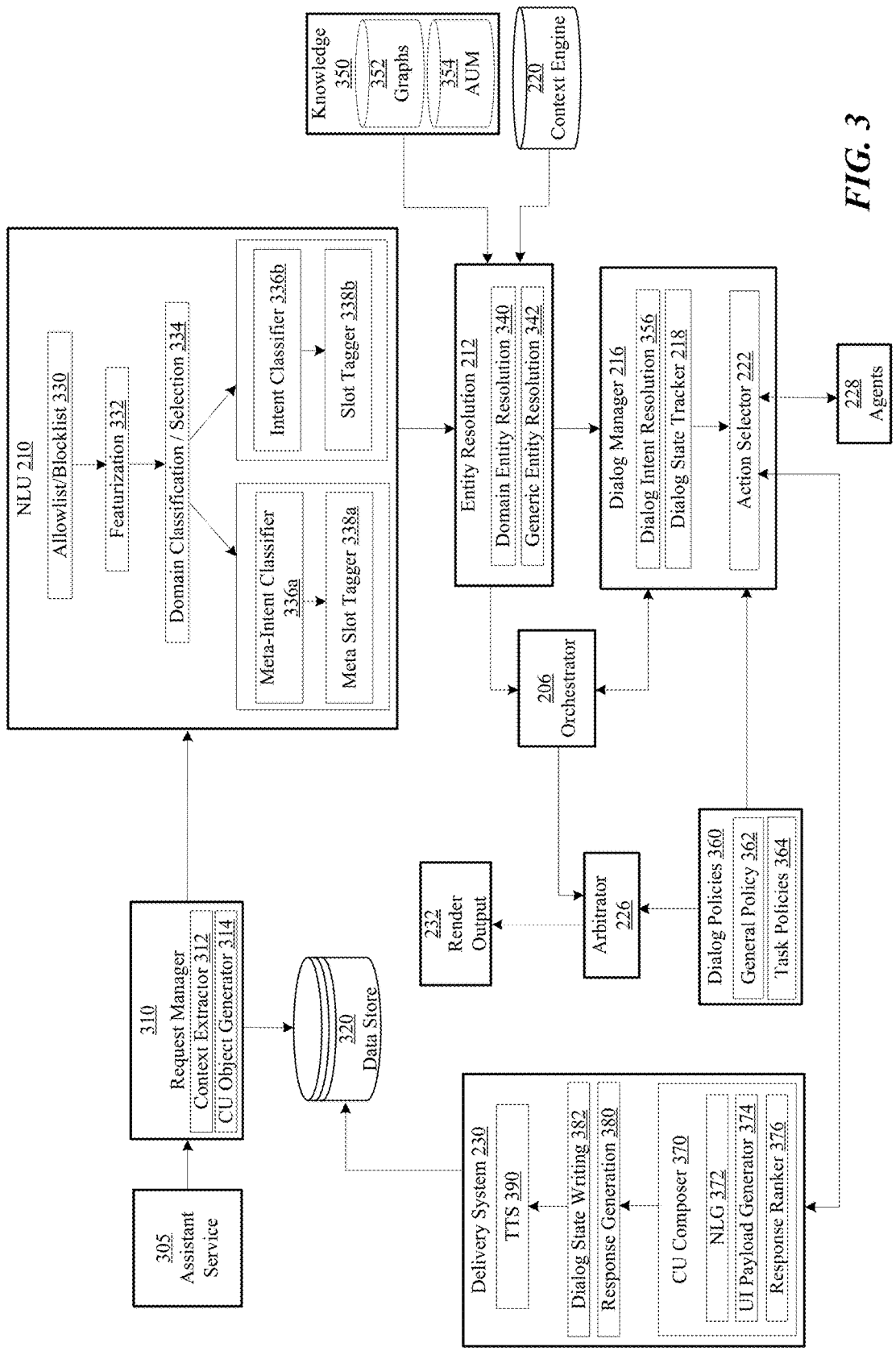
FIG. 3 illustrates an example flow diagram of the assistant system.

FIG. 3 illustrates an example flow diagram 300 of the assistant system 140. In particular embodiments, an assistant service module 305 may access a request manager 310 upon receiving a user input. In particular embodiments, the request manager 310 may comprise a context extractor 312 and a conversational understanding object generator (CU object generator) 314. The context extractor 312 may extract contextual information associated with the user input. The context extractor 312 may also update contextual information based on the assistant application 136 executing on the client system 130. As an example and not by way of limitation, the update of contextual information may comprise content items are displayed on the client system 130. As another example and not by way of limitation, the update of contextual information may comprise whether an alarm is set on the client system 130. As another example and not by way of limitation, the update of contextual information may comprise whether a song is playing on the client system 130. The CU object generator 314 may generate particular CU objects relevant to the user input. The CU objects may comprise dialog-session data and features associated with the user input, which may be shared with all the modules of the assistant system 140. In particular embodiments, the request manager 310 may store the contextual information and the generated CU objects in a data store 320 which is a particular data store implemented in the assistant system 140.

In particular embodiments, the request manger 310 may send the generated CU objects to the NLU module 210. The NLU module 210 may perform a plurality of steps to process the CU objects. The NLU module 210 may first run the CU objects through an allowlist/blocklist 330. In particular embodiments, the allowlist/blocklist 330 may comprise interpretation data matching the user input. The NLU module 210 may then perform a featurization 332 of the CU objects. The NLU module 210 may then perform domain classification/selection 334 on user input based on the features resulted from the featurization 332 to classify the user input into predefined domains. In particular embodiments, a domain may denote a social context of interaction (e.g., education), or a namespace for a set of intents (e.g., music). The domain classification/selection results may be further processed based on two related procedures. In one procedure, the NLU module 210 may process the domain classification/selection results using a meta-intent classifier 336a. The meta-intent classifier 336a may determine categories that describe the user's intent. An intent may be an element in a pre-defined taxonomy of semantic intentions, which may indicate a purpose of a user interaction with the assistant system 140. The NLU module 210a may classify a user input into a member of the pre-defined taxonomy. For example, the user input may be "Play Beethoven's 5th," and the NLU module 210a may classify the input as having the intent [IN:play_music]. In particular embodiments, intents that are common to multiple domains may be processed by the meta-intent classifier 336a. As an example and not by way of limitation, the meta-intent classifier 336a may be based on a machine-learning model that may take the domain classification/selection results as input and calculate a probability of the input being associated with a particular predefined meta-intent. The NLU module 210 may then use a meta slot tagger 338a to annotate one or more meta slots for the classification result from the meta-intent classifier 336a. A slot may be a named sub-string corresponding to a character string within the user input representing a basic semantic entity. For example, a slot for "pizza" may be [SL:dish]. In particular embodiments, a set of valid or expected named slots may be conditioned on the classified intent. As an example and not by way of limitation, for the intent [IN:play_music], a valid slot may be [SL:song_name]. In particular embodiments, the meta slot tagger 338a may tag generic slots such as references to items (e.g., the first), the type of slot, the value of the slot, etc. In particular embodiments, the NLU module 210 may process the domain classification/selection results using an intent classifier 336b. The intent classifier 336b may determine the user's intent associated with the user input. In particular embodiments, there may be one intent classifier 336b for each domain to determine the most possible intents in a given domain. As an example and not by way of limitation, the intent classifier 336b may be based on a machine-learning model that may take the domain classification/selection results as input and calculate a probability of the input being associated with a particular predefined intent. The NLU module 210 may then use a slot tagger 338b to annotate one or more slots associated with the user input. In particular embodiments, the slot tagger 338b may annotate the one or more slots for the n-grams of the user input. As an example and not by way of limitation, a user input may comprise "change 500 dollars in my account to Japanese yen." The intent classifier 336b may take the user input as input and formulate it into a vector. The intent classifier 336b may then calculate probabilities of the user input being associated with different predefined intents based on a vector comparison between the vector representing the user input and the vectors representing different predefined intents. In a similar manner, the slot tagger 338b may take the user input as input and formulate each word into a vector. The slot tagger 338b may then calculate probabilities of each word being associated with different predefined slots based on a vector comparison between the vector representing the word and the vectors representing different predefined slots. The intent of the user may be classified as "changing money". The slots of the user input may comprise "500", "dollars", "account", and "Japanese yen". The meta-intent of the user may be classified as "financial service". The meta slot may comprise "finance".

In particular embodiments, the natural-language understanding (NLU) module 210 may additionally extract information from one or more of a social graph, a knowledge graph, or a concept graph, and may retrieve a user's profile stored locally on the client system 130. The NLU module 210 may additionally consider contextual information when analyzing the user input. The NLU module 210 may further process information from these different sources by identifying and aggregating information, annotating n-grams of the user input, ranking the n-grams with confidence scores based on the aggregated information, and formulating the ranked n-grams into features that may be used by the NLU module 210 for understanding the user input. In particular embodiments, the NLU module 210 may identify one or more of a domain, an intent, or a slot from the user input in a personalized and context-aware manner. As an example and not by way of limitation, a user input may comprise "show me how to get to the coffee shop." The NLU module 210 may identify a particular coffee shop that the user wants to go to based on the user's personal information and the associated contextual information. In particular embodiments, the NLU module 210 may comprise a lexicon of a particular language, a parser, and grammar rules to partition sentences into an internal representation. The NLU module 210 may also comprise one or more programs that perform naive semantics or stochastic semantic analysis, and may further use pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding (NLU) may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the output of the NLU module 210 may be sent to the entity resolution module 212 to resolve relevant entities. Entities may include, for example, unique users or concepts, each of which may have a unique identifier (ID). The entities may include one or more of a real-world entity (from general knowledge base), a user entity (from user memory), a contextual entity (device context/dialog context), or a value resolution (numbers, datetime, etc.). In particular embodiments, the entity resolution module 212 may comprise domain entity resolution 340 and generic entity resolution 342. The entity resolution module 212 may execute generic and domain-specific entity resolution. The generic entity resolution 342 may resolve the entities by categorizing the slots and meta slots into different generic topics. The domain entity resolution 340 may resolve the entities by categorizing the slots and meta slots into different domains. As an example and not by way of limitation, in response to the input of an inquiry of the advantages of a particular brand of electric car, the generic entity resolution 342 may resolve the referenced brand of electric car as vehicle and the domain entity resolution 340 may resolve the referenced brand of electric car as electric car.

In particular embodiments, entities may be resolved based on knowledge 350 about the world and the user. The assistant system 140 may extract ontology data from the graphs 352. As an example and not by way of limitation, the graphs 352 may comprise one or more of a knowledge graph, a social graph, or a concept graph. The ontology data may comprise the structural relationship between different slots/meta-slots and domains. The ontology data may also comprise information of how the slots/meta-slots may be grouped, related within a hierarchy where the higher level comprises the domain, and subdivided according to similarities and differences. For example, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability and/or a semantic weight. A confidence probability for an attribute value represents a probability that the value is accurate for the given attribute. A semantic weight for an attribute value may represent how the value semantically appropriate for the given attribute considering all the available information. For example, the knowledge graph may comprise an entity of a book titled "BookName", which may include information extracted from multiple content sources (e.g., an online social network, online encyclopedias, book review sources, media databases, and entertainment content sources), which may be deduped, resolved, and fused to generate the single unique record for the knowledge graph. In this example, the entity titled "BookName" may be associated with a "fantasy" attribute value for a "genre" entity attribute. More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference.

In particular embodiments, the assistant user memory (AUM) 354 may comprise user episodic memories which help determine how to assist a user more effectively. The AUM 354 may be the central place for storing, retrieving, indexing, and searching over user data. As an example and not by way of limitation, the AUM 354 may store information such as contacts, photos, reminders, etc. Additionally, the AUM 354 may automatically synchronize data to the server and other devices (only for non-sensitive data). As an example and not by way of limitation, if the user sets a nickname for a contact on one device, all devices may synchronize and get that nickname based on the AUM 354. In particular embodiments, the AUM 354 may first prepare events, user sate, reminder, and trigger state for storing in a data store. Memory node identifiers (ID) may be created to store entry objects in the AUM 354, where an entry may be some piece of information about the user (e.g., photo, reminder, etc.) As an example and not by way of limitation, the first few bits of the memory node ID may indicate that this is a memory node ID type, the next bits may be the user ID, and the next bits may be the time of creation. The AUM 354 may then index these data for retrieval as needed. Index ID may be created for such purpose. In particular embodiments, given an "index key" (e.g., PHOTO_LOCATION) and "index value" (e.g., "San Francisco"), the AUM 354 may get a list of memory IDs that have that attribute (e.g., photos in San Francisco). As an example and not by way of limitation, the first few bits may indicate this is an index ID type, the next bits may be the user ID, and the next bits may encode an "index key" and "index value". The AUM 354 may further conduct information retrieval with a flexible query language. Relation index ID may be created for such purpose. In particular embodiments, given a source memory node and an edge type, the AUM 354 may get memory IDs of all target nodes with that type of outgoing edge from the source. As an example and not by way of limitation, the first few bits may indicate this is a relation index ID type, the next bits may be the user ID, and the next bits may be a source node ID and edge type. In particular embodiments, the AUM 354 may help detect concurrent updates of different events. More information on episodic memories may be found in U.S. patent application Ser. No. 16/552,559, filed 27 Aug. 2019, which is incorporated by reference.

In particular embodiments, the entity resolution module 212 may use different techniques to resolve different types of entities. For real-world entities, the entity resolution module 212 may use a knowledge graph to resolve the span to the entities, such as "music track", "movie", etc. For user entities, the entity resolution module 212 may use user memory or some agents to resolve the span to user-specific entities, such as "contact", "reminders", or "relationship". For contextual entities, the entity resolution module 212 may perform coreference based on information from the context engine 220 to resolve the references to entities in the context, such as "him", "her", "the first one", or "the last one". In particular embodiments, for coreference, the entity resolution module 212 may create references for entities determined by the NLU module 210. The entity resolution module 212 may then resolve these references accurately. As an example and not by way of limitation, a user input may comprise "find me the nearest grocery store and direct me there". Based on coreference, the entity resolution module 212 may interpret "there" as "the nearest grocery store". In particular embodiments, coreference may depend on the information from the context engine 220 and the dialog manager 216 so as to interpret references with improved accuracy. In particular embodiments, the entity resolution module 212 may additionally resolve an entity under the context (device context or dialog context), such as, for example, the entity shown on the screen or an entity from the last conversation history. For value resolutions, the entity resolution module 212 may resolve the mention to exact value in standardized form, such as numerical value, date time, address, etc.

In particular embodiments, the entity resolution module 212 may first perform a check on applicable privacy constraints in order to guarantee that performing entity resolution does not violate any applicable privacy policies. As an example and not by way of limitation, an entity to be resolved may be another user who specifies in their privacy settings that their identity should not be searchable on the online social network. In this case, the entity resolution module 212 may refrain from returning that user's entity identifier in response to a user input. By utilizing the described information obtained from the social graph, the knowledge graph, the concept graph, and the user profile, and by complying with any applicable privacy policies, the entity resolution module 212 may resolve entities associated with a user input in a personalized, context-aware, and privacy-protected manner.

In particular embodiments, the entity resolution module 212 may work with the ASR module 208 to perform entity resolution. The following example illustrates how the entity resolution module 212 may resolve an entity name. The entity resolution module 212 may first expand names associated with a user into their respective normalized text forms as phonetic consonant representations which may be phonetically transcribed using a double metaphone algorithm. The entity resolution module 212 may then determine an n-best set of candidate transcriptions and perform a parallel comprehension process on all of the phonetic transcriptions in the n-best set of candidate transcriptions. In particular embodiments, each transcription that resolves to the same intent may then be collapsed into a single intent. Each intent may then be assigned a score corresponding to the highest scoring candidate transcription for that intent. During the collapse, the entity resolution module 212 may identify various possible text transcriptions associated with each slot, correlated by boundary timing offsets associated with the slot's transcription. The entity resolution module 212 may then extract a subset of possible candidate transcriptions for each slot from a plurality (e.g., 1000) of candidate transcriptions, regardless of whether they are classified to the same intent. In this manner, the slots and intents may be scored lists of phrases. In particular embodiments, a new or running task capable of handling the intent may be identified and provided with the intent (e.g., a message composition task for an intent to send a message to another user). The identified task may then trigger the entity resolution module 212 by providing it with the scored lists of phrases associated with one of its slots and the categories against which it should be resolved. As an example and not by way of limitation, if an entity attribute is specified as "friend," the entity resolution module 212 may run every candidate list of terms through the same expansion that may be run at matcher compilation time. Each candidate expansion of the terms may be matched in the precompiled trie matching structure. Matches may be scored using a function based at least in part on the transcribed input, matched form, and friend name. As another example and not by way of limitation, if an entity attribute is specified as "celebrity/notable person," the entity resolution module 212 may perform parallel searches against the knowledge graph for each candidate set of terms for the slot output from the ASR module 208. The entity resolution module 212 may score matches based on matched person popularity and ASR-provided score signal. In particular embodiments, when the memory category is specified, the entity resolution module 212 may perform the same search against user memory. The entity resolution module 212 may crawl backward through user memory and attempt to match each memory (e.g., person recently mentioned in conversation, or seen and recognized via visual signals, etc.). For each entity, the entity resolution module 212 may employ matching similarly to how friends are matched (i.e., phonetic). In particular embodiments, scoring may comprise a temporal decay factor associated with a recency with which the name was previously mentioned. The entity resolution module 212 may further combine, sort, and dedupe all matches. In particular embodiments, the task may receive the set of candidates. When multiple high scoring candidates are present, the entity resolution module 212 may perform user-facilitated disambiguation (e.g., getting real-time user feedback from users on these candidates).

In particular embodiments, the context engine 220 may help the entity resolution module 212 improve entity resolution. The context engine 220 may comprise offline aggregators and an online inference service. The offline aggregators may process a plurality of data associated with the user that are collected from a prior time window. As an example and not by way of limitation, the data may include news feed posts/comments, interactions with news feed posts/comments, search history, etc., that are collected during a predetermined timeframe (e.g., from a prior 90-day window). The processing result may be stored in the context engine 220 as part of the user profile. The user profile of the user may comprise user profile data including demographic information, social information, and contextual information associated with the user. The user profile data may also include user interests and preferences on a plurality of topics, aggregated through conversations on news feed, search logs, messaging platforms, etc. The usage of a user profile may be subject to privacy constraints to ensure that a user's information can be used only for his/her benefit, and not shared with anyone else. More information on user profiles may be found in U.S. patent application Ser. No. 15/967,239, filed 30 Apr. 2018, which is incorporated by reference. In particular embodiments, the online inference service may analyze the conversational data associated with the user that are received by the assistant system 140 at a current time. The analysis result may be stored in the context engine 220 also as part of the user profile. In particular embodiments, both the offline aggregators and online inference service may extract personalization features from the plurality of data. The extracted personalization features may be used by other modules of the assistant system 140 to better understand user input. In particular embodiments, the entity resolution module 212 may process the information from the context engine 220 (e.g., a user profile) in the following steps based on natural-language processing (NLP). In particular embodiments, the entity resolution module 212 may tokenize text by text normalization, extract syntax features from text, and extract semantic features from text based on NLP. The entity resolution module 212 may additionally extract features from contextual information, which is accessed from dialog history between a user and the assistant system 140. The entity resolution module 212 may further conduct global word embedding, domain-specific embedding, and/or dynamic embedding based on the contextual information. The processing result may be annotated with entities by an entity tagger. Based on the annotations, the entity resolution module 212 may generate dictionaries. In particular embodiments, the dictionaries may comprise global dictionary features which can be updated dynamically offline. The entity resolution module 212 may rank the entities tagged by the entity tagger. In particular embodiments, the entity resolution module 212 may communicate with different graphs 352 including one or more of the social graph, the knowledge graph, or the concept graph to extract ontology data that is relevant to the retrieved information from the context engine 220. In particular embodiments, the entity resolution module 212 may further resolve entities based on the user profile, the ranked entities, and the information from the graphs 352.

In particular embodiments, the entity resolution module 212 may be driven by the task (corresponding to an agent 228). This inversion of processing order may make it possible for domain knowledge present in a task to be applied to pre-filter or bias the set of resolution targets when it is obvious and appropriate to do so. As an example and not by way of limitation, for the utterance "who is John?" no clear category is implied in the utterance. Therefore, the entity resolution module 212 may resolve "John" against everything. As another example and not by way of limitation, for the utterance "send a message to John", the entity resolution module 212 may easily determine "John" refers to a person that one can message. As a result, the entity resolution module 212 may bias the resolution to a friend. As another example and not by way of limitation, for the utterance "what is John's most famous album?" To resolve "John", the entity resolution module 212 may first determine the task corresponding to the utterance, which is finding a music album. The entity resolution module 212 may determine that entities related to music albums include singers, producers, and recording studios. Therefore, the entity resolution module 212 may search among these types of entities in a music domain to resolve "John."

In particular embodiments, the output of the entity resolution module 212 may be sent to the dialog manager 216 to advance the flow of the conversation with the user. The dialog manager 216 may be an asynchronous state machine that repeatedly updates the state and selects actions based on the new state. The dialog manager 216 may additionally store previous conversations between the user and the assistant system 140. In particular embodiments, the dialog manager 216 may conduct dialog optimization. Dialog optimization relates to the challenge of understanding and identifying the most likely branching options in a dialog with a user. As an example and not by way of limitation, the assistant system 140 may implement dialog optimization techniques to obviate the need to confirm who a user wants to call because the assistant system 140 may determine a high confidence that a person inferred based on context and available data is the intended recipient. In particular embodiments, the dialog manager 216 may implement reinforcement learning frameworks to improve the dialog optimization. The dialog manager 216 may comprise dialog intent resolution 356, the dialog state tracker 218, and the action selector 222. In particular embodiments, the dialog manager 216 may execute the selected actions and then call the dialog state tracker 218 again until the action selected requires a user response, or there are no more actions to execute. Each action selected may depend on the execution result from previous actions. In particular embodiments, the dialog intent resolution 356 may resolve the user intent associated with the current dialog session based on dialog history between the user and the assistant system 140. The dialog intent resolution 356 may map intents determined by the NLU module 210 to different dialog intents. The dialog intent resolution 356 may further rank dialog intents based on signals from the NLU module 210, the entity resolution module 212, and dialog history between the user and the assistant system 140.

In particular embodiments, the dialog state tracker 218 may use a set of operators to track the dialog state. The operators may comprise necessary data and logic to update the dialog state. Each operator may act as delta of the dialog state after processing an incoming user input. In particular embodiments, the dialog state tracker 218 may a comprise a task tracker, which may be based on task specifications and different rules. The dialog state tracker 218 may also comprise a slot tracker and coreference component, which may be rule based and/or recency based. The coreference component may help the entity resolution module 212 to resolve entities. In alternative embodiments, with the coreference component, the dialog state tracker 218 may replace the entity resolution module 212 and may resolve any references/mentions and keep track of the state. In particular embodiments, the dialog state tracker 218 may convert the upstream results into candidate tasks using task specifications and resolve arguments with entity resolution. Both user state (e.g., user's current activity) and task state (e.g., triggering conditions) may be tracked. Given the current state, the dialog state tracker 218 may generate candidate tasks the assistant system 140 may process and perform for the user. As an example and not by way of limitation, candidate tasks may include "show suggestion," "get weather information," or "take photo." In particular embodiments, the dialog state tracker 218 may generate candidate tasks based on available data from, for example, a knowledge graph, a user memory, and a user task history. In particular embodiments, the dialog state tracker 218 may then resolve the triggers object using the resolved arguments. As an example and not by way of limitation, a user input "remind me to call mom when she's online and I'm home tonight" may perform the conversion from the NLU output to the triggers representation by the dialog state tracker 218 as illustrated in Table 1 below:

TABLE 1

Example Conversion from NLU Output to Triggers Representation

| NLU Ontology Representation: | Triggers Representation: |
|---|---|
| [IN:CREATE_SMART_REMINDER<br>Remind me to<br>  [SL:TODO call mom] when<br>  [SL:TRIGGER_CONJUNCTION<br>    [IN:GET_TRIGGER<br>      [SL:TRIGGER_SOCIAL_UPDATE<br>      she's online] and I'm<br>      [SL:TRIGGER_LOCATION home]<br>      [SL:DATE_TIME tonight]<br>    ]<br>  ]<br>] | → Triggers: {<br>  andTriggers: [<br>    condition: {ContextualEvent(mom is online)},<br>    condition: {ContextualEvent(location is home)},<br>    condition: {ContextualEvent(time is tonight)}]))]} |

In the above example, "mom," "home," and "tonight" are represented by their respective entities: personEntity, locationEntity, datetimeEntity.

In particular embodiments, the dialog manager 216 may map events determined by the context engine 220 to actions. As an example and not by way of limitation, an action may be a natural-language generation (NLG) action, a display or overlay, a device action, or a retrieval action. The dialog manager 216 may also perform context tracking and interaction management. Context tracking may comprise aggregating real-time stream of events into a unified user state. Interaction management may comprise selecting optimal action in each state. In particular embodiments, the dialog state tracker 218 may perform context tracking (i.e., tracking events related to the user). To support processing of event streams, the dialog state tracker 218*a* may use an event handler (e.g., for disambiguation, confirmation, request) that may consume various types of events and update an internal assistant state. Each event type may have one or more handlers. Each event handler may be modifying a certain slice of the assistant state. In particular embodiments, the event handlers may be operating on disjoint subsets of the state (i.e., only one handler may have write-access to a particular field in the state). In particular embodiments, all event handlers may have an opportunity to process a given event. As an example and not by way of limitation, the dialog state tracker 218 may run all event handlers in parallel on every event, and then may merge the state updates proposed by each event handler (e.g., for each event, most handlers may return a NULL update).

In particular embodiments, the dialog state tracker 218 may work as any programmatic handler (logic) that requires versioning. In particular embodiments, instead of directly altering the dialog state, the dialog state tracker 218 may be a side-effect free component and generate n-best candidates of dialog state update operators that propose updates to the dialog state. The dialog state tracker 218 may comprise intent resolvers containing logic to handle different types of NLU intent based on the dialog state and generate the operators. In particular embodiments, the logic may be organized by intent handler, such as a disambiguation intent handler to handle the intents when the assistant system 140 asks for disambiguation, a confirmation intent handler that comprises the logic to handle confirmations, etc. Intent resolvers may combine the turn intent together with the dialog state to generate the contextual updates for a conversation with the user. A slot resolution component may then recursively resolve the slots in the update operators with resolution providers including the knowledge graph and domain agents. In particular embodiments, the dialog state tracker 218 may update/rank the dialog state of the current dialog session. As an example and not by way of limitation, the dialog state tracker 218 may update the dialog state as "completed" if the dialog session is over. As another example and not by way of limitation, the dialog state tracker 218 may rank the dialog state based on a priority associated with it.

In particular embodiments, the dialog state tracker 218 may communicate with the action selector 222 about the dialog intents and associated content objects. In particular embodiments, the action selector 222 may rank different dialog hypotheses for different dialog intents. The action selector 222 may take candidate operators of dialog state and consult the dialog policies 360 to decide what actions should be executed. In particular embodiments, a dialog policy 360 may a tree-based policy, which is a pre-constructed dialog plan. Based on the current dialog state, a dialog policy 360 may choose a node to execute and generate the corresponding actions. As an example and not by way of limitation, the tree-based policy may comprise topic grouping nodes and dialog action (leaf) nodes. In particular embodiments, a dialog policy 360 may also comprise a data structure that describes an execution plan of an action by an agent 228. A dialog policy 360 may further comprise multiple goals related to each other through logical operators. In particular embodiments, a goal may be an outcome of a portion of the dialog policy and it may be constructed by the dialog manager 216. A goal may be represented by an identifier (e.g., string) with one or more named arguments, which parameterize the goal. As an example and not by way of limitation, a goal with its associated goal argument may be represented as {confirm_artist, args:{artist: "Madonna"}}. In particular embodiments, goals may be mapped to leaves of the tree of the tree-structured representation of the dialog policy 360.

In particular embodiments, the assistant system 140 may use hierarchical dialog policies 360 with general policy 362 handling the cross-domain business logic and task policies 364 handling the task/domain specific logic. The general policy 362 may be used for actions that are not specific to individual tasks. The general policy 362 may be used to determine task stacking and switching, proactive tasks, notifications, etc. The general policy 362 may comprise handling low-confidence intents, internal errors, unacceptable user response with retries, and/or skipping or inserting confirmation based on ASR or NLU confidence scores. The general policy 362 may also comprise the logic of ranking dialog state update candidates from the dialog state tracker 218 output and pick the one to update (such as picking the top ranked task intent). In particular embodiments, the assistant system 140 may have a particular interface for the general policy 362, which allows for consolidating scattered cross-domain policy/business-rules, especial those found in the dialog state tracker 218, into a function of the action selector 222. The interface for the general policy 362 may also allow for authoring of self-contained sub-policy units that may be tied to specific situations or clients (e.g., policy functions that may be easily switched on or off based on clients, situation). The interface for the general policy 362 may also allow for providing a layering of policies with back-off, i.e., multiple policy units, with highly specialized policy units that deal with specific situations being backed up by more general policies 362 that apply in wider circumstances. In this context the general policy 362 may alternatively comprise intent or task specific policy.

In particular embodiments, a task policy 364 may comprise the logic for action selector 222 based on the task and current state. The task policy 364 may be dynamic and ad-hoc. In particular embodiments, the types of task policies 364 may include one or more of the following types: (1) manually crafted tree-based dialog plans; (2) coded policy that directly implements the interface for generating actions; (3) configurator-specified slot-filling tasks; or (4) machine-learning model based policy learned from data. In particular embodiments, the assistant system 140 may bootstrap new domains with rule-based logic and later refine the task policies 364 with machine-learning models. In particular embodiments, the general policy 362 may pick one operator from the candidate operators to update the dialog state, followed by the selection of a user facing action by a task policy 364. Once a task is active in the dialog state, the corresponding task policy 364 may be consulted to select right actions.

In particular embodiments, the action selector 222 may select an action based on one or more of the event determined by the context engine 220, the dialog intent and state, the associated content objects, and the guidance from dialog policies 360. Each dialog policy 360 may be subscribed to specific conditions over the fields of the state. After an event is processed and the state is updated, the action selector 222 may run a fast search algorithm (e.g., similarly to the Boolean satisfiability) to identify which policies should be triggered based on the current state. In particular embodiments, if multiple policies are triggered, the action selector 222 may use a tie-breaking mechanism to pick a particular policy. Alternatively, the action selector 222 may use a more sophisticated approach which may dry-run each policy and then pick a particular policy which may be determined to have a high likelihood of success. In particular embodiments, mapping events to actions may result in several technical advantages for the assistant system 140. One technical advantage may include that each event may be a state update from the user or the user's physical/digital environment, which may or may not trigger an action from assistant system 140. Another technical advantage may include possibilities to handle rapid bursts of events (e.g., user enters a new building and sees many people) by first consuming all events to update state, and then triggering action(s) from the final state. Another technical advantage may include consuming all events into a single global assistant state.

In particular embodiments, the action selector 222 may take the dialog state update operators as part of the input to select the dialog action. The execution of the dialog action may generate a set of expectations to instruct the dialog state tracker 218 to handle future turns. In particular embodiments, an expectation may be used to provide context to the dialog state tracker 218 when handling the user input from next turn. As an example and not by way of limitation, slot request dialog action may have the expectation of proving a value for the requested slot. In particular embodiments, both the dialog state tracker 218 and the action selector 222 may not change the dialog state until the selected action is executed. This may allow the assistant system 140 to execute the dialog state tracker 218 and the action selector 222 for processing speculative ASR results and to do n-best ranking with dry runs.

In particular embodiments, the action selector 222 may call different agents 228 for task execution. Meanwhile, the dialog manager 216 may receive an instruction to update the dialog state. As an example and not by way of limitation, the update may comprise awaiting agents' 228 response. An agent 228 may select among registered content providers to complete the action. The data structure may be constructed by the dialog manager 216 based on an intent and one or more slots associated with the intent. In particular embodiments, the agents 228 may comprise first-party agents and third-party agents. In particular embodiments, first-party agents may comprise internal agents that are accessible and controllable by the assistant system 140 (e.g. agents associated with services provided by the online social network, such as messaging services or photo-share services). In particular embodiments, third-party agents may comprise external agents that the assistant system 140 has no control over (e.g., third-party online music application agents, ticket sales agents). The first-party agents may be associated with first-party providers that provide content objects and/or services hosted by the social-networking system 160. The third-party agents may be associated with third-party providers that provide content objects and/or services hosted by the third-party system 170. In particular embodiments, each of the first-party agents or third-party agents may be designated for a particular domain. As an example and not by way of limitation, the domain may comprise weather, transportation, music, shopping, social, videos, photos, events, locations, and/or work. In particular embodiments, the assistant system 140 may use a plurality of agents 228 collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, the dialog manager 216 may support multi-turn compositional resolution of slot mentions. For a compositional parse from the NLU module 210, the resolver may recursively resolve the nested slots. The dialog manager 216 may additionally support disambiguation for the nested slots. As an example and not by way of limitation, the user input may be "remind me to call Alex". The resolver may need to know which Alex to call before creating an actionable reminder to-do entity. The resolver may halt the resolution and set the resolution state when further user clarification is necessary for a particular slot. The general policy 362 may examine the resolution state and create corresponding dialog action for user clarification. In dialog state tracker 218, based on the user input and the last dialog action, the dialog manager 216 may update the nested slot. This capability may allow the assistant system 140 to interact with the user not only to collect missing slot values but also to reduce ambiguity of more complex/ambiguous utterances to complete the task. In particular embodiments, the dialog manager 216 may further support requesting missing slots in a nested intent and multi-intent user inputs (e.g., "take this photo and send it to Dad"). In particular embodiments, the dialog manager 216 may support machine-learning models for more robust dialog experience. As an example and not by way of limitation, the dialog state tracker 218 may use neural network based models (or any other suitable machine-learning models) to model belief over task hypotheses. As another example and not by way of limitation, for action selector 222, highest priority policy units may comprise white-list/black-list overrides, which may have to occur by design; middle priority units may comprise machine-learning models designed for action selection; and lower priority units may comprise rule-based fallbacks when the machine-learning models elect not to handle a situation. In particular embodiments, machine-learning model based general policy unit may help the assistant system 140 reduce redundant disambiguation or confirmation steps, thereby reducing the number of turns to execute the user input.

In particular embodiments, the determined actions by the action selector 222 may be sent to the delivery system 230. The delivery system 230 may comprise a CU composer 370, a response generation component 380, a dialog state writing component 382, and a text-to-speech (TTS) component 390. Specifically, the output of the action selector 222 may be received at the CU composer 370. In particular embodiments, the output from the action selector 222 may be formulated as a <k,c,u,d> tuple, in which k indicates a knowledge source, c indicates a communicative goal, u indicates a user model, and d indicates a discourse model.

In particular embodiments, the CU composer 370 may generate a communication content for the user using a natural-language generation (NLG) component 372. In particular embodiments, the NLG component 372 may use different language models and/or language templates to generate natural-language outputs. The generation of natural-language outputs may be application specific. The generation of natural-language outputs may be also personalized for each user. In particular embodiments, the NLG component 372 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator to build complex concepts/roles from atomic ones. In particular embodiments, the content determination component may perform the following tasks to determine the communication content. The first task may comprise a translation task, in which the input to the NLG component 372 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the NLG component 372. The sentence planner may determine the organization of the communication content to make it human understandable. The surface realization component may determine specific words to use, the sequence of the sentences, and the style of the communication content.

In particular embodiments, the CU composer 370 may also determine a modality of the generated communication content using the UI payload generator 374. Since the generated communication content may be considered as a response to the user input, the CU composer 370 may additionally rank the generated communication content using a response ranker 376. As an example and not by way of limitation, the ranking may indicate the priority of the response. In particular embodiments, the CU composer 370 may comprise a natural-language synthesis (NLS) component that may be separate from the NLG component 372. The NLS component may specify attributes of the synthesized speech generated by the CU composer 370, including gender, volume, pace, style, or register, in order to customize the response for a particular user, task, or agent. The NLS component may tune language synthesis without engaging the implementation of associated tasks. In particular embodiments, the CU composer 370 may check privacy constraints associated with the user to make sure the generation of the communication content follows the privacy policies. More information on customizing natural-language generation (NLG) may be found in U.S. patent application Ser. No. 15/967,279, filed 30 Apr. 2018, and U.S. patent application Ser. No. 15/966,455, filed 30 Apr. 2018, which is incorporated by reference.

In particular embodiments, the delivery system 230 may perform different tasks based on the output of the CU composer 370. These tasks may include writing (i.e., storing/updating) the dialog state into the data store 330 using the dialog state writing component 382 and generating responses using the response generation component 380. In particular embodiments, the output of the CU composer 370 may be additionally sent to the TTS component 390 if the determined modality of the communication content is audio. In particular embodiments, the output from the delivery system 230 comprising one or more of the generated responses, the communication content, or the speech generated by the TTS component 390 may be then sent back to the dialog manager 216.

In particular embodiments, the orchestrator 206 may determine, based on the output of the entity resolution module 212, whether to processing a user input on the client system 130 or on the server, or in the third operational mode (i.e., blended mode) using both. Besides determining how to process the user input, the orchestrator 206 may receive the results from the agents 228 and/or the results from the delivery system 230 provided by the dialog manager 216. The orchestrator 206 may then forward these results to the arbitrator 226. The arbitrator 226 may aggregate these results, analyze them, select the best result, and provide the selected result to the render output module 232. In particular embodiments, the arbitrator 226 may consult with dialog policies 360 to obtain the guidance when analyzing these results. In particular embodiments, the render output module 232 may generate a response that is suitable for the client system 130.

Figure 4:
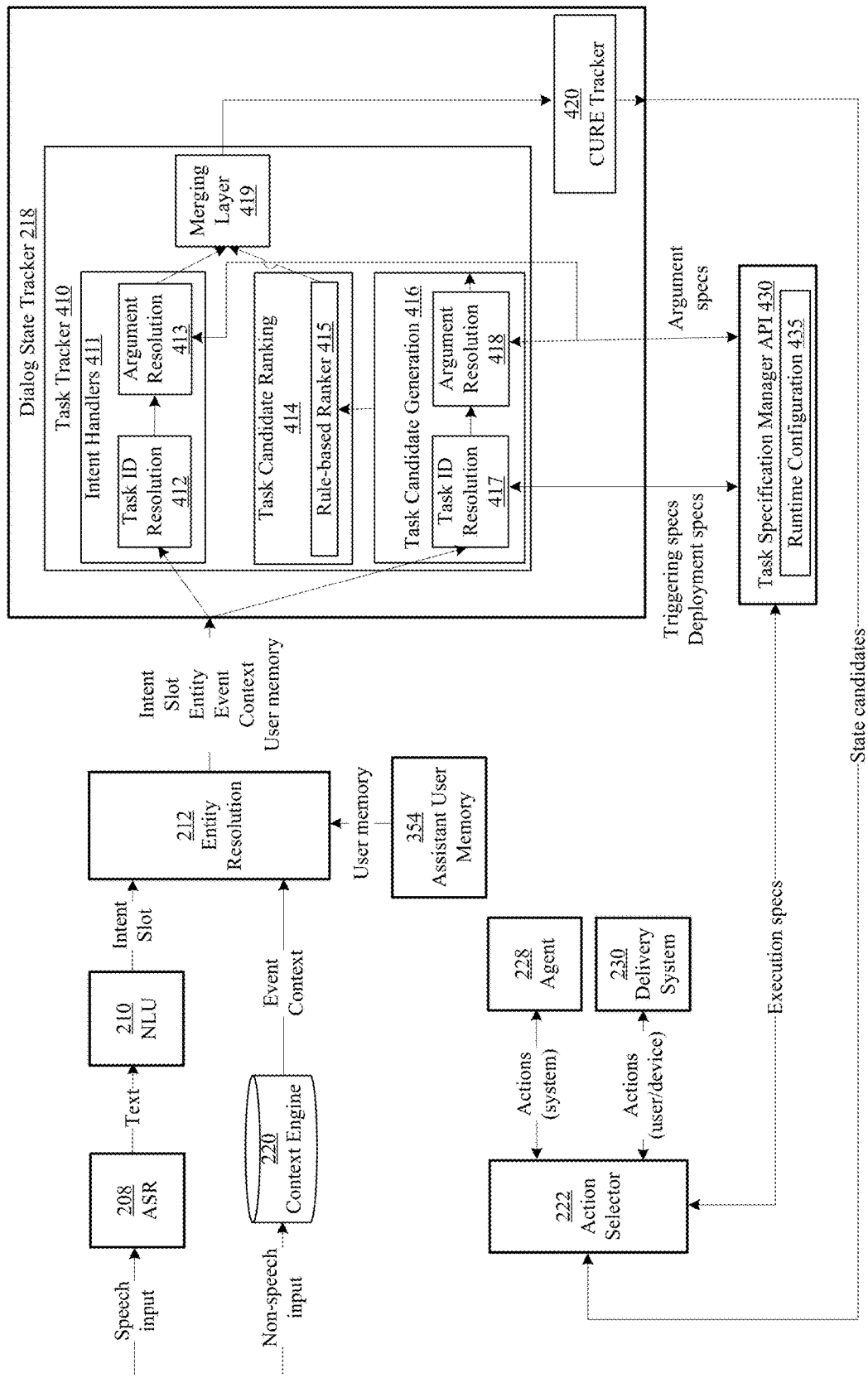
FIG. 4 illustrates an example task-centric flow diagram of processing a user input.

FIG. 4 illustrates an example task-centric flow diagram 400 of processing a user input. In particular embodiments, the assistant system 140 may assist users not only with voice-initiated experiences but also more proactive, multimodal experiences that are initiated on understanding user context. In particular embodiments, the assistant system 140 may rely on assistant tasks for such purpose. An assistant task may be a central concept that is shared across the whole assistant stack to understand user intention, interact with the user and the world to complete the right task for the user. In particular embodiments, an assistant task may be the primitive unit of assistant capability. It may comprise data fetching, updating some state, executing some command, or complex tasks composed of a smaller set of tasks. Completing a task correctly and successfully to deliver the value to the user may be the goal that the assistant system 140 is optimized for. In particular embodiments, an assistant task may be defined as a capability or a feature. The assistant task may be shared across multiple product surfaces if they have exactly the same requirements so it may be easily tracked. It may also be passed from device to device, and easily picked up mid-task by another device since the primitive unit is consistent. In addition, the consistent format of the assistant task may allow developers working on different modules in the assistant stack to more easily design around it. Furthermore, it may allow for task sharing. As an example and not by way of limitation, if a user is listening to music on smart glasses, the user may say "play this music on my phone." In the event that the phone hasn't been woken or has a task to execute, the smart glasses may formulate a task that is provided to the phone, which may then be executed by the phone to start playing music. In particular embodiments, the assistant task may be retained by each surface separately if they have different expected behaviors. In particular embodiments, the assistant system 140 may identify the right task based on user inputs in different modality or other signals, conduct conversation to collect all necessary information, and complete that task with action selector 222 implemented internally or externally, on server or locally product surfaces. In particular embodiments, the assistant stack may comprise a set of processing components from wake-up, recognizing user inputs, understanding user intention, reasoning about the tasks, fulfilling a task to generate natural-language response with voices.

In particular embodiments, the user input may comprise speech input. The speech input may be received at the ASR module 208 for extracting the text transcription from the speech input. The ASR module 208 may use statistical models to determine the most likely sequences of words that correspond to a given portion of speech received by the assistant system 140 as audio input. The models may include one or more of hidden Markov models, neural networks, deep learning models, or any combination thereof. The received audio input may be encoded into digital data at a particular sampling rate (e.g., 16, 44.1, or 96 kHz) and with a particular number of bits representing each sample (e.g., 8, 16, of 24 bits).

In particular embodiments, the ASR module 208 may comprise one or more of a grapheme-to-phoneme (G2P) model, a pronunciation learning model, a personalized acoustic model, a personalized language model (PLM), or an end-pointing model. In particular embodiments, the grapheme-to-phoneme (G2P) model may be used to determine a user's grapheme-to-phoneme style (i.e., what it may sound like when a particular user speaks a particular word). In particular embodiments, the personalized acoustic model may be a model of the relationship between audio signals and the sounds of phonetic units in the language. Therefore, such personalized acoustic model may identify how a user's voice sounds. The personalized acoustical model may be generated using training data such as training speech received as audio input and the corresponding phonetic units that correspond to the speech. The personalized acoustical model may be trained or refined using the voice of a particular user to recognize that user's speech. In particular embodiments, the personalized language model may then determine the most likely phrase that corresponds to the identified phonetic units for a particular audio input. The personalized language model may be a model of the probabilities that various word sequences may occur in the language. The sounds of the phonetic units in the audio input may be matched with word sequences using the personalized language model, and greater weights may be assigned to the word sequences that are more likely to be phrases in the language. The word sequence having the highest weight may be then selected as the text that corresponds to the audio input. In particular embodiments, the personalized language model may also be used to predict what words a user is most likely to say given a context. In particular embodiments, the end-pointing model may detect when the end of an utterance is reached. In particular embodiments, based at least in part on a limited computing power of the client system 130, the assistant system 140 may optimize the personalized language model at runtime during the client-side process. As an example and not by way of limitation, the assistant system 140 may pre-compute a plurality of personalized language models for a plurality of possible subjects a user may talk about. When a user input is associated with a request for assistance, the assistant system 140 may promptly switch between and locally optimize the pre-computed language models at runtime based on user activities. As a result, the assistant system 140 may preserve computational resources while efficiently identifying a subject matter associated with the user input. In particular embodiments, the assistant system 140 may also dynamically re-learn user pronunciations at runtime.

In particular embodiments, the user input may comprise non-speech input. The non-speech input may be received at the context engine 220 for determining events and context from the non-speech input. The context engine 220 may determine multi-modal events comprising voice/text intents, location updates, visual events, touch, gaze, gestures, activities, device/application events, and/or any other suitable type of events. The voice/text intents may depend on the ASR module 208 and the NLU module 210. The location updates may be consumed by the dialog manager 216 to support various proactive/reactive scenarios. The visual events may be based on person or object appearing in the user's field of view. These events may be consumed by the dialog manager 216 and recorded in transient user state to support visual co-reference (e.g., resolving "that" in "how much is that shirt?" and resolving "him" in "send him my contact"). The gaze, gesture, and activity may result in flags being set in the transient user state (e.g., user is running) which may condition the action selector 222. For the device/application events, if an application makes an update to the device state, this may be published to the assistant system 140 so that the dialog manager 216 may use this context (what is currently displayed to the user) to handle reactive and proactive scenarios. As an example and not by way of limitation, the context engine 220 may cause a push notification message to be displayed on a display screen of the user's client system 130. The user may interact with the push notification message, which may initiate a multi-modal event (e.g., an event workflow for replying to a message received from another user). Other example multi-modal events may include seeing a friend, seeing a landmark, being at home, running, starting a call with touch, taking a photo with touch, opening an application, etc. In particular embodiments, the context engine 220 may also determine world/social events based on world/social updates (e.g., weather changes, a friend getting online). The social updates may comprise events that a user is subscribed to, (e.g., friend's birthday, posts, comments, other notifications). These updates may be consumed by the dialog manager 216 to trigger proactive actions based on context (e.g., suggesting a user call a friend on their birthday, but only if the user is not focused on something else). As an example and not by way of limitation, receiving a message may be a social event, which may trigger the task of reading the message to the user.

In particular embodiments, the text transcription from the ASR module 208 may be sent to the NLU module 210. The NLU module 210 may process the text transcription and extract the user intention (i.e., intents) and parse the slots or parsing result based on the linguistic ontology. In particular embodiments, the intents and slots from the NLU module 210 and/or the events and contexts from the context engine 220 may be sent to the entity resolution module 212. In particular embodiments, the entity resolution module 212 may resolve entities associated with the user input based on the output from the NLU module 210 and/or the context engine 220. The entity resolution module 212 may use different techniques to resolve the entities, including accessing user memory from the assistant user memory (AUM) 354. In particular embodiments, the AUM 354 may comprise user episodic memories helpful for resolving the entities by the entity resolution module 212. The AUM 354 may be the central place for storing, retrieving, indexing, and searching over user data.

In particular embodiments, the entity resolution module 212 may provide one or more of the intents, slots, entities, events, context, or user memory to the dialog state tracker 218. The dialog state tracker 218 may identify a set of state candidates for a task accordingly, conduct interaction with the user to collect necessary information to fill the state, and call the action selector 222 to fulfill the task. In particular embodiments, the dialog state tracker 218 may comprise a task tracker 410. The task tracker 410 may track the task state associated with an assistant task. In particular embodiments, a task state may be a data structure persistent cross interaction turns and updates in real time to capture the state of the task during the whole interaction. The task state may comprise all the current information about a task execution status, such as arguments, confirmation status, confidence score, etc. Any incorrect or outdated information in the task state may lead to failure or incorrect task execution. The task state may also serve as a set of contextual information for many other components such as the ASR module 208, the NLU module 210, etc.

In particular embodiments, the task tracker 410 may comprise intent handlers 411, task candidate ranking module 414, task candidate generation module 416, and merging layer 419. In particular embodiments, a task may be identified by its ID name. The task ID may be used to associate corresponding component assets if it is not explicitly set in the task specification, such as dialog policy 360, agent execution, NLG dialog act, etc. Therefore, the output from the entity resolution module 212 may be received by a task ID resolution component 417 of the task candidate generation module 416 to resolve the task ID of the corresponding task. In particular embodiments, the task ID resolution component 417 may call a task specification manager API 430 to access the triggering specifications and deployment specifications for resolving the task ID. Given these specifications, the task ID resolution component 417 may resolve the task ID using intents, slots, dialog state, context, and user memory.

In particular embodiments, the technical specification of a task may be defined by a task specification. The task specification may be used by the assistant system 140 to trigger a task, conduct dialog conversation, and find a right execution module (e.g., agents 228) to execute the task. The task specification may be an implementation of the product requirement document. It may serve as the general contract and requirements that all the components agreed on. It may be considered as an assembly specification for a product, while all development partners deliver the modules based on the specification. In particular embodiments, an assistant task may be defined in the implementation by a specification. As an example and not by way of limitation, the task specification may be defined as the following categories. One category may be a basic task schema which comprises the basic identification information such as ID, name, and the schema of the input arguments. Another category may be a triggering specification, which is about how a task can be triggered, such as intents, event message ID, etc. Another category may be a conversational specification, which is for dialog manager 216 to conduct the conversation with users and systems. Another category may be an execution specification, which is about how the task will be executed and fulfilled. Another category may be a deployment specification, which is about how a feature will be deployed to certain surfaces, local, and group of users.

In particular embodiments, the task specification manager API 430 may be an API for accessing a task specification manager. The task specification manager may be a module in the runtime stack for loading the specifications from all the tasks and providing interfaces to access all the tasks specifications for detailed information or generating task candidates. In particular embodiments, the task specification manager may be accessible for all components in the runtime stack via the task specification manager API 430. The task specification manager may comprise a set of static utility functions to manage tasks with the task specification manager, such as filtering task candidates by platform. Before landing the task specification, the assistant system 140 may also dynamically load the task specifications to support end-to-end development on the development stage.

In particular embodiments, the task specifications may be grouped by domains and stored in runtime configurations 435. The runtime stack may load all the task specifications from the runtime configurations 435 during the building time. In particular embodiments, in the runtime configurations 435, for a domain, there may be a cconf file and a cinc file (e.g., sidechef_task.cconf and sidechef_task.inc). As an example and not by way of limitation, <domain>_tasks.cconf may comprise all the details of the task specifications. As another example and not by way of limitation, <domain>_tasks.cinc may provide a way to override the generated specification if there is no support for that feature yet.

In particular embodiments, a task execution may require a set of arguments to execute. Therefore, an argument resolution component 418 may resolve the argument names using the argument specifications for the resolved task ID. These arguments may be resolved based on NLU outputs (e.g., slot [SL:contact]), dialog state (e.g., short-term calling history), user memory (such as user preferences, location, long-term calling history, etc.), or device context (such as timer states, screen content, etc.). In particular embodiments, the argument modality may be text, audio, images or other structured data. The slot to argument mapping may be defined by a filling strategy and/or language ontology. In particular embodiments, given the task triggering specifications, the task candidate generation module 416 may look for the list of tasks to be triggered as task candidates based on the resolved task ID and arguments.

In particular embodiments, the generated task candidates may be sent to the task candidate ranking module 414 to be further ranked. The task candidate ranking module 414 may use a rule-based ranker 415 to rank them. In particular embodiments, the rule-based ranker 415 may comprise a set of heuristics to bias certain domain tasks. The ranking logic may be described as below with principles of context priority. In particular embodiments, the priority of a user specified task may be higher than an on-foreground task. The priority of the on-foreground task may be higher than a device-domain task when the intent is a meta intent. The priority of the device-domain task may be higher than a task of a triggering intent domain. As an example and not by way of limitation, the ranking may pick the task if the task domain is mentioned or specified in the utterance, such as "create a timer in TIMER app". As another example and not by way of imitation, the ranking may pick the task if the task domain is on foreground or active state, such as "stop the timer" to stop the timer while the TIMER app is on foreground and there is an active timer. As yet another example and not by way of imitation, the ranking may pick the task if the intent is general meta intent, and the task is device control while there is no other active application or active state. As yet another example and not by way of imitation, the ranking may pick the task if the task is the same as the intent domain. In particular embodiments, the task candidate ranking module 414 may customize some more logic to check the match of intent/slot/entity types. The ranked task candidates may be sent to the merging layer 419.

In particular embodiments, the output from the entity resolution module 212 may also sent to a task ID resolution component 412 of the intent handlers 411. The task ID resolution component 412 may resolve the task ID of the corresponding task similarly to the task ID resolution component 417. In particular embodiments, the intent handlers 411 may additionally comprise an argument resolution component 413. The argument resolution component 413 may resolve the argument names using the argument specifications for the resolved task ID similarly to the argument resolution component 418. In particular embodiments, intent handlers 411 may deal with task agnostic features and may not be expressed within the task specifications which are task specific. Intent handlers 411 may output state candidates other than task candidates such as argument update, confirmation update, disambiguation update, etc. In particular embodiments, some tasks may require very complex triggering conditions or very complex argument filling logic that may not be reusable by other tasks even if they were supported in the task specifications (e.g., in-call voice commands, media tasks via [IN:PLAY_MEDIA], etc.). Intent handlers 411 may be also suitable for such type of tasks. In particular embodiments, the results from the intent handlers 411 may take precedence over the results from the task candidate ranking module 414. The results from the intent handlers 411 may be also sent to the merging layer 419.

In particular embodiments, the merging layer 419 may combine the results from the intent handlers 411 and the results from the task candidate ranking module 414. The dialog state tracker 218 may suggest each task as a new state for the dialog policies 360 to select from, thereby generating a list of state candidates. The merged results may be further sent to a conversational understanding reinforcement engine (CURE) tracker 420. In particular embodiments, the CURE tracker 420 may be a personalized learning process to improve the determination of the state candidates by the dialog state tracker 218 under different contexts using real-time user feedback. More information on conversational understanding reinforcement engine may be found in U.S. patent application Ser. No. 17/186,459, filed 26 Feb. 2021, which is incorporated by reference.

In particular embodiments, the state candidates generated by the CURE tracker 420 may be sent to the action selector 222. The action selector 222 may consult with the task policies 364, which may be generated from execution specifications accessed via the task specification manager API 430. In particular embodiments, the execution specifications may describe how a task should be executed and what actions the action selector 222 may need to take to complete the task.

In particular embodiments, the action selector 222 may determine actions associated with the system. Such actions may involve the agents 228 to execute. As a result, the action selector 222 may send the system actions to the agents 228 and the agents 228 may return the execution results of these actions. In particular embodiments, the action selector may determine actions associated with the user or device. Such actions may need to be executed by the delivery system 230. As a result, the action selector 222 may send the user/device actions to the delivery system 230 and the delivery system 230 may return the execution results of these actions.

The embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Creating Digital Stories Based on Memory Graphs and Multi-Turn Dialogs

In particular embodiments, the assistant system 140 may create a digital story (i.e., a media montage comprising personalized derivative/augmented multimedia content) for a user by leveraging the user's memory graph, including taking the memory graph as an input, traversing through the memory graph, and adaptively adjusting the story based on a multi-turn dialog between the user and the assistant system. A digital story may be a way for the user to relive their memories, which could be connected by time or semantic meanings. A digital story may be in a video format with clips, transitions, and background, which is created from among the photos, videos, and other content stored on the user's assistant-enabled device. As a user may have a very large amount of memories (content) captured by their assistant-enabled devices, the assistant system 140 may need to make it easier to create interesting/creative digital stories comprising personalized derivative/augmented content (e.g., to "relive" the moment or to share). The assistant system 140 may rely on the memory graph to generate the personalized derivative/augmented content. The multi-turn dialog may allow the user to generate a digital story in a way that the user sees more interesting. In particular embodiments, the assistant system 140 may understand the visual features of the memories, contextual information around them (e.g., meta information such as people in the scene, time, location, etc.), allowing for easy and intuitive navigation through connected memories. In addition, the users may manipulate the created story to their liking, e.g., making it longer/shorter, reordering clips, adding background music/text, and visual effects. These digital stories may then be shared with friends and family to enable effective storytelling. The assistant system 140 may use an agent 228 to create the digital story on the fly, which may be a story-event handler having a frontend component running on the assistant-enabled device and a backend component handling dialog understanding and story creation. The agent 228 may take as input those memory graphs, and traverse through the memory graph based on the conversation along with editing the digital story on the fly with the dialog. The agent 228 may also generate recommendations and chit-chat responses to encourage creation of the digital story and add to the delight of the process. Compared to existing systems for generating digital stories, the assistant system 140 may eliminate the tedious work of manual selection of specific content by traversing the memory graph to select content relevant to the current dialog state, add content to a digital story by understanding and processing open-ended queries based on natural-language understanding and memory graph, provide proactive recommendations to make the digital story more interesting, and allow the user to directly modify the personalized derivative/augmented content via multi-turn dialogs. Although this disclosure describes generating particular stories by particular systems in a particular manner, this disclosure contemplates generating any suitable story in any suitable manner.

In particular embodiments, the assistant system 140 may receive, from a client system 130 during a dialog session with a first user, a first user request from the first user for generating a media montage. The assistant system 140 may then generate, during the dialog session, an initial media montage based on one or more media collections associated with the first user. In particular embodiments, the assistant system 140 may send, to the client system 130 during the dialog session, instructions for presenting the initial media montage. The assistant system 140 may then receive, from the client system 130 during the dialog session, a second user request from the first user for editing the initial media montage. In particular embodiments, the assistant system 140 may generate, during the dialog session, an edited media montage from the initial media montage based on the second user request and a memory graph associated with the first user. The assistant system 140 may further send, to the client system 130 during the dialog session, instructions for presenting the edited media montage.

Introduction

People may capture photos and videos to relive and share memories of personal significance. Recently, media montages (stories) have become a popular mode of sharing these memories due to their intuitive and powerful storytelling capabilities. However, creating such montages may usually involve a lot of manual searches, clicks, and selections that are time-consuming and cumbersome, adversely affecting user experiences.

To alleviate this, the assistant system 140 may utilize task-oriented dialogs for montage creation as a novel interactive tool to seamlessly search, compile, and edit montages from a media collection. To the best of our knowledge, the embodiments disclosed herein may be the first to leverage multi-turn conversations for such a challenging application, extending the previous literature studying simple media retrieval tasks. The embodiments disclosed herein collect a new dataset C3 (Conversational Content Creation), comprising 10 k dialogs conditioned on media montages simulated from a large media collection.

In particular embodiments, the assistant system 140 may take a simulate-and-paraphrase approach to collect these dialogs to be both cost and time efficient, while drawing from natural language distribution. Our analysis and benchmarking of state-of-the-art language models showcase the multimodal challenges present in the dataset. Lastly, the embodiments disclosed herein present a real-world mobile demo application that shows the feasibility of the proposed work in real-world applications.

With the advent of smart cameras, smart glasses, and other media devices, the barrier to capturing photos and videos may have been reduced. While this trend may be desirable to relive and share memories, the sheer volume of such captured media may make it intractable to search and share relevant memories. As a result, media montages (stories) have emerged as an intuitive yet expressive way to creatively compile various memories and share with friends and family. In order to create such a montage, users may have to search through their personal collections, make selections, and edit them manually, which are cumbersome and time-consuming tasks, resulting in a bottleneck.

The embodiments disclosed herein present a novel conversational tool to interactively create and edit montages from a personal media collection. In particular embodiments, the first user request may comprise a first utterance from the first user and the second user request may comprise a second utterance from the first user. While conventional works study the use of dialog in retrieving media or items in a shopping catalog, the embodiments disclosed herein extend it to capture richer interactions related to montage manipulations. To the best of our knowledge, the embodiments disclosed herein may be the first to consider task-oriented dialogs (TOD) for this challenging application of interactive content creation.

Figure 5:
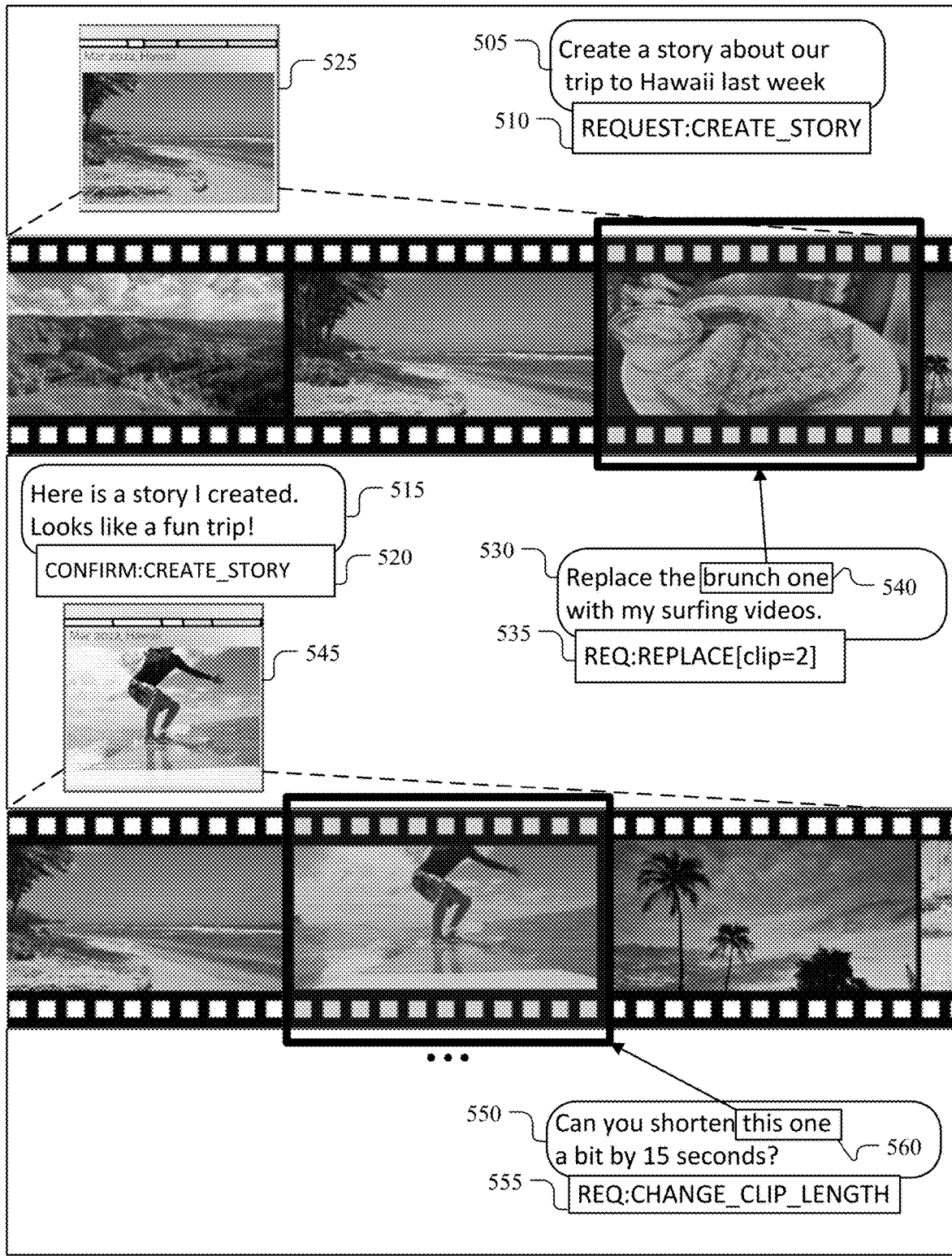
FIG. 5 illustrates an example dialog for conversational content creation.

Towards this goal, the embodiments disclosed herein collect C3, a TOD dialog dataset aimed at providing an intuitive conversational interface in which users may search through their media, create a video story with highlights, and edit clips hands-free, using natural language. FIG. 5 illustrates an example dialog 500 for conversational content creation. Each dialog turn may be fully annotated with dialog acts and multimodal coreference labels, accompanied with its corresponding story montage snapshot. For example, at a first dialog turn, a user may say "create a story about our trip to Hawaii last week 505" which corresponds to the dialog act "REQUEST: CREATE_STORY. 510" The assistant system 140 may then say "here is a story I created 515" which corresponds to the dialog act "CONFIRM: CREATE_STORY. 520" A corresponding story montage snapshot 525 may be displayed. At a second dialog turn, the user may say "replace the brunch one with my surfing videos 530" which corresponds to the dialog act "REQ: REPLACE [clip=2]. 535" There may be a multimodal coreference "brunch one 540." The assistant system 140 may generate an updated story montage accordingly and display a corresponding story montage snapshot 545. At a third dialog turn, the user may further say "can you shorten this one a bit by 15 seconds? 550" which corresponds to the dialog act "REQ: CHANGE_CLIP_LENGTH. 555" There may be a multimodal coreference "this one 560." Due to a simulate-and-paraphrase pipeline of the embodiments disclosed herein, our dataset may comprise rich annotations both at turn-level and dialog-level. These may be helpful to: (a) tease out and study multimodal challenges (e.g., multimodal coreferences) that are present in C3, and (b) benchmark meaningful progress towards a robust TOD agent for the embodiments disclosed herein. The embodiments disclosed herein perform preliminary empirical experimentation and train baselines to highlight the multimodal challenges in our C3 dataset. Lastly, the embodiments disclosed herein build a mobile demo to showcase the real-world applicability of the embodiments disclosed herein.

Related Work

Task-oriented Dialogs (TOD), where the goal is to parse user queries and execute a pre-defined set of actions (e.g., booking hotels), have been extensively studied. The embodiments disclosed herein formulate similar tasks as found in the conventional TOD datasets (Rastogi et al., 2019; Budzianowski et al., 2018; Eric et al., 2019) such as Dialog State Tracking (DST), to build on the literature. The embodiments disclosed herein extend it to a novel multimodal application of video content creation and editing.

Recently, the methods that leverage large pretrained LMs by casting DST as a causal inference problem (Peng et al., 2020; Hosseini-Asl et al., 2020; Gao et al., 2019) have shown successful. The embodiments disclosed herein develop a baseline following this trend, but extend it a unique multimodal setting by including multimodal context as part of the grounding prompt.

Conversational Media Applications: Recent work have addressed the dialog task for retrieving images (e.g., from a personal collection or as part of shopping scenarios) (Guo et al., 2018a,b; Tellex and Roy, 2009; Vo et al., 2019; Tan et al., 2019), given multi-turn target queries. Similarly, Bursztyn et al. (2021) considers an application to retrieve multiple images to create a montage. While C3 may include search operations, the embodiments disclosed herein extend this line of work by allowing for richer interactions and more complex post-edits on the retrieved videos, enhancing overall user experiences.

As per similar applications, Lin et al. (2020) proposes tasks for editing a single image (e.g., brightness) via text commands, while Zhou et al. (2022) study interactive image generation from text, using CLIP text-image embeddings (Radford et al., 2021) and a generative model (Karras et al., 2019). Unlike the conventional work that handle editing operations within a single image, the embodiments disclosed herein may address conversational editing of multiple videos into storytelling montages, a popular form of media sharing.

Architecture

Figure 6:
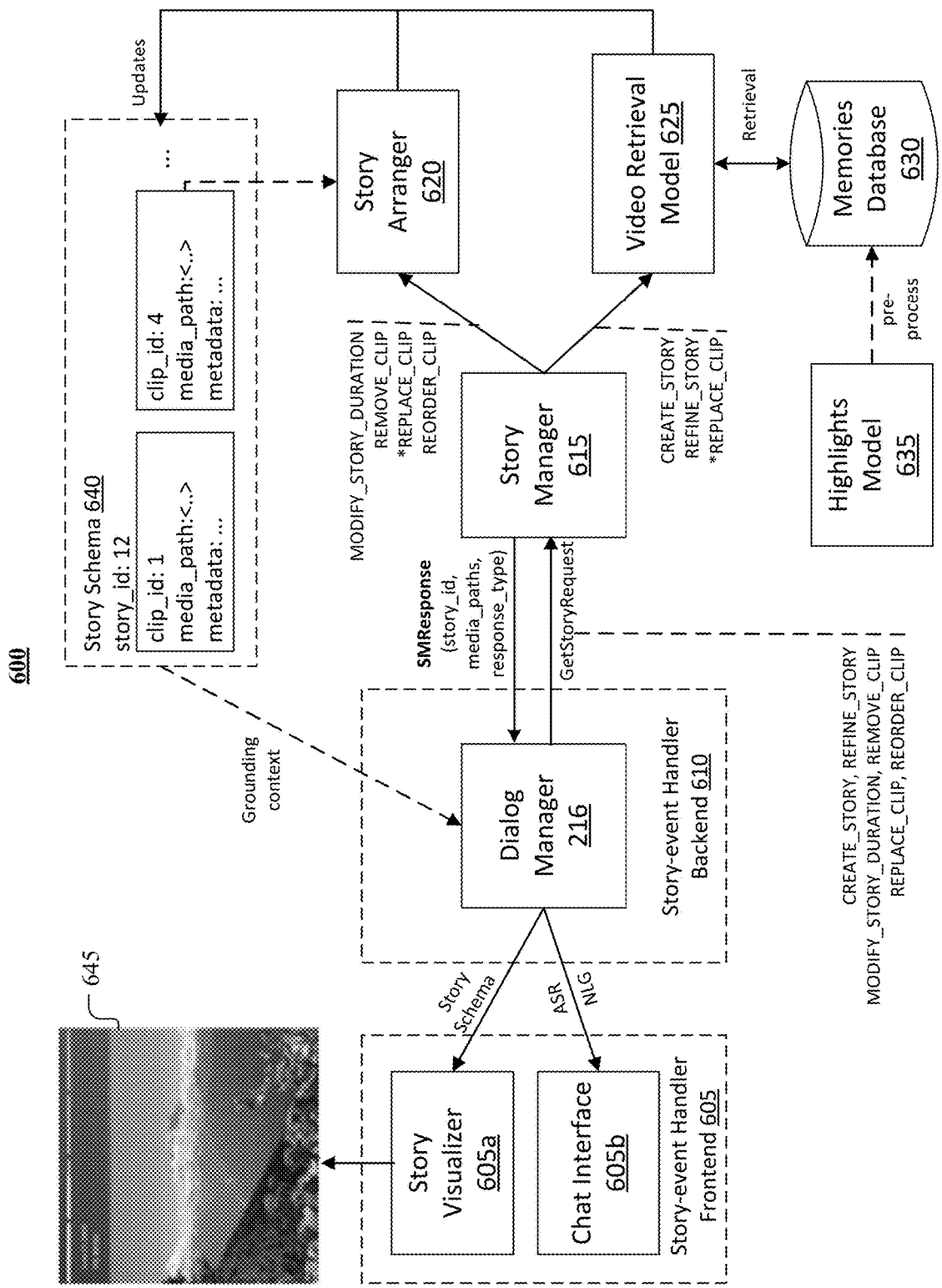
FIG. 6 illustrates an example architecture for generating digital stories (media montages).

FIG. 6 illustrates an example architecture 600 for generating digital stories (media montages). In particular embodiments, the first user request may be received via a user interface comprising a visualizer configured for presenting media montages and a chat interface configured for supporting dialog sessions between the first user and an assistant system 140. As illustrated in FIG. 6, the story-event handler frontend 605 may comprise a story visualizer 605a and a chat interface 605b. The user may interact with assistant system 140 via the chat interface 605b. Based on user input from the chat interface 605b, the ASR 208 and NLG 372 results may be communicated to the dialog manager 216. The dialog manager 216 may be part of the story-event handler backend 610. In particular embodiments, the assistant system 140 may determine, based on the first user request, an intent to generate the initial media montage. The dialog manager 216 may send a get-story-request to the story manager 615. As an example and not by way of limitation, the get-story-request may comprise one or more of create_story, refine_story, modify_story_duration, remove_cli, replace_clip, or reorder_Clip.

Depending on the get-story-request, the story manager 615 may communicate with either a story arranger 620 or a video retrieval model 625. As an example and not by way of limitation, if the get-story-request comprises one or more of create_story, refine_story, or replace_clip, the story manager 615 may communicate with the video retrieval model 625. In particular embodiments, the video retrieval model 625 may use a concept-based retrieval method. In particular embodiments, the assistant system 140 may determine, based on the first user request, one or more initial slots. Accordingly, generating the initial media montage may be further based on one or more of the initial slots. The video retrieval model 625 may perform memory retrieval from the memories database 630. Generating the initial media storage may be further based on the memory graph associated with the first user. In particular embodiments, the memories in the database 630 may be pre-processed by a highlights model 635. The retrieved memories may be used to update the story schema 640. As an example and not by way of limitation, the story schema 640 may comprise one or more of a story ID, a clip ID, a media path, or metadata. If the get-story-request comprises one or more of modify_story_duration, remove_clip, replace_clip, or reorder_clip, the story manager 615 may communicate with the story arranger 620. The results from the story arranger 615 may be further used to update the story schema 640. The embodiments disclosed herein may have a technical advantage of efficiency and conveniency for generating and editing media montages as the assistant system 140 may perform media selection based on traversing the memory graph to select content relevant to the current dialog state without requiring users' specific manual selections of content.

In particular embodiments, the story manager 615 may send the results from the story arranger 620 and/or video retrieval model 625 back to the dialog manger 216 as a story-manager response. As an example and not by way of limitation, the story-manager response may comprise one or more of story_ID, media_paths, or response_type. The dialog manager 216 may then access the grounding context from the story schema 640. In particular embodiments, based on the story-manager response and the grounding context, the dialog manager 216 may send a story schema to a story visualizer 605a. In particular embodiments, the story visualizer 605a may further generate a digital story 645 to be presented to the user. As discussed above, the embodiments disclosed herein may have a technical advantage of enabling users to seamlessly search, compile, and edit media montages as the assistant system may utilize multi-turn conversation and memory graphs of the users to generate and modify media montages during the interactions with the users.

Figure 7:
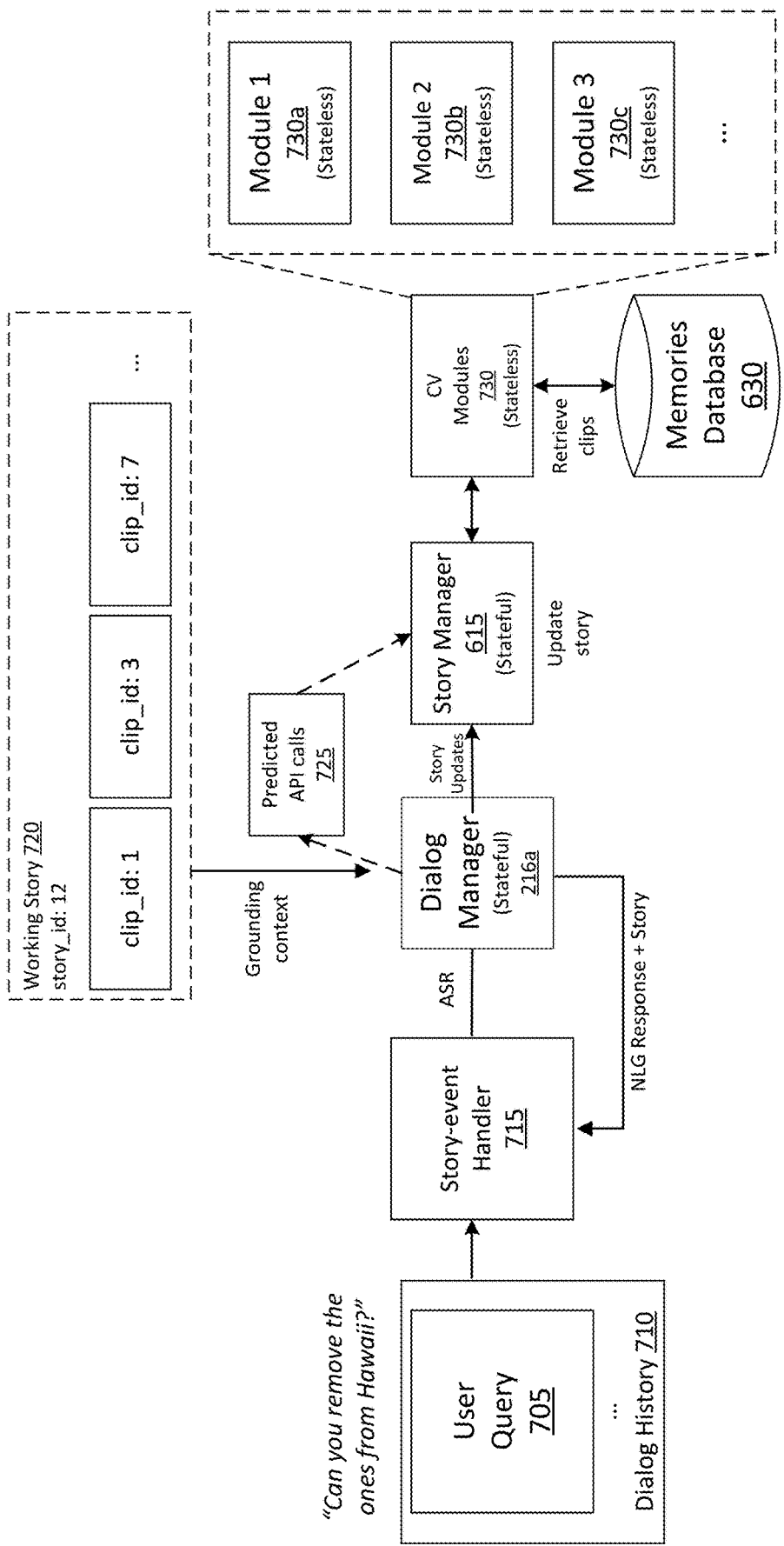
FIG. 7 illustrates an example architecture for modifying digital stories.

FIG. 7 illustrates an example architecture 700 for modifying digital stories. In particular embodiments, the user may modify a created story based on multi-turn dialogs. As an example and not by way of limitation, the user may ask "can you remove the ones from Hawaii?" Such user input may be stored as a user query 705 in the dialog history 710. In particular embodiments, the assistant system 140 may determine, based on the second user request, an intent to edit the initial media montage. The assistant system 140 may further determine, based on the second user request, one or more modified slots. Accordingly, generating the edited media montage may be further based on one or more of the modified slots. The user query 705 may be provided to the story-event handler 715. The story-event handler 715 may send the ASR 208 results of the user query 705 to the client-side dialog manager 216a. The dialog manger 216a may access the grounding text comprising the working story 720. The dialog manager 216a may then send predicted AIP calls 725 to the story manager 615. The story manager 615 may be on both the client side and the server side.

In particular embodiments, the assistant system 140 may generate, by one or more machine-learning models, a visual analysis of the initial media montage. Generating the edited media montage may be further based on the visual analysis of the initial media montage. As illustrated in FIG. 7, the story manager 615 may communicate with the computer-vision (CV) modules 730 on the server side. The CV modules 730 may comprise multiple modules, e.g., module 730a (module 1), module 730b (module 2), and module 730c (module 3). As an example and not by way of limitations, each of the module 1, module 2, and module 3 may comprise one or more of a model for scene detection/recognition, a model for object detection/recognition, a model for action detection/recognition, a model for event detection/recognition, or a model for attribute detection/recognition. In particular embodiments, the CV modules 730 may retrieve clips from the memories database 630. The CV modules 730 may send the retrieved clips back to the story manager 615. Subsequently, the story manager 615 may update the digital story based on the retrieved clips. In particular embodiments, the edited media montage may be based on a video story comprising one or more of a video clip, an image, a transition, or a background. In particular embodiments, the initial media montage may comprise a plurality of video clips. Generating the edited media montage may comprise one or more of modifying a duration of one or more of the video clips, removing one or more of the video clips from the initial media montage, replacing one or more of the video clips with one or more other video clips, or reordering one or more of the video clips within the initial media montage. In particular embodiments, the story manager 615 may send the story updates to the dialog manager 216a. The dialog manager 216a may then generate an NLG response and the updated story based on the grounding context and story updates. The NLG response and updated story may be sent back to the story-event handler 715, which may present them to the user.

Use Case

In particular embodiments, the assistant system 140 may provide an intuitive way for the users to perform complex edits via multi-turn interactions. For example, the user may ask the assistant system 140 to "remove all recently added videos of pixie except those with Jon." The assistant system 140 may disambiguate and warn in case of any inconsistent edits. For example, the user may say "add pictures of our backyard." Responsively, the assistant system 140 may ask "should I exclude pixie in these memories?"

In particular embodiments, the assistant system 140 may allow the users to save preset edits and reuse them later within the dialog session and across different sessions. For example, the user may say "apply the same filter to pixie's picture similar to that on the beach picture" when the user is in the same dialog session with the assistant system 140. As another example, the user may say "copy the background music from the earlier story we created about Hawaii trip" across dialog sessions. The assistant system 140 may also use relevant information from the social graph of the user or the person whom they intend to send for recommendations. For example, the user may request "create a story of our Hawaii trip to send to mom." Responsively, the assistant system 140 may recommend "she likes beach pictures. I'll include some at the start of the story!"

The following is an example use case for generating a digital story. The user may ask "create a story of Pixie (the user's dog) for me." The assistant system 140 may traverse the user's memory graph and generate a digital story. The user may further ask "please include the video of Jack bathing her." The assistant system may retrieve the relevant videos and ask the user to disambiguate. Responsive to the user's disambiguation, the assistant system may further generate the story. The assistant system may additionally generate a chit-chat response with recommendations like "this looks great, music from Marley & Me would go well with this story. Want me to preview?"

As may be seen, the embodiments disclosed herein may have a technical advantage of enabling free-from queries/requests when creating media montages. Existing systems may not allow free-form queries/requests for what to add to the media montages. They may usually run specific queries and apply specific filters to identify content to add but may not support multi-turn edits. By contrast, based on the NLU module 208 and memory graph, the assistant system 140 may allow the understanding and processing of open-ended queries on the personalized memory graph in the following situations. One situation may be that semantic information about the memories cannot always be easily displayed for users when manually selecting content (e.g., "Birthday celebrations with the same people across different years"). Another situation may be that users may have forgotten about the existence and relationship between memories but manually creating similar videos may require the users to always remember such information.

Figure 8:
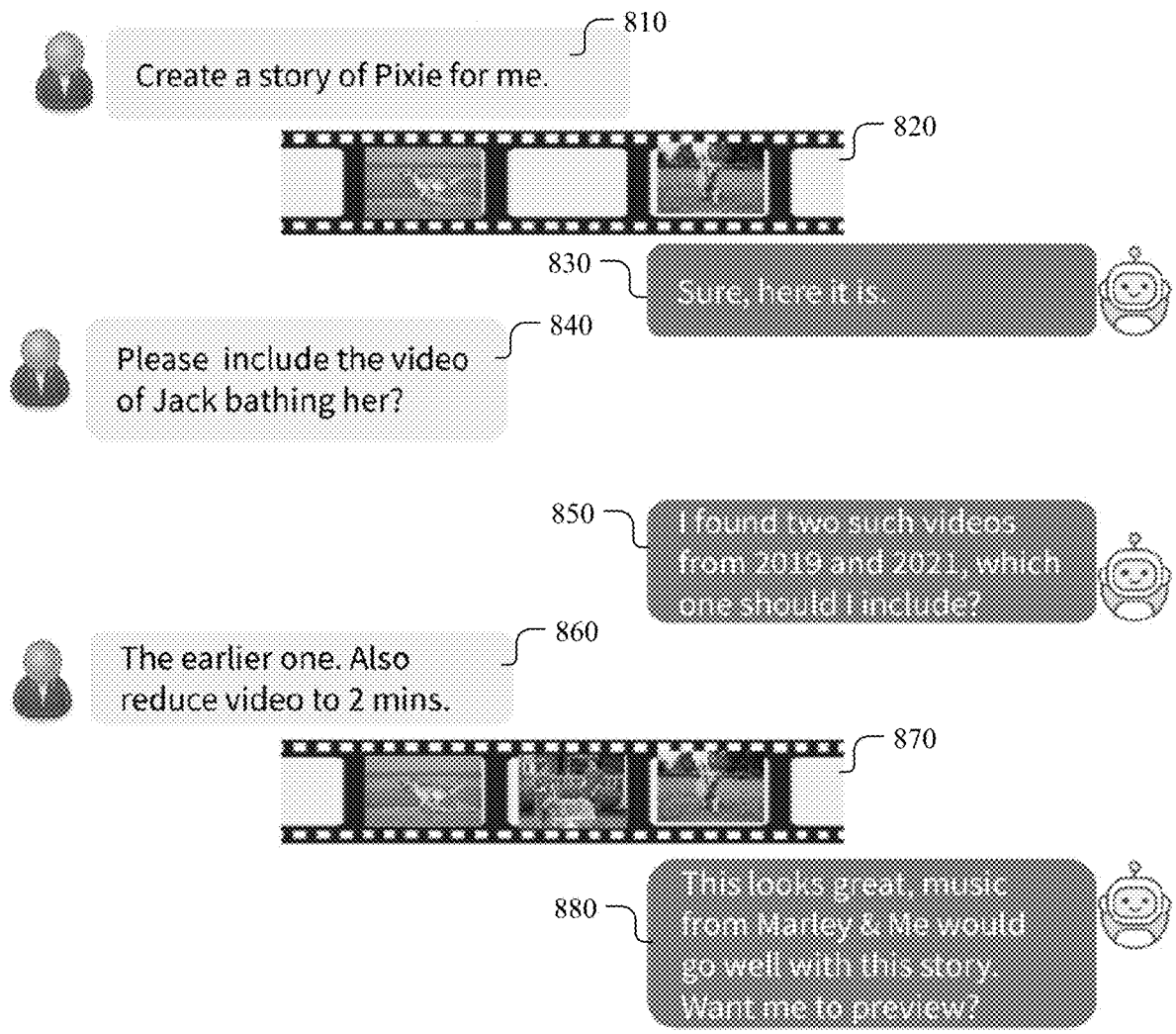
FIG. 8 illustrates an example use case for generating a digital story.

FIG. 8 illustrates an example use case for generating a digital story. A user may ask "create a story of Pixie (the user's dog) for me. 810" The assistant system 140 may traverse the user's memory graph and generate a digital story 820 and reply "sure, here it is. 830" The user may further ask "please include the video of Jack bathing her. 840" The assistant system 140 may retrieve the relevant videos and ask the user to disambiguate. For example, the assistant system 140 may ask "I found two such videos from 2019 and 2021, which one should I include? 850" The user may say "the earlier one. Also reduce video to 2 mins. 860" Responsive to the user's disambiguation and editing request, the assistant system 140 may further generate the edited story 870. The assistant system 140 may additionally generate a chit-chat response with recommendations like "this looks great, music from Marley & Me would go well with this story. Want me to preview? 880"

In particular embodiments, multi-turn interactions between the user and assistant system 140 may enable the following features. One feature may include context carryover. As an example and not by way of limitation, the assistant system 140 may perform context carryover when receiving a user request such as "Make the recently added clip shorter". Another feature may include multimodal coreferences. As an example and not by way of limitation, for a user input "Could you make it shorter?" the assistant system 140 may perform coreference to understand what "it" refers exactly.

The C3 Dataset

In particular embodiments, the C3 dataset may be based on multimodal dialog self-play. The embodiments disclosed herein may adopt a two-phase pipeline (Simulate and Paraphrase (Shah et al., 2018; Kottur et al., 2021)), extending it to a unique multimodal setting where multiple images as part of the user interface (UI) are given as grounding visual contexts. Such approach may reduce the data collection and annotation overheads (time and cost) for building a dialog dataset (vs. collecting human↔human dialogs and collecting Dialog/NLU annotations on top), as it may require little to no domain knowledge.

At a first phase, the embodiments disclosed herein may generate synthetic dialog flows using a multimodal dialog simulator that conditions on an evolving "story" and its corresponding set of clips, produced by a story generator. The story generator may output a diverse set of clips (as schematic representation) according to user requests, which may serve as grounding multimodal context for the conversations. This may be done by extracting a plausible set of meta information (time, locations and activities, etc.) from an existing memory graph, simulated and generated using the object and activity annotations from the ImageCOCO dataset (Lin et al., 2014).

In particular embodiments, the assistant system 140 may construct a user memory graph where the metadata from the user's photo and video collections may be compiled together. The assistant system 140 may form natural connections among the photos and videos based on the metadata and the predicted visual features. More information on memory graphs may be found in U.S. patent application Ser. No. 16/552,559, filed 27 Aug. 2019, and U.S. patent application Ser. No. 17/504,276, filed 26 Oct. 2021, each of which is incorporated by reference.

The dialog simulator may then take this story representation including the meta information (activities, locations, attributes, etc.) and the UI state (e.g., sequential ordering of media, viewer status) updated at each turn, to create a realistic dialog flow between a user and an assistant, using a probabilistic agenda-based approach. The simulated dialog flows comprise NLU intents (e.g., REQUEST: ADD_CLIPS), slots (e.g., activities, objects), and clip references. Specifically, the assistant system 140 may capture various video editing queries that are identified as a prioritized list of common actions required for media editing and sharing (e.g., CREATE, REMOVE, REPLACE, REORDER, REFINE, MODIFY_DURATION).

In particular embodiments, a second phase may be manual paraphrase. Once the dialog flows are simulated, the assistant system 140 may paraphrase each templated user turn via manual annotations. This step may allow the assistant system 140 to collect utterances from the natural language distribution, making the dataset robust to the user-query variability in real-world applications.

In particular embodiments, the assistant system 140 may build an annotation tool that displays NLU labels and templated utterances, along with the schematic representation of stories with media clips, updated at each turn. Annotators may be then instructed to paraphrase each turn without losing key multimodal information such as relative clip placements and meta data, objects and attributes.

While the assistant system 140 may tend to be linguistically less diverse (e.g., informing successful executions: 'Done', 'Edited') and thus may be less of the focus of the embodiments disclosed herein from an application standpoint, the embodiments disclosed herein also collect assistant responses for a 1 k dialog subset. The collected utterances may allow for the study of contextualized assistant response generation, to accompany the modified stories reflected in the UI.

The embodiments disclosed herein perform dataset analysis as follows. The C3 dataset has a total of 10 k dialogs with 136 k utterances. Dataset statistics are given in Table 2. FIGS. 9A-9B illustrate an example dialog from the C3 dataset. FIGS. 9A-9B also illustrate the schematic representation of the stories (with a sequence of clips and their meta data) associated with each turn (U: User, A: Assistant). API annotations may be formulated as follows: INTENT [slot=value, . . . ] <clip: IDs, . . . >. It may be seen that the dataset includes many challenges such as multimodal coreferences and dialog context carryovers.

TABLE 2

| C3 Dataset Statistics. | |
|---|---|
| Total # dialogs | 10 k |
| Total # utterances | 136 k |
| Total # stories | 10 k |
| Avg # words (user turns) | 11.8 ± 4.4 |
| Avg # words (assistant turns)[†] | 10.3 ± 4.1 |
| Avg # utterances/dialog | 13.5 |
| Avg # clips mentioned/dialog | 3.6 |
| Avg # clips per story | 4.3 ± 2.5 |

[†]assistant turns are collected for a 1 k dialog subset (12 k utterances).

Figure 10A:
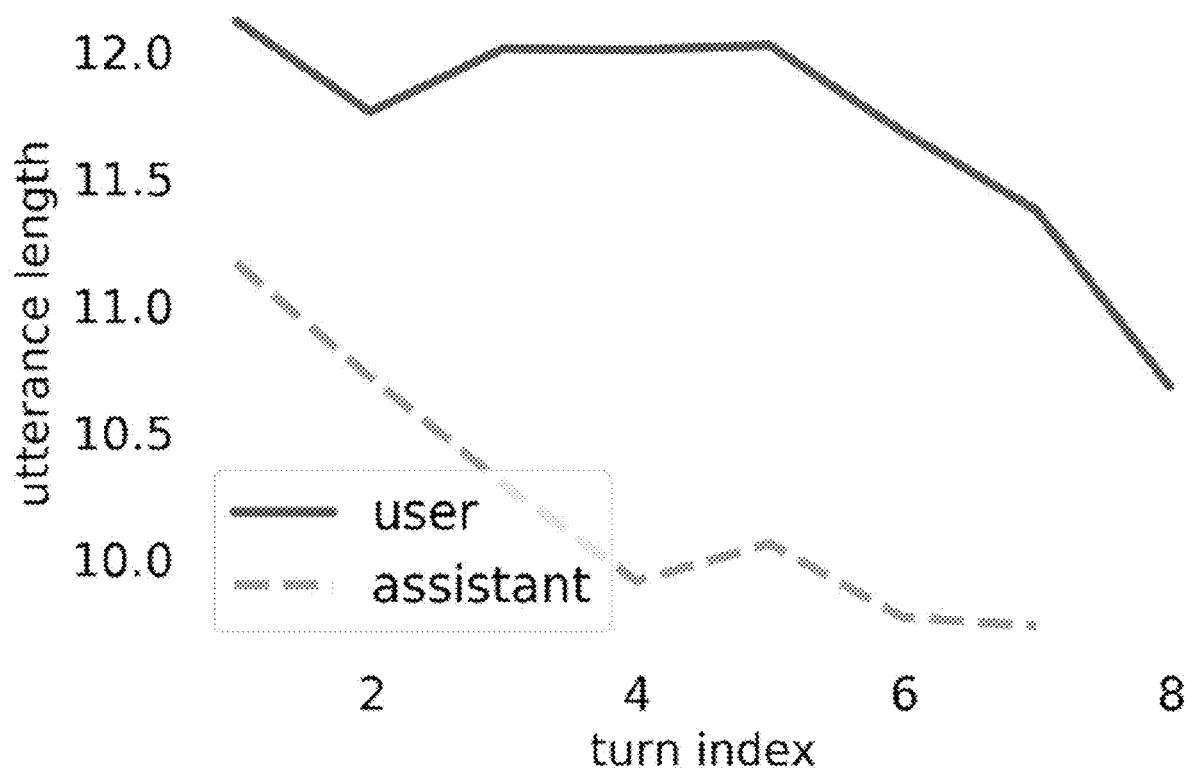
FIGS. 10A-10C illustrate example distributions of the C3 dataset.
Figure 10B:
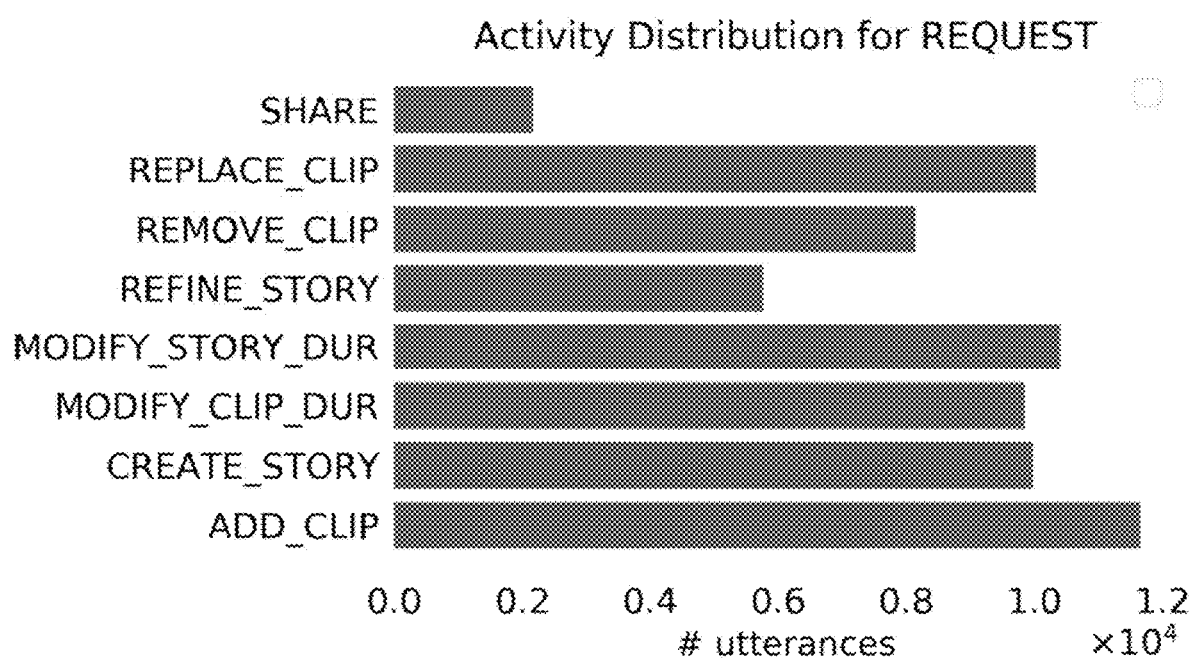
Figure 10C:
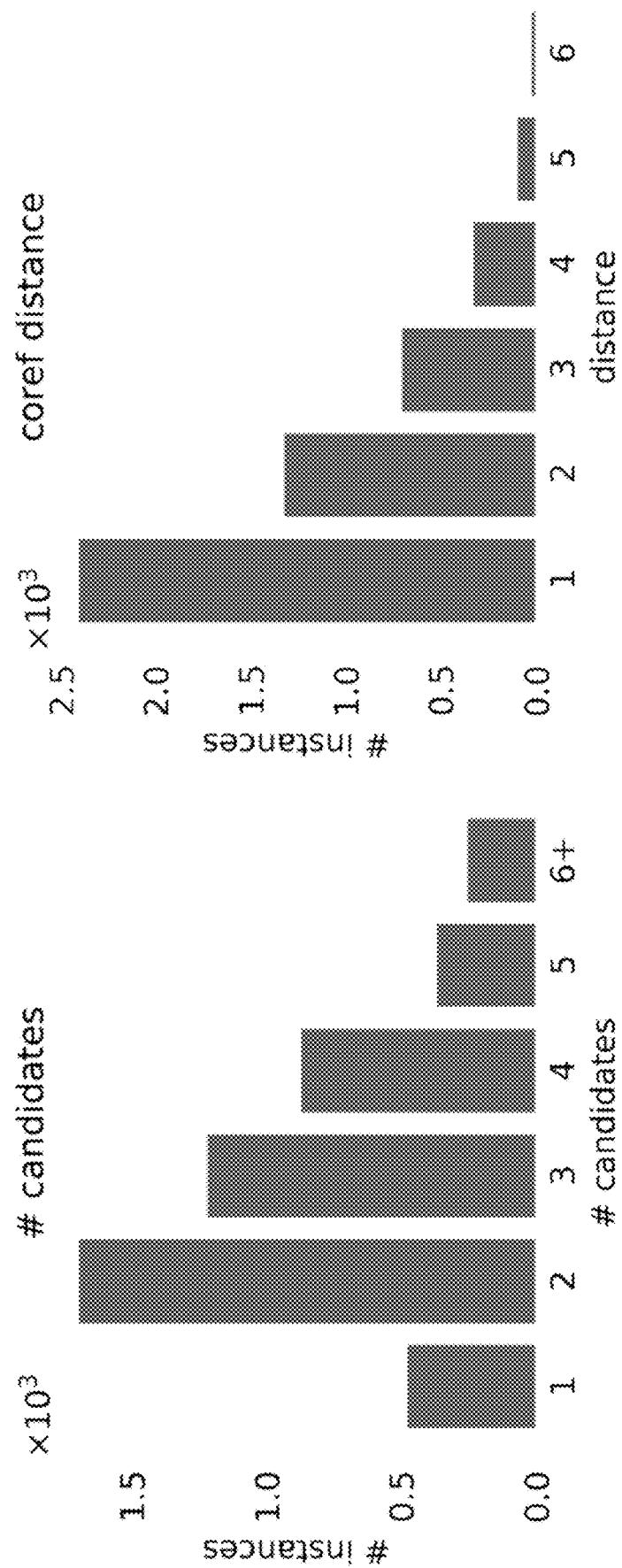

FIGS. 10A-10C illustrate example distributions of the C3 dataset. The embodiments disclosed herein first analyze the dialogs. The user and assistant turns in dialogs from C3 are about 11.8 and 10.3 words long respectively, with their distributions shown in FIG. 10A. User utterances tend to be longer on an average as they are instructive and contain finer details to manipulate the story.

The embodiments disclosed herein then analyze the dialog annotations. Dialogs in C3 are accompanied with full turn-level and dialog-level annotations, thanks to the simulate-and-paraphrase approach. The embodiments disclosed herein follow the conventional hierarchical ontology (Kottur et al., 2021) of dialog ACT and ACTIVITY to annotate both user and assistant intents. In our setup, users may request selections or edits to create a montage, while the assistant system 140 is expected to execute them and inform its results. Thus, the user and assistant dialog acts may naturally resort to REQUEST and INFORM in our ontology. FIG. 10B shows the distribution of 8 user activities.

Each turn may be grounded on an (evolving) story, which contains an average of 4.3 clips. This may lead to interesting multimodal coreferences as there are about 2.9 clip candidates to pick from for every clip mention in the dialog. Further, the average coreference distance between the mentions is 3.7, going beyond the trivial case of 1, i.e., clip mentioned in the previous turn. FIG. 10C highlights the distribution of clip candidates and distance between mentions.

Figure 11:
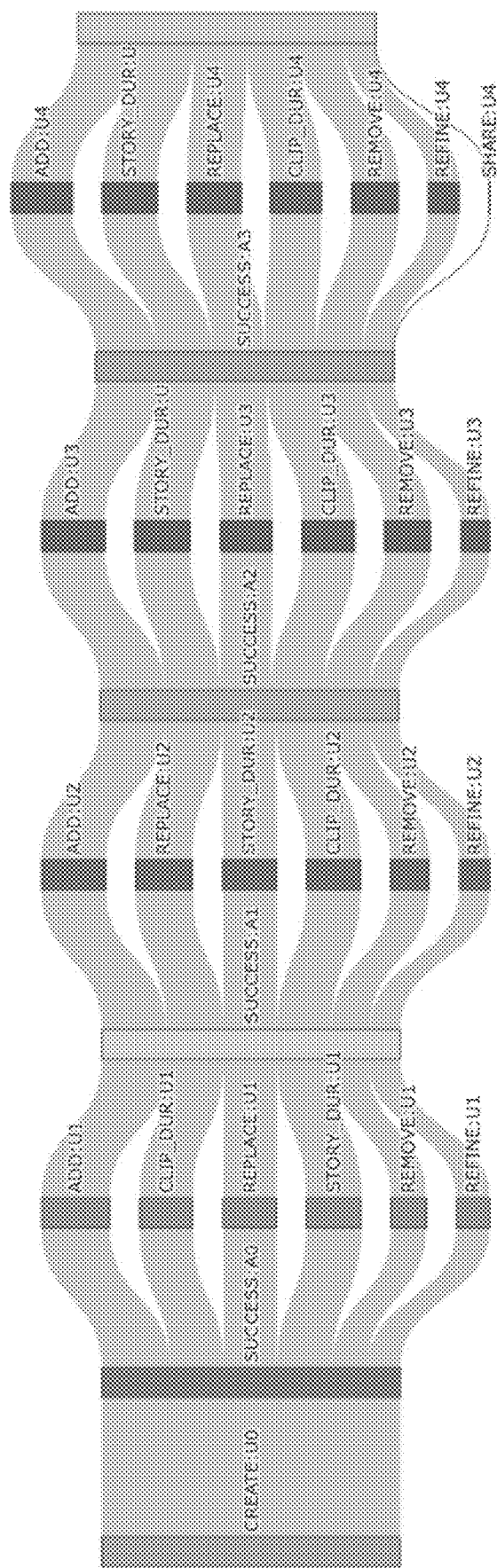
FIG. 11 illustrates an example visualization of the dialog flows.

The embodiments disclosed herein further analyze the dialog flows. FIG. 11 illustrates an example visualization of the dialog flows. FIG. 11 shows the transition of dialogs acts in C3 for the first 4 turns, for dialog flows generated by our multimodal dialog simulator. Each block is an intent at a particular [turn] labelled as ACTIVITY:[A|U][turn] to denote activity, user or assistant turn, and turn number, respectively, where [A|U] indicates either an assistant or user turn. ACT for user (REQUEST) and assistant (IN- FORM) are not shown for brevity. The gray bands denote the transitions and their width is proportional to the frequency of the transition. The almost uniform branch-off may indicate a desirable presence of diversity and thus a lack of intent bias in the dialog. Collecting a TOD dialog dataset comprising dialogs conditioned on media montages simulated from a large media collection may be an effectively solution for addressing the technical challenge of interactive content creation based on task-oriented dialogs (TOD), as the TOD dialog dataset has full turn-level and dialog-level annotations of dialog flows associated with natural language distributions.

Task Formulation

The embodiments disclosed herein utilize the C3 dataset to study dialog systems that help users create and edit montages through a multi-turn dialog. More concretely, we propose three main tasks and respective evaluation metrics in this regard:

Task 1: API Slot Prediction. We assume a 1-to-1 mapping between user intent and the relevant API to execute a user request. API slot prediction may thus involve predicting slots (e.g., participants, time) that are passed as arguments to the corresponding API, given dialog history, multimodal context of stories, and current user utterance (metric: F1). For example, 'U. Create a story of all skiing trips in 2018' may map to [activity=skiing, time=2018] as the appropriate API slots and values. We do not propose a separate API-type prediction task (e.g., api_type=CREATE_STORY) as the baseline models perform with near perfect accuracy (97%).

Task 2. Multimodal Coreference Resolution. It may be imperative for conversational systems to be able to resolve multimodal coreferences without fails as a wrongly targeted edit would require additional interactions to rectify, greatly reducing user experiences. For instance, to process 'Remove the sunset clip and replace it with something similar to the second one.', the system may need to resolve both underlined references to the corresponding clip objects to perform the desired manipulations. To test this capability in isolation, we propose task 2, where the goal is to resolve any clip references in the current user utterance to the corresponding clip objects (metric: F1), taking into account dialog history and story representations.

Task 3. Multimodal Dialog State Tracking (MM-DST). Lastly, we evaluate the system on its joint ability to: (a) predict API calls along with its slot parameters, and (b) resolve multimodal references (if any) in the given utterance, taking into account dialog state carryovers (measured with accuracy).

Figure 12:
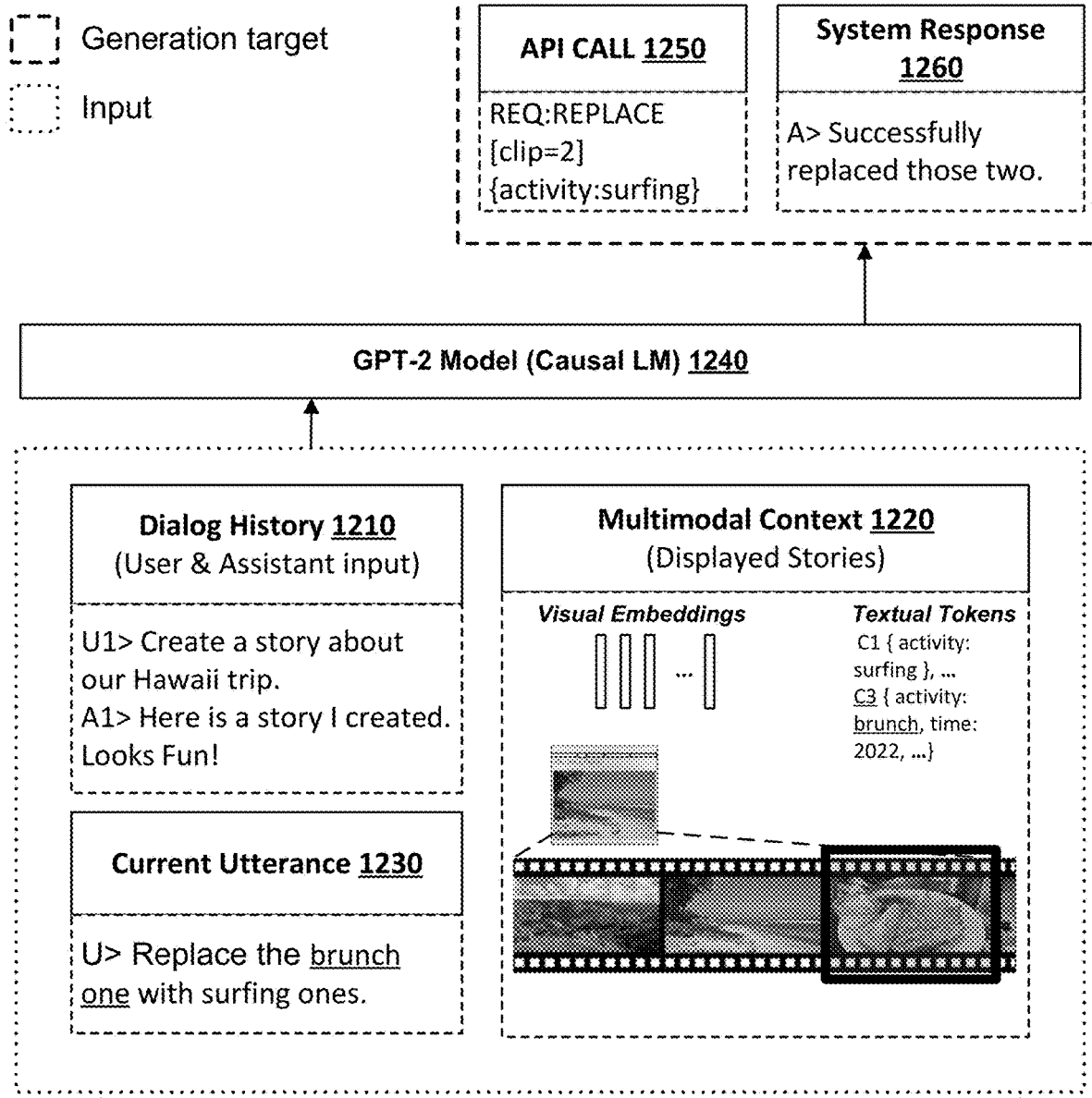
FIG. 12 illustrates an example architecture for the proposed tasks.

FIG. 12 illustrates an example architecture 1200 for the proposed tasks. In particular embodiments, the assistant system 140 may access the dialog history 1210 (e.g., user and assistant input). As an example and not by way of limitation, the dialog history 1210 may comprise a user input which is "create a story about our Hawaii trip" and an assistant input which is "here is a story I created. Looks fun!" The assistant system 140 may generate digital stories accordingly. In particular embodiments, the assistant system 140 may access the memory graph associated with the first user. The memory graph may comprise a plurality of nodes and a plurality of edges connecting the nodes. In particular embodiments, one or more of the nodes may correspond to one or more episodic memories of the first user, respectively. Each edge may correspond to a relationship between the connected nodes. The assistant system 140 may further select, based on the one or more modified slots, one or more candidate nodes from the memory graph. In particular embodiments, generating the edited media montage may be further based on one or more of the one or more candidate nodes. In particular embodiments, the assistant system 140 may determine a multimodal context 1220 for at least one of the one or more episodic memories of the first user. The multimodal context 1220 may comprise one or more of a visual embedding associated with the at least one episodic memory or a textual token associated with the at least one episodic memory. In particular embodiments, the multimodal context 1220 may comprise one or more textual tokens associated with the at least one episodic memory. Accordingly, the one or more textual tokens may be generated based on contextual information associated with the at least one episodic memory. In particular embodiments, generating the edited media montage may be further based on the multimodal context 1220. The assistant system 140 may then receive a current utterance 1230, which may be "replace the brunch one with surfing ones." Traversing a user's memory graph to identify candidate episodic memories for generating and editing media montages may be an effective solution for addressing the technical challenge of generating and editing personalized media montages, as these candidate episodic memories help identify media content that is of user interest.

In particular embodiments, generating the edited media montage may be further based on a language model. As illustrated in FIG. 12, the assistant system 140 may input the dialog history 1210, multimodal context 1220, and current utterance 1230 to a language model 1240. As an example and not by way of limitation, the language model 1240 may be a GPT-2 model. In particular embodiments, the assistant system 140 may determine, by a dialog manager 216, an application-program-interface (API) call 1250 based on one or more outputs from the language model 1240. The API call 1250 may specify the editing request (e.g., replace), the clip ID (e.g., 2), and activity (e.g., surfing). In particular embodiments, the language model 1240 may additionally generate a response 1260 associated with the edited media montage, e.g., "successfully replaced those two." The assistant system 140 may further send, to the client system 130 during the dialog session, instructions for presenting the generated response 1260. Using a language model 1240 based on the dialog history 1210, multimodal context 1220 comprising visual embeddings and textual tokens of episodic memories, and current utterance 1230 to generate API call specifying editing requests, clip identifiers, and activities to be incorporated into the media montages may be another effective solution for addressing the technical challenge of generating and editing personalized media montages.

Modeling & Empirical Analysis

The embodiments disclosed herein perform a preliminary empirical evaluation and train baselines for the tasks described above.

TABLE 3

Baseline performances for GPT-2 models w/multimodal image features (embed) and stringified text (tokens).

| Model | 1. API Slot Slot F1 ↑ | 2. Coref Coref F1 ↑ | 3. DST Acc. ↑ |
| --- | --- | --- | --- |
| GPT-2 (tokens) | 88.3 ± 0.3 | 70.4 ± 0.5 | 72.8 |
| GPT-2 (embed) | 90.1 ± 0.1 | 81.5 ± 0.6 | 79.6 |

(1) API Call Slot Prediction (API Slot), via slot F1, (2) Multimodal Coreference Resolution (Coref), via coref prediction F1, (3) Dialog State Tracking (DST), via Joint Accuracy.
↑ higher is better.

In particular embodiments, we may split the 10 k dialogs into training set (60%), validation set (20%), and testing set (20%). All models may be trained on training set with validation set used to pick the hyper-parameters, and results may be reported on testing set.

Following the recent success of finetuning pretrained language models (LMs) on task-oriented dialogs (TODs) (Hosseini-Asl et al., 2020; Peng et al., 2020), the embodiments disclosed herein may adopt GPT-2 (Radford et al., 2019) and extend these work by adding two different ways of representing multimodal contexts (story): (a) visual embeddings (embed), where we may extract object-centric visual features for constituent clips (Ren et al., 2015) projected into the hidden size of GPT-2 via a linear layer, and (b) stringified text (tokens), where the story information may be represented as stringified tokens. The models may be trained to predict API calls, slot values, and clip mentions given a sequential input of its dialog context and multimodal context as above, through a conditional LM loss. More details are in Appendix B.

From Table 3, it may be seen that the models achieve reasonably reliable performances for API prediction, while the coreference resolution task (exactly pinpointing which set of clips a user mentions) may still remain a challenge. This may be due to the various types of coreferences that exist in the C3 dataset that make resolutions uniquely challenging (e.g., adjectival: "the sunset clip", ordinal: "the second to the last one, device context: "the one I'm currently viewing", long-range carryover: "the one I added earlier"). This result may suggest future modeling directions that could leverage the unique multimodal context more explicitly. It may also be shown that the model that uses raw visual embeddings outperforms the model that uses stringfied textual tokens, by better incorporating rich context present in visual information.

To conclude, the embodiments disclosed herein propose a novel task of building a TOD system for interactively creating storytelling media contents from a personal media collection. The embodiments disclosed herein build a new multimodal dataset (10 k dialogs & 136 k turns) with rich dialog annotations and story representations. Our analysis with the SOTA LM-based multimodal dialog model may highlight the key challenges such as multimodal coreference resolution and MM-DST. Lastly, our mobile application may demonstrate the feasibility of our C3 dataset and model on popular real-world applications in short and long-form content creation and sharing.

Limitations

The generalizability and the use cases of the C3 dataset may be bounded by the synthetic nature of the multimodal dialog simulator used for this study. However, we note that even with the simulated dialog flows, C3 may capture several interesting challenges that are not addressed in the previous literature such as the use of media montage representations and device status as the grounding context for multimodal conversations, which may open the door to new research directions. We may open-source the multimodal dialog simulator used in the study for anyone to further develop any video-editing operations that are not included in C3, if necessary.

REFERENCES

The following list of references correspond to the citations above:

Pawel Budzianowski, Tsung-Hsien Wen, Bo-Hsiang Tseng, Iñigo Casanueva, Stefan Ultes, Osman Ramadan, and Milica Gašié. 2018. MultiWOZ—a large-scale multi-domain wizard-of-Oz dataset for task-oriented dialogue modelling. In *Proceedings of the Conference on Empirical Methods in Natural Language Processing (EMNLP)*.

Victor S Bursztyn, Jennifer Healey, and Vishwa Vinay. 2021. Gaud\'i: Conversational interactions with deep representations to generate image collections. *arXiv preprint arXiv:*2112.04404.

Mihail Eric, Rahul Goel, Shachi Paul, Adarsh Kumar, Abhishek Sethi, Peter Ku, Anuj Kumar Goyal, Sanchit Agarwal, Shuyag Gao, and Dilek Hakkani-Tur. 2019. Multiwoz 2.1: Multi-domain dialogue state corrections and state tracking baselines. *arXiv preprint arXiv:* 1907.01669.

Shuyang Gao, Sanchit Agarwal Abhishek Seth and, Tagyoung Chun, and Dilek Hakkani-Ture. 2019. Dialog state tracking: A neural reading comprehension approach. In *Special Interest Group on Discourse and Dialogue (SIGDIAL)*.

Xiaoxiao Guo, Hui Wu, Yu Cheng, Steven Rennie, Gerald Tesauro, and Rogerio Feris. 2018a. Dialog-based interactive image retrieval. In *NeurIPS*.

Xiaoxiao Guo, Hui Wu, Yu Cheng, Steven Rennie, Gerald Tesauro, and Rogerio Feris. 2018b. Dialog-based interactive image retrieval. In *Advances in Neural Information Processing Systems*, volume 31. Curran Associates, Inc.

Ehsan Hosseini-Asl, Bryan McCann, Chien-Sheng Wu, Semih Yavuz, and Richard Socher. 2020. A simple language model for task-oriented dialogue. *arXiv preprint arXiv:*2005.00796.

Tero Karras, Samuli Laine, and Timo Aila. 2019. A style-based generator architecture for generative adversarial networks. In *Proceedings of the IEEE/CVF conference on computer vision and pattern recognition*, pages 4401-4410.

Satwik Kottur, Seungwhan Moon, Alborz Geramifard, and Babak Damavandi. 2021. SIMMC 2.0: A task-oriented dialog dataset for immersive multimodal conversations. In *Proceedings of the 2021 Conference on Empirical Methods in Natural Language Processing*, pages 4903-4912, Online and Punta *Cana*, Dominican Republic. Association for Computational Linguistics.

Tsung-Yi Lin, Michael Maire, Serge Belongie, James Hays, Pietro Perona, Deva Ramanan, Piotr Dollár, and C Lawrence Zitnick. 2014. Microsoft coco: Common objects in context. In *European conference on computer vision*, pages 740-755. Springer.

Tzu-Hsiang Lin, Trung Bui, Doo Soon Kim, and Jean Oh. 2020. A multimodal dialogue system for conversational image editing. *arXiv preprint arXiv:*2002.06484.

Baolin Peng, Chunyuan Li, Jinchao Li, Shahin Shayan-deh, Lars Liden, and Jianfeng Gao. 2020. Soloist: Few-shot task-oriented dialog with a single pretrained auto-regressive model. *arXiv preprint arXiv:*2005.05298.

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. 2021. Learning transferable visual models from natural language supervision. In *International Conference on Machine Learning*, pages 8748-8763. PMLR.

Alec Radford, Jeffrey Wu, Rewon Child, David Luan, Dario Amodei, and Ilya Sutskever. 2019. Language models are unsupervised multitask learners. *OpenAI blog*, 1(8):9.

Abhinav Rastogi, Xiaoxue Zang, Srinivas Sunkara, Raghav Gupta, and Pranav Khaitan. 2019. Towards scalable multi-domain conversational agents: The schema-guided dialogue dataset. In *Association for the Advancement of Artificial Intelligence (AAAI)*.

Shaoqing Ren, Kaiming He, Ross Girshick, and Jian Sun. 2015. Faster r-cnn: Towards real-time object detection with region proposal networks. In *Advances in Neural Information Processing Systems*, volume 28. Curran Associates, Inc.

Pararth Shah, Dilek Hakkani-Tür, Gokhan Tür, Ab-hinav Rastogi, Ankur Bapna, Neha Nayak, and Larry Heck. 2018. Building a conversational agent overnight with dialogue self-play. *arXiv preprint arXiv*:1801.04871.

Fuwen Tan, Paola Cascante-Bonilla, Xiaoxiao Guo, Hui Wu, Song Feng, and Vicente Ordonez. 2019. Drill-down: Interactive retrieval of complex scenes using natural language queries. In *Neural Information Processing Systems (NeurIPS)*.

Stefanie Tellex and Deb Roy. 2009. Towards surveillance video search by natural language query. In *Proceedings of the ACM International Conference on Image and Video Retrieval*, CIVR '09, New York, NY, USA. Association for Computing Machinery.

Nam Vo, Lu Jiang, Chen Sun, Kevin Murphy, Li-Jia Li, Li Fei-Fei, and James Hays. 2019. Composing text and image for image retrieval—an empirical odyssey. In *Proceedings of the IEEE/CVF Conference on Computer Vision and Pattern Recognition* (CVPR).

Yufan Zhou, Ruiyi Zhang, Jiuxiang Gu, Chris Tens-meyer, Tong Yu, Changyou Chen, Jinhui Xu, and Tong Sun. 2022. Interactive image generation with natural-language feedback.

Appendix A: Demo Interface

Figure 13A:
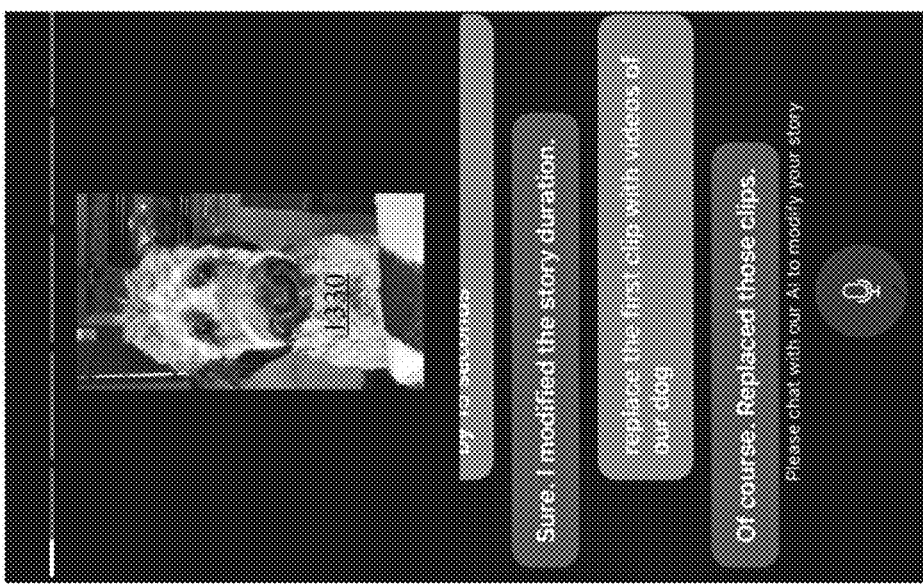
FIGS. 13A-13C illustrate an example mobile demo application for editing a media montage.
Figure 13B:
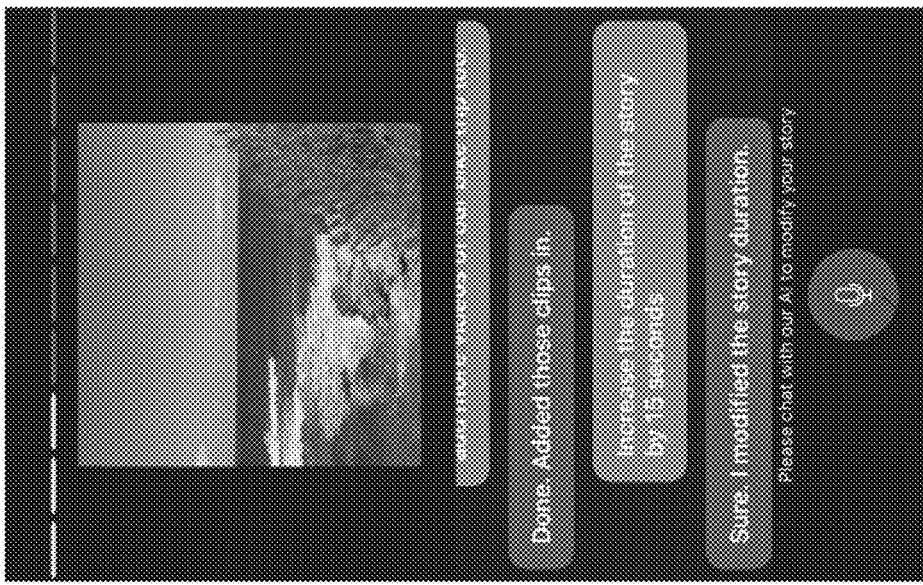
Figure 13C:
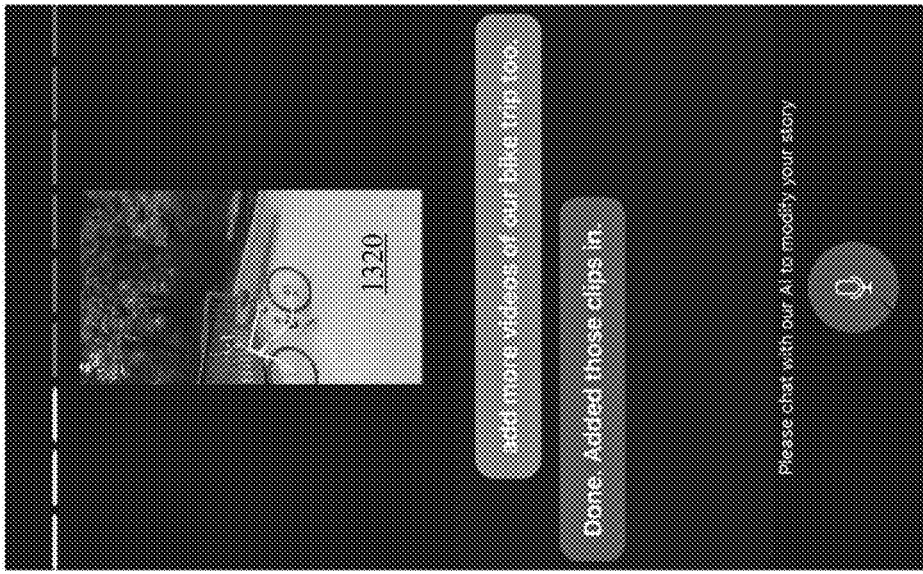

To demonstrate the feasibility of the real-world applications of the proposed dataset and models, the embodiments disclosed herein built a mobile demo application that runs the model trained with the C3 dataset. FIGS. 13A-13C illustrate an example mobile demo application for editing a media montage. The user may chat with the assistant system 140 (e.g., "our AI") to modify their story, as indicated by the microphone icon 1310. As illustrated in FIG. 13A, the user may request to add more videos of their trip too. As may be seen, the media montage now includes a video of a bike 1320. The system response may be "done. Added those clips in." As illustrated in FIG. 13B, the user may continue requesting to edit the media montage, e.g., "increase the duration of the story by 15 seconds." The system response may be "sure. I modified the story duration." As illustrated in FIG. 13C, the user may continue requesting to edit the media montage, e.g., "replace the first clip with videos of our dog." As may be seen, the media montage now includes a video of a dog 1330. The system response may be "of course. Replaced those clips." As illustrated in FIGS. 13A-13C, the demo may successfully handle unscripted user requests (not drawn from the training data) on a personal video collection as a retrieval target set, showing the promising use cases of the embodiments disclosed herein. As illustrated, the embodiments disclosed herein may have a technical advantage of enabling users to modify media montages via voice interactions as the memory graph may enable the assistant system 140 to provide such functions even when the user's modifying request is complicated, e.g., "remove all pixie's clips keep the ones with my partner."

Note that a computer vision model was used to preprocess and extract key visual concepts for each video in the collection. Each video was indexed with the extracted concepts and stored in a database in advance for faster inference.

At inference time, the mobile front-end may run an ASR model to get a transcript of a user's request, which may be then routed to the dialog model. Once the dialog model predicts the API call and parameters, we may retrieve the associated video files and execute the requested create or edit operations on the story.

Appendix B: Multimodal DST with a Causal Language Model

Following the recent success of finetuning pre-trained LMs on task-oriented dialog task modeling (Hosseini-Asl et al., 2020; Peng et al., 2020), the embodiments disclosed herein cast the MM-DST as a causal language inference task. Specifically, we may use the concatenated {<dialog history>, <multimodal context>} as the prompting context for the LM (where multimodal context is represented either as visual embeddings or textual tokens), and use the task labels {INTENT [slot=value, . . . ]<clip: IDs, . . . >} as the target for causal LM inference.

We may use the 12-layer GPT-2 (117M) model (Radford et al., 2019) and finetune it on the C3 dataset, using early stopping based on token perplexity (<3 GPU hours).

Appendix C: Ethical Considerations

The data paraphrase task may be contracted through an external vendor that specializes in NLP annotations, where annotators may be employed as full-time. Annotators may be provided with clear instructions including a detailed escalation path ("Report Dialog") for an (unlikely) case where the templated utterance may include sensitive topics.

Please note that the figures used in this disclosure are from applicant's personal media collections, and do not include identifiable faces or sensitive topics.

Figure 14:
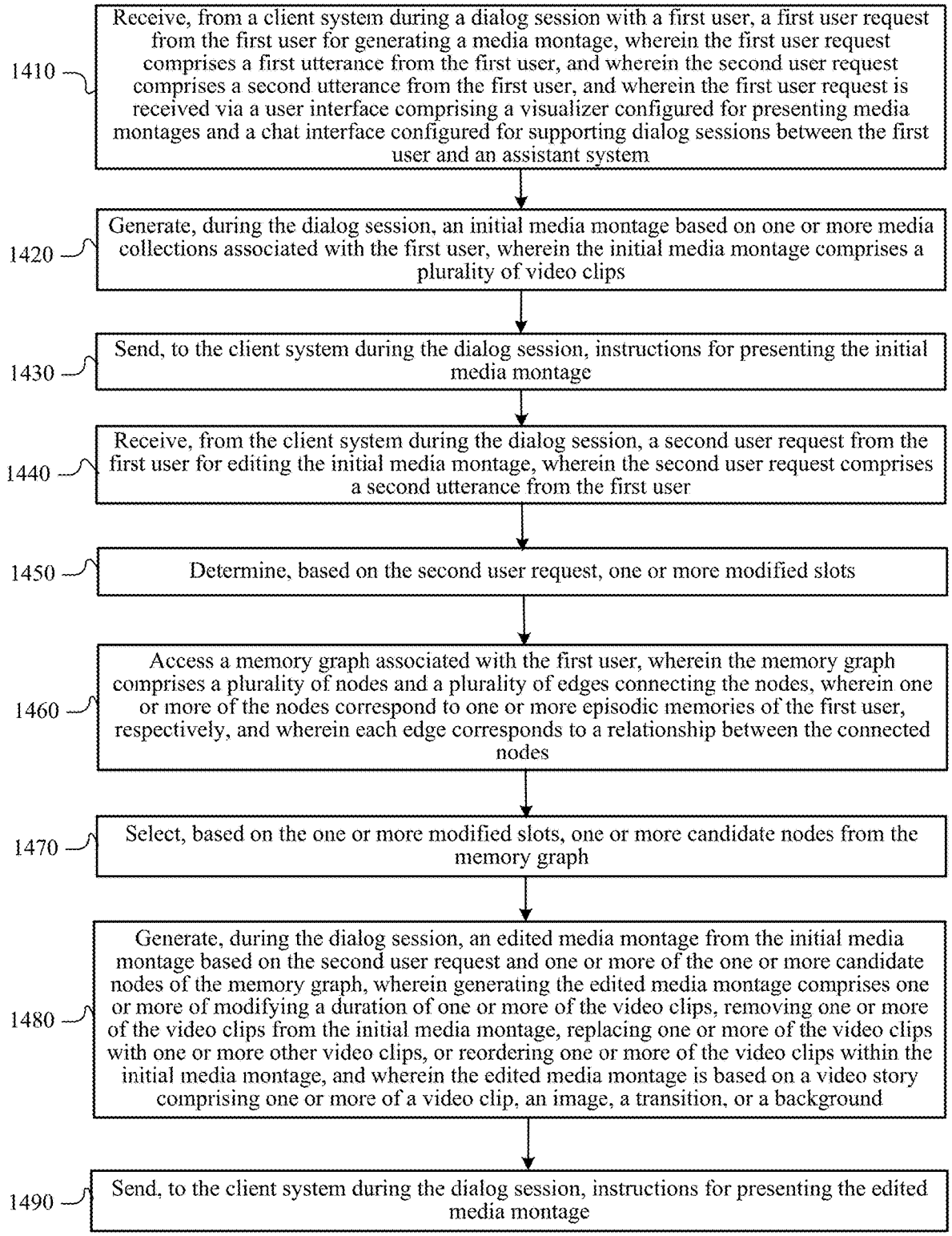
FIG. 14 illustrates an example method for generating and editing media montages.

FIG. 14 illustrates an example method 1400 for generating and editing media montages. The method may begin at step 1410, where the assistant system 140 may receive, from a client system 130 during a dialog session with a first user, a first user request from the first user for generating a media montage, wherein the first user request comprises a first utterance from the first user, and wherein the first user request is received via a user interface comprising a visualizer configured for presenting media montages and a chat interface configured for supporting dialog sessions between the first user and an assistant system 140. At step 1420, the assistant system 140 may generate, during the dialog session, an initial media montage based on one or more media collections associated with the first user, wherein the initial media montage comprises a plurality of video clips. At step 1430, the assistant system 140 may send, to the client system 130 during the dialog session, instructions for presenting the initial media montage. At step 1440, the assistant system 140 may receive, from the client system 130 during the dialog session, a second user request from the first user for editing the initial media montage, wherein the second user request comprises a second utterance from the first user. At step 1450, the assistant system 140 may determine, based on the second user request, one or more modified slots. At step 1460, the assistant system 140 may access a memory graph associated with the first user, wherein the memory graph comprises a plurality of nodes and a plurality of edges connecting the nodes, wherein one or more of the nodes correspond to one or more episodic memories of the first user, respectively, and wherein each edge corresponds to a relationship between the connected nodes. At step 1470, the assistant system 140 may select, based on the one or more modified slots, one or more candidate nodes from the memory graph. At step 1480, the assistant system 140 may generate, during the dialog session, an edited media montage from the initial media montage based on the second user request and one or more of the one or more candidate nodes of the memory graph, wherein generating the edited media montage comprises one or more of modifying a duration of one or more of the video clips, removing one or more of the video clips from the initial media montage, replacing one or more of the video clips with one or more other video clips, or reordering one or more of the video clips within the initial media montage, and wherein the edited media montage is based on a video story comprising one or more of a video clip, an image, a transition, or a background. At step 1490, the assistant system 140 may send, to the client system 130 during the dialog session, instructions for presenting the edited media montage. Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for generating and editing media montages including the particular steps of the method of FIG. 14, this disclosure contemplates any suitable method for generating and editing media montages including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Social Graphs

Figure 15:
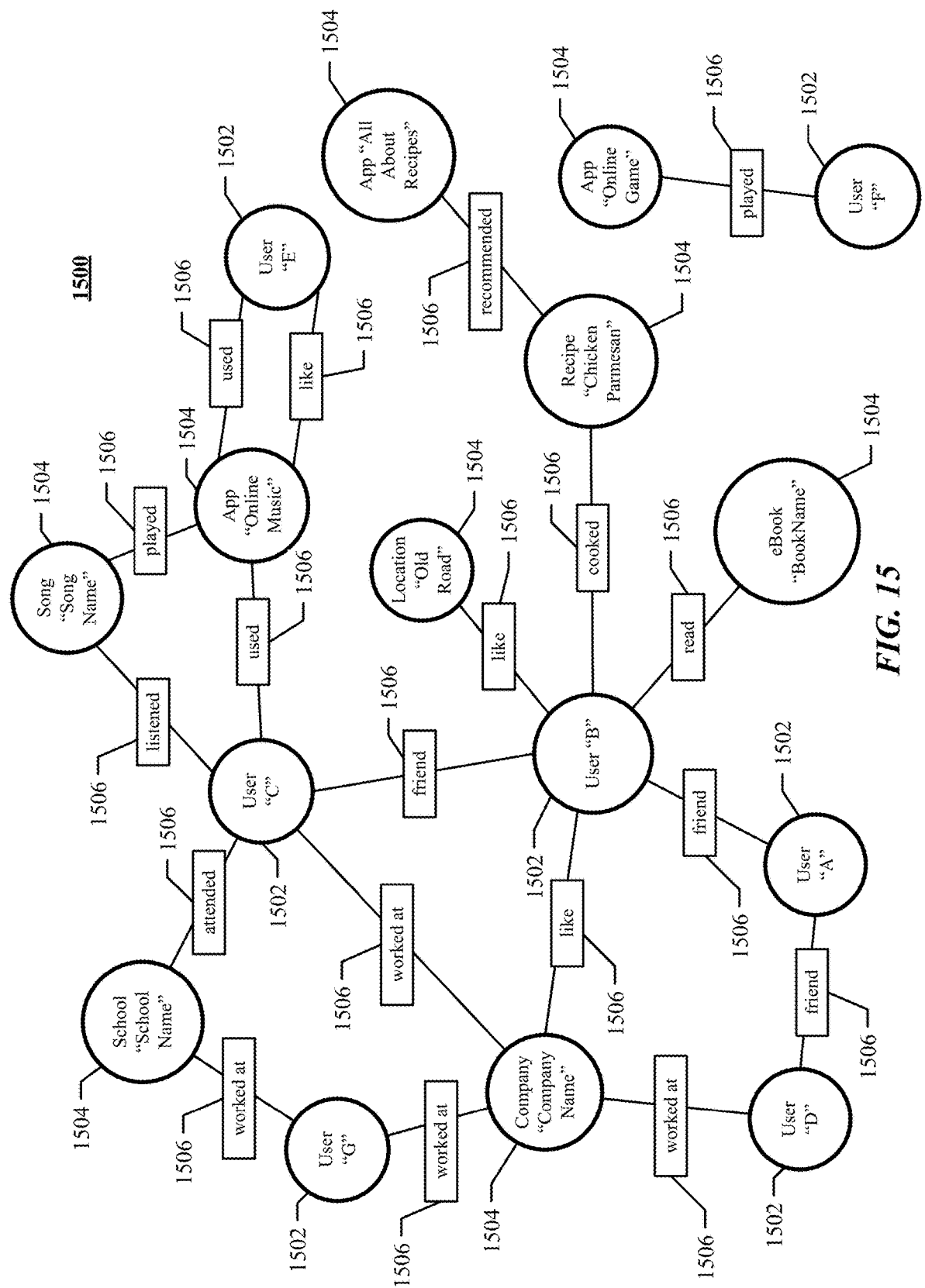
FIG. 15 illustrates an example social graph.

FIG. 15 illustrates an example social graph 1500. In particular embodiments, the social-networking system 160 may store one or more social graphs 1500 in one or more data stores. In particular embodiments, the social graph 1500 may include multiple nodes—which may include multiple user nodes 1502 or multiple concept nodes 1504—and multiple edges 1506 connecting the nodes. Each node may be associated with a unique entity (i.e., user or concept), each of which may have a unique identifier (ID), such as a unique number or username. The example social graph 1500 illustrated in FIG. 15 is shown, for didactic purposes, in a two-dimensional visual map representation. In particular embodiments, a social-networking system 160, a client system 130, an assistant system 140, or a third-party system 170 may access the social graph 1500 and related social-graph information for suitable applications. The nodes and edges of the social graph 1500 may be stored as data objects, for example, in a data store (such as a social-graph database). Such a data store may include one or more searchable or queryable indexes of nodes or edges of the social graph 1500.

In particular embodiments, a user node 1502 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 1502 corresponding to the user, and store the user node 1502 in one or more data stores. Users and user nodes 1502 described herein may, where appropriate, refer to registered users and user nodes 1502 associated with registered users. In addition or as an alternative, users and user nodes 1502 described herein may, where appropriate, refer to users that have not registered with the social-networking system 160. In particular embodiments, a user node 1502 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 1502 may be associated with one or more data objects corresponding to information associated with a user. In particular embodiments, a user node 1502 may correspond to one or more web interfaces.

In particular embodiments, a concept node 1504 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1504 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1504 may be associated with one or more data objects corresponding to information associated with concept node 1504. In particular embodiments, a concept node 1504 may correspond to one or more web interfaces.

In particular embodiments, a node in the social graph 1500 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 1504. Profile interfaces may be viewable by all or a selected subset of other users. As an example and not by way of limitation, a user node 1502 may have a corresponding user-profile interface in which the corresponding user may add content, make declarations, or otherwise express himself or herself. As another example and not by way of limitation, a concept node 1504 may have a corresponding concept-profile interface in which one or more users may add content, make declarations, or express themselves, particularly in relation to the concept corresponding to concept node 1504.

In particular embodiments, a concept node 1504 may represent a third-party web interface or resource hosted by a third-party system 170. The third-party web interface or resource may include, among other elements, content, a selectable or other icon, or other inter-actable object representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 1502 corresponding to the user and a concept node 1504 corresponding to the third-party web interface or resource and store edge 1506 in one or more data stores.

In particular embodiments, a pair of nodes in the social graph 1500 may be connected to each other by one or more edges 1506. An edge 1506 connecting a pair of nodes may represent a relationship between the pair of nodes. In particular embodiments, an edge 1506 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 1506 connecting the first user's user node 1502 to the second user's user node 1502 in the social graph 1500 and store edge 1506 as social-graph information in one or more of data stores 164. In the example of FIG. 15, the social graph 1500 includes an edge 1506 indicating a friend relation between user nodes 1502 of user "A" and user "B" and an edge indicating a friend relation between user nodes 1502 of user "C" and user "B." Although this disclosure describes or illustrates particular edges 1506 with particular attributes connecting particular user nodes 1502, this disclosure contemplates any suitable edges 1506 with any suitable attributes connecting user nodes 1502. As an example and not by way of limitation, an edge 1506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 1500 by one or more edges 1506. The degree of separation between two objects represented by two nodes, respectively, is a count of edges in a shortest path connecting the two nodes in the social graph 1500. As an example and not by way of limitation, in the social graph 1500, the user node 1502 of user "C" is connected to the user node 1502 of user "A" via multiple paths including, for example, a first path directly passing through the user node 1502 of user "B," a second path passing through the concept node 1504 of company "CompanyName" and the user node 1502 of user "D," and a third path passing through the user nodes 1502 and concept nodes 1504 representing school "SchoolName," user "G," company "CompanyName," and user "D." User "C" and user "A" have a degree of separation of two because the shortest path connecting their corresponding nodes (i.e., the first path) includes two edges 1506.

In particular embodiments, an edge 1506 between a user node 1502 and a concept node 1504 may represent a particular action or activity performed by a user associated with user node 1502 toward a concept associated with a concept node 1504. As an example and not by way of limitation, as illustrated in FIG. 15, a user may "like," "attended," "played," "listened," "cooked," "worked at," or "read" a concept, each of which may correspond to an edge type or subtype. A concept-profile interface corresponding to a concept node 1504 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("SongName") using a particular application (a third-party online music application). In this case, the social-networking system 160 may create a "listened" edge 1506 and a "used" edge (as illustrated in FIG. 15) between user nodes 1502 corresponding to the user and concept nodes 1504 corresponding to the song and application to indicate that the user listened to the song and used the application. Moreover, the social-networking system 160 may create a "played" edge 1506 (as illustrated in FIG. 15) between concept nodes 1504 corresponding to the song and the application to indicate that the particular song was played by the particular application. In this case, "played" edge 1506 corresponds to an action performed by an external application (the third-party online music application) on an external audio file (the song "SongName"). Although this disclosure describes particular edges 1506 with particular attributes connecting user nodes 1502 and concept nodes 1504, this disclosure contemplates any suitable edges 1506 with any suitable attributes connecting user nodes 1502 and concept nodes 1504. Moreover, although this disclosure describes edges between a user node 1502 and a concept node 1504 representing a single relationship, this disclosure contemplates edges between a user node 1502 and a concept node 1504 representing one or more relationships. As an example and not by way of limitation, an edge 1506 may represent both that a user likes and has used at a particular concept. Alternatively, another edge 1506 may represent each type of relationship (or multiples of a single relationship) between a user node 1502 and a concept node 1504 (as illustrated in FIG. 15 between user node 1502 for user "E" and concept node 1504 for "online music application").

In particular embodiments, the social-networking system 160 may create an edge 1506 between a user node 1502 and a concept node 1504 in the social graph 1500. As an example and not by way of limitation, a user viewing a concept-profile interface (such as, for example, by using a web browser or a special-purpose application hosted by the user's client system 130) may indicate that he or she likes the concept represented by the concept node 1504 by clicking or selecting a "Like" icon, which may cause the user's client system 130 to send to the social-networking system 160 a message indicating the user's liking of the concept associated with the concept-profile interface. In response to the message, the social-networking system 160 may create an edge 1506 between user node 1502 associated with the user and concept node 1504, as illustrated by "like" edge 1506 between the user and concept node 1504. In particular embodiments, the social-networking system 160 may store an edge 1506 in one or more data stores. In particular embodiments, an edge 1506 may be automatically formed by the social-networking system 160 in response to a particular user action. As an example and not by way of limitation, if a first user uploads a picture, reads a book, watches a movie, or listens to a song, an edge 1506 may be formed between user node 1502 corresponding to the first user and concept nodes 1504 corresponding to those concepts. Although this disclosure describes forming particular edges 1506 in particular manners, this disclosure contemplates forming any suitable edges 1506 in any suitable manner.

Vector Spaces and Embeddings

Figure 16:
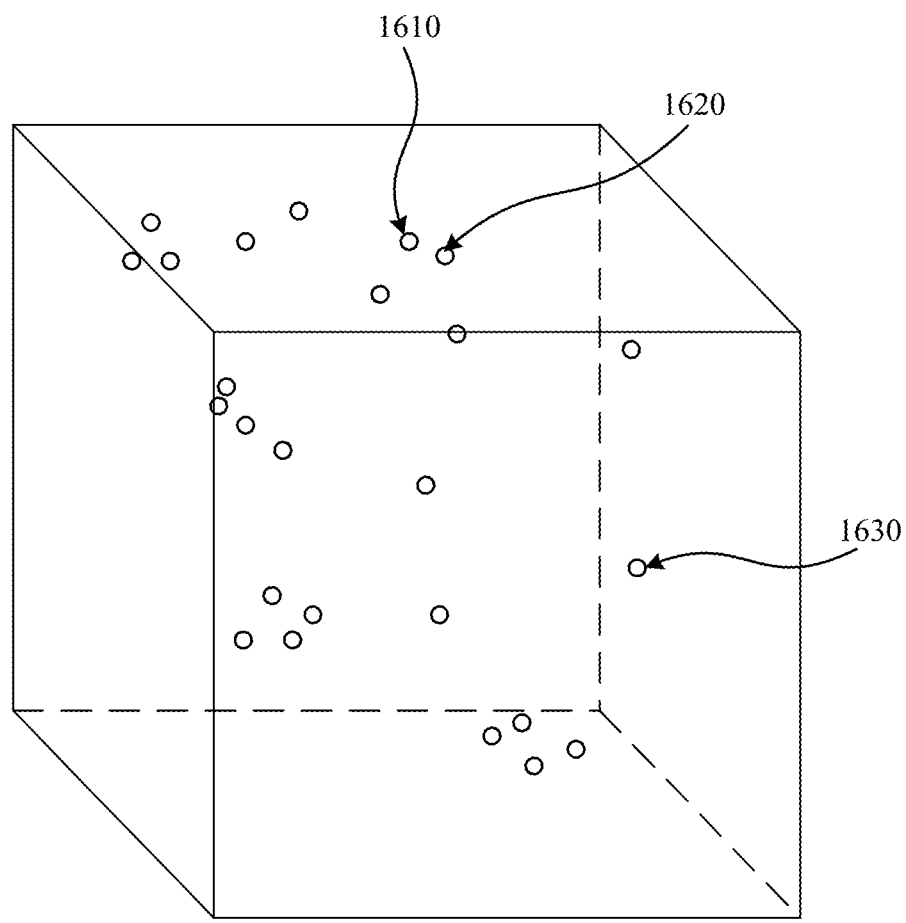
FIG. 16 illustrates an example view of an embedding space.

FIG. 16 illustrates an example view of a vector space 1600. In particular embodiments, an object or an n-gram may be represented in a d-dimensional vector space, where d denotes any suitable number of dimensions. Although the vector space 1600 is illustrated as a three-dimensional space, this is for illustrative purposes only, as the vector space 1600 may be of any suitable dimension. In particular embodiments, an n-gram may be represented in the vector space 1600 as a vector referred to as a term embedding. Each vector may comprise coordinates corresponding to a particular point in the vector space 1600 (i.e., the terminal point of the vector). As an example and not by way of limitation, vectors 1610, 1620, and 1630 may be represented as points in the vector space 1600, as illustrated in FIG. 16. An n-gram may be mapped to a respective vector representation. As an example and not by way of limitation, n-grams $t_1$ and $t_2$ may be mapped to vectors $\vec{v}_1$ and $\vec{v}_2$ in the vector space 1600, respectively, by applying a function I defined by a dictionary, such that $\vec{v}_1 = \vec{\pi}(t_1)$ and $\vec{v}_2 = \vec{\pi}(t_2)$. As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 1600. In particular embodiments, an n-gram may be mapped to a vector representation in the vector space 1600 by using a machine leaning model (e.g., a neural network). The machine learning model may have been trained using a sequence of training data (e.g., a corpus of objects each comprising n-grams).

In particular embodiments, an object may be represented in the vector space 1600 as a vector referred to as a feature vector or an object embedding. As an example and not by way of limitation, objects $e_1$ and $e_2$ may be mapped to vectors $\vec{v}_1$ and $\vec{v}_2$ in the vector space 1600, respectively, by applying a function $\vec{\pi}$, such that $\vec{v}_1 = \vec{\pi}(e_1)$ and $\vec{v}_2 = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function i may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function i may map the object to a vector using a transformed reduced set of features (e.g., feature selection). In particular embodiments, a function i may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 1600. A similarity metric may be a cosine similarity, a Minkowski distance, a Mahalanobis distance, a Jaccard similarity coefficient, or any suitable similarity metric. As an example and not by way of limitation, a similarity metric of $\vec{v}_1$ and $\vec{v}_2$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v}_1$ and $\vec{v}_2$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 1600. As an example and not by way of limitation, vector 1610 and vector 1620 may correspond to objects that are more similar to one another than the objects corresponding to vector 1610 and vector 1630, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 17:
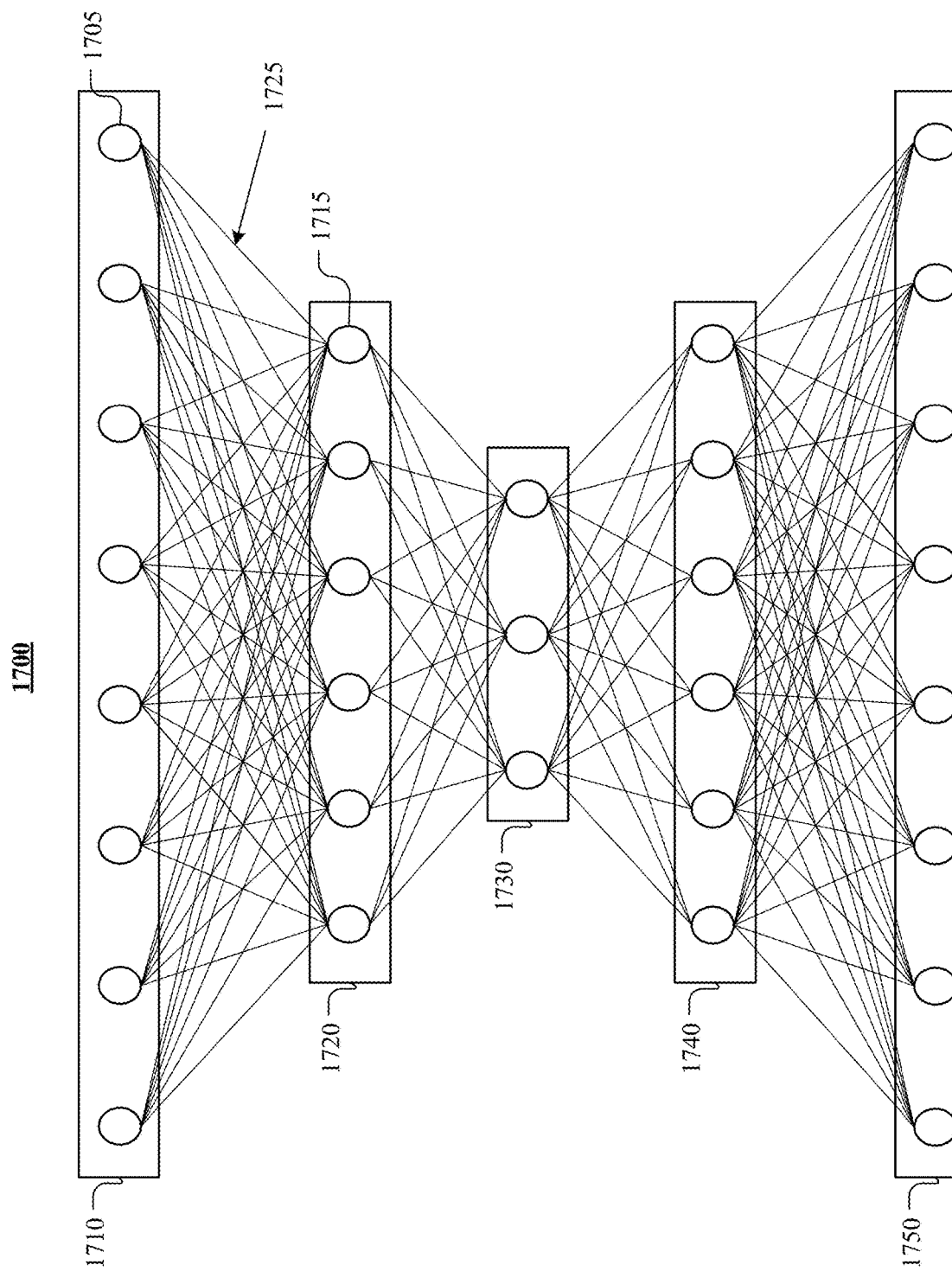
FIG. 17 illustrates an example artificial neural network.

FIG. 17 illustrates an example artificial neural network ("ANN") 1700. In particular embodiments, an ANN may refer to a computational model comprising one or more nodes. Example ANN 1700 may comprise an input layer 1710, hidden layers 1720, 1730, 1740, and an output layer 1750. Each layer of the ANN 1700 may comprise one or more nodes, such as a node 1705 or a node 1715. In particular embodiments, each node of an ANN may be connected to another node of the ANN. As an example and not by way of limitation, each node of the input layer 1710 may be connected to one of more nodes of the hidden layer 1720. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 17 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 17 depicts a connection between each node of the input layer 1710 and each node of the hidden layer 1720, one or more nodes of the input layer 1710 may not be connected to one or more nodes of the hidden layer 1720.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1720 may comprise the output of one or more nodes of the input layer 1710. As another example and not by way of limitation, the input to each node of the output layer 1750 may comprise the output of one or more nodes of the hidden layer 1740. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1+e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1725 between the node 1705 and the node 1715 may have a weighting coefficient of 0.4, which may indicate that 0.4 multiplied by the output of the node 1705 is used as an input to the node 1715. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1700 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 1500. A privacy setting may be specified for one or more edges 1506 or edge-types of the social graph 1500, or with respect to one or more nodes 1502, 1504 or node-types of the social graph 1500. The privacy settings applied to a particular edge 1506 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 1504 connected to a user node 1502 of the first user by an edge 1506. The first user may specify privacy settings that apply to a particular edge 1506 connecting to the concept node 1504 of the object, or may specify privacy settings that apply to all edges 1506 connecting to the concept node 1504. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client system 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160.

Systems and Methods

Figure 18:
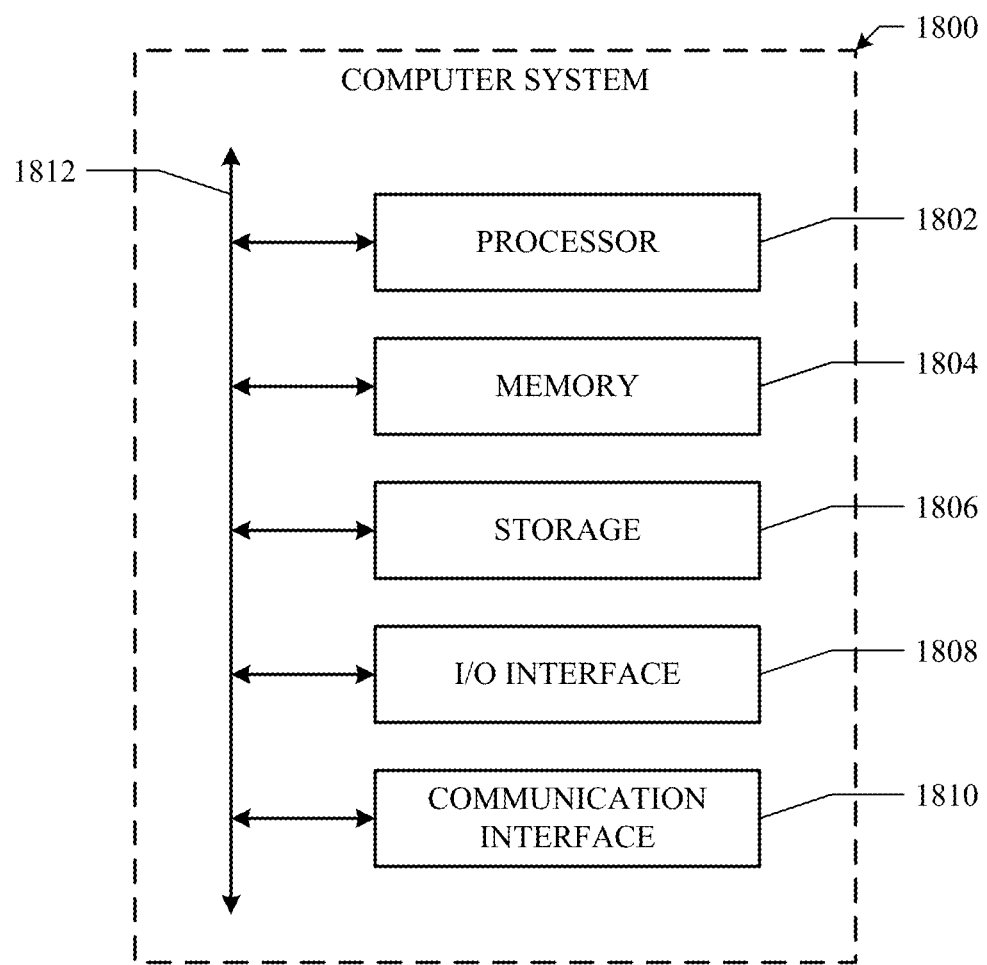
FIG. 18 illustrates an example computer system.

FIG. 18 illustrates an example computer system 1800. In particular embodiments, one or more computer systems 1800 perform one or more steps of one or more methods described or illustrated herein. In particular embodiments, one or more computer systems 1800 provide functionality described or illustrated herein. In particular embodiments, software running on one or more computer systems 1800 performs one or more steps of one or more methods described or illustrated herein or provides functionality described or illustrated herein. Particular embodiments include one or more portions of one or more computer systems 1800. Herein, reference to a computer system may encompass a computing device, and vice versa, where appropriate. Moreover, reference to a computer system may encompass one or more computer systems, where appropriate.

This disclosure contemplates any suitable number of computer systems 1800. This disclosure contemplates computer system 1800 taking any suitable physical form. As example and not by way of limitation, computer system 1800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1800 may include one or more computer systems 1800; be unitary or distributed; span multiple locations; span multiple machines; span multiple data centers; or reside in a cloud, which may include one or more cloud components in one or more networks. Where appropriate, one or more computer systems 1800 may perform without substantial spatial or temporal limitation one or more steps of one or more methods described or illustrated herein. As an example and not by way of limitation, one or more computer systems 1800 may perform in real time or in batch mode one or more steps of one or more methods described or illustrated herein. One or more computer systems 1800 may perform at different times or at different locations one or more steps of one or more methods described or illustrated herein, where appropriate.

In particular embodiments, computer system 1800 includes a processor 1802, memory 1804, storage 1806, an input/output (I/O) interface 1808, a communication interface 1810, and a bus 1812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1802 includes hardware for executing instructions, such as those making up a computer program. As an example and not by way of limitation, to execute instructions, processor 1802 may retrieve (or fetch) the instructions from an internal register, an internal cache, memory 1804, or storage 1806; decode and execute them; and then write one or more results to an internal register, an internal cache, memory 1804, or storage 1806. In particular embodiments, processor 1802 may include one or more internal caches for data, instructions, or addresses. This disclosure contemplates processor 1802 including any suitable number of any suitable internal caches, where appropriate. As an example and not by way of limitation, processor 1802 may include one or more instruction caches, one or more data caches, and one or more translation lookaside buffers (TLBs). Instructions in the instruction caches may be copies of instructions in memory 1804 or storage 1806, and the instruction caches may speed up retrieval of those instructions by processor 1802. Data in the data caches may be copies of data in memory 1804 or storage 1806 for instructions executing at processor 1802 to operate on; the results of previous instructions executed at processor 1802 for access by subsequent instructions executing at processor 1802 or for writing to memory 1804 or storage 1806; or other suitable data. The data caches may speed up read or write operations by processor 1802. The TLBs may speed up virtual-address translation for processor 1802. In particular embodiments, processor 1802 may include one or more internal registers for data, instructions, or addresses. This disclosure contemplates processor 1802 including any suitable number of any suitable internal registers, where appropriate. Where appropriate, processor 1802 may include one or more arithmetic logic units (ALUs); be a multi-core processor; or include one or more processors 1802. Although this disclosure describes and illustrates a particular processor, this disclosure contemplates any suitable processor.

In particular embodiments, memory 1804 includes main memory for storing instructions for processor 1802 to execute or data for processor 1802 to operate on. As an example and not by way of limitation, computer system 1800 may load instructions from storage 1806 or another source (such as, for example, another computer system 1800) to memory 1804. Processor 1802 may then load the instructions from memory 1804 to an internal register or internal cache. To execute the instructions, processor 1802 may retrieve the instructions from the internal register or internal cache and decode them. During or after execution of the instructions, processor 1802 may write one or more results (which may be intermediate or final results) to the internal register or internal cache. Processor 1802 may then write one or more of those results to memory 1804. In particular embodiments, processor 1802 executes only instructions in one or more internal registers or internal caches or in memory 1804 (as opposed to storage 1806 or elsewhere) and operates only on data in one or more internal registers or internal caches or in memory 1804 (as opposed to storage 1806 or elsewhere). One or more memory buses (which may each include an address bus and a data bus) may couple processor 1802 to memory 1804. Bus 1812 may include one or more memory buses, as described below. In particular embodiments, one or more memory management units (MMUs) reside between processor 1802 and memory 1804 and facilitate accesses to memory 1804 requested by processor 1802. In particular embodiments, memory 1804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1804 may include one or more memories 1804, where appropriate. Although this disclosure describes and illustrates particular memory, this disclosure contemplates any suitable memory.

In particular embodiments, storage 1806 includes mass storage for data or instructions. As an example and not by way of limitation, storage 1806 may include a hard disk drive (HDD), a floppy disk drive, flash memory, an optical disc, a magneto-optical disc, magnetic tape, or a Universal Serial Bus (USB) drive or a combination of two or more of these. Storage 1806 may include removable or non-removable (or fixed) media, where appropriate. Storage 1806 may be internal or external to computer system 1800, where appropriate. In particular embodiments, storage 1806 is non-volatile, solid-state memory. In particular embodiments, storage 1806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1806 taking any suitable physical form. Storage 1806 may include one or more storage control units facilitating communication between processor 1802 and storage 1806, where appropriate. Where appropriate, storage 1806 may include one or more storages 1806. Although this disclosure describes and illustrates particular storage, this disclosure contemplates any suitable storage.

In particular embodiments, I/O interface 1808 includes hardware, software, or both, providing one or more interfaces for communication between computer system 1800 and one or more I/O devices. Computer system 1800 may include one or more of these I/O devices, where appropriate. One or more of these I/O devices may enable communication between a person and computer system 1800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1808 for them. Where appropriate, I/O interface 1808 may include one or more device or software drivers enabling processor 1802 to drive one or more of these I/O devices. I/O interface 1808 may include one or more I/O interfaces 1808, where appropriate. Although this disclosure describes and illustrates a particular I/O interface, this disclosure contemplates any suitable I/O interface.

In particular embodiments, communication interface 1810 includes hardware, software, or both providing one or more interfaces for communication (such as, for example, packet-based communication) between computer system 1800 and one or more other computer systems 1800 or one or more networks. As an example and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1810 for it. As an example and not by way of limitation, computer system 1800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1800 may include any suitable communication interface 1810 for any of these networks, where appropriate. Communication interface 1810 may include one or more communication interfaces 1810, where appropriate. Although this disclosure describes and illustrates a particular communication interface, this disclosure contemplates any suitable communication interface.

In particular embodiments, bus 1812 includes hardware, software, or both coupling components of computer system 1800 to each other. As an example and not by way of limitation, bus 1812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1812 may include one or more buses 1812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    receiving, from a client system during a dialog session with a first user, a first user request from the first user for generating a media montage;
    generating, during the dialog session, an initial media montage based on one or more media collections associated with the first user;
    sending, to the client system during the dialog session, instructions for presenting the initial media montage;
    receiving, from the client system during the dialog session, a second user request from the first user for editing the initial media montage;
    generating, during the dialog session, an edited media montage from the initial media montage based on the second user request and a memory graph associated with the first user; and
    sending, to the client system during the dialog session, instructions for presenting the edited media montage.

2. The method of claim 1, wherein the first user request comprises a first utterance from the first user, and wherein the second user request comprises a second utterance from the first user.

3. The method of claim 1, wherein generating the initial media storage is further based on the memory graph associated with the first user.

4. The method of claim 1, wherein the first user request is received via a user interface comprising a visualizer configured for presenting media montages and a chat interface configured for supporting dialog sessions between the first user and an assistant system.

5. The method of claim 1, further comprising:
    determining, based on the first user request, an intent to generate the initial media montage.

6. The method of claim 1, further comprising:
    determining, based on the first user request, one or more initial slots, wherein generating the initial media montage is further based on one or more of the initial slots.

7. The method of claim 1, further comprising:
    determining, based on the second user request, an intent to edit the initial media montage.

8. The method of claim 1, further comprising:
    determining, based on the second user request, one or more modified slots, wherein generating the edited media montage is further based on one or more of the modified slots.

9. The method of claim 8, further comprising:
    accessing the memory graph associated with the first user, wherein the memory graph comprises a plurality of nodes and a plurality of edges connecting the nodes, and wherein one or more of the nodes correspond to one or more episodic memories of the first user, respectively, and wherein each edge corresponds to a relationship between the connected nodes; and
    selecting, based on the one or more modified slots, one or more candidate nodes from the memory graph, wherein generating the edited media montage is further based on one or more of the one or more candidate nodes.

10. The method of claim 9, further comprising:
    determining a multimodal context for at least one of the one or more episodic memories of the first user, wherein the multimodal context comprises one or more of a visual embedding associated with the at least one episodic memory or a textual token associated with the at least one episodic memory.

11. The method of claim 10, wherein the multimodal context comprises one or more textual tokens associated with the at least one episodic memory, and wherein the one or more textual tokens are generated based on contextual information associated with the at least one episodic memory.

12. The method of claim 10, wherein generating the edited media montage is further based on the multimodal context.

13. The method of claim 1, wherein generating the edited media montage is further based on a language model.

14. The method of claim 13, further comprising:
    determining, by a dialog manager, an application-program-interface (API) call based on one or more outputs from the language model.

15. The method of claim 1, further comprising:
    generating a response associated with the edited media montage; and
    sending, to the client system during the dialog session, instructions for presenting the generated response.

16. The method of claim 1, wherein the edited media montage is based on a video story comprising one or more of a video clip, an image, a transition, or a background.

17. The method of claim 1, wherein the initial media montage comprises a plurality of video clips, and wherein generating the edited media montage comprises one or more of:

modifying a duration of one or more of the video clips;

removing one or more of the video clips from the initial media montage;

replacing one or more of the video clips with one or more other video clips; or reordering one or more of the video clips within the initial media montage.

18. The method of claim 1, further comprising:

generating, by one or more machine-learning models, a visual analysis of the initial media montage, wherein generating the edited media montage is further based on the visual analysis of the initial media montage.

19. One or more computer-readable non-transitory storage media embodying software that is operable when executed to:

receive, from a client system during a dialog session with a first user, a first user request from the first user for generating a media montage;

generate, during the dialog session, an initial media montage based on one or more media collections associated with the first user;

send, to the client system during the dialog session, instructions for presenting the initial media montage;

receive, from the client system during the dialog session, a second user request from the first user for editing the initial media montage;

generate, during the dialog session, an edited media montage from the initial media montage based on the second user request and a memory graph associated with the first user; and send, to the client system during the dialog session, instructions for presenting the edited media montage.

20. A system comprising: one or more processors; and a non-transitory memory coupled to the processors comprising instructions executable by the processors, the processors operable when executing the instructions to:

receive, from a client system during a dialog session with a first user, a first user request from the first user for generating a media montage;

generate, during the dialog session, an initial media montage based on one or more media collections associated with the first user;

send, to the client system during the dialog session, instructions for presenting the initial media montage;

receive, from the client system during the dialog session, a second user request from the first user for editing the initial media montage;

generate, during the dialog session, an edited media montage from the initial media montage based on the second user request and a memory graph associated with the first user; and send, to the client system during the dialog session, instructions for presenting the edited media montage.

\* \* \* \* \*